United States Patent
Doi

(10) Patent No.: US 8,374,774 B2
(45) Date of Patent: Feb. 12, 2013

(54) VEHICLE

(75) Inventor: Katsunori Doi, Tokyo (JP)

(73) Assignee: Equos Research Co., Ltd., Anjo (JP)

( * ) Notice: Subject to any disclaimer, the term of this patent is extended or adjusted under 35 U.S.C. 154(b) by 179 days.

(21) Appl. No.: 12/734,800

(22) PCT Filed: Dec. 9, 2008

(86) PCT No.: PCT/JP2008/072307
§ 371 (c)(1),
(2), (4) Date: Jul. 19, 2010

(87) PCT Pub. No.: WO2009/084384
PCT Pub. Date: Jul. 9, 2009

(65) Prior Publication Data
US 2010/0305840 A1     Dec. 2, 2010

(30) Foreign Application Priority Data

Dec. 27, 2007 (JP) ................. 2007-337608
Dec. 27, 2007 (JP) ................. 2007-337623
Dec. 27, 2007 (JP) ................. 2007-337683
Feb. 20, 2008 (JP) ................. 2008-039021
Feb. 20, 2008 (JP) ................. 2008-039068

(51) Int. Cl.
    *B60L 15/20*     (2006.01)
    *B62K 17/00*     (2006.01)
    *B62K 3/00*     (2006.01)

(52) U.S. Cl. ................. 701/124; 180/218

(58) Field of Classification Search ............. 701/124; 180/218
See application file for complete search history.

(56) References Cited

U.S. PATENT DOCUMENTS 5,975,225 A * 11/1999 Kamen et al. ................. 180/7.1
6,003,624 A * 12/1999 Jorgensen et al. ............. 180/6.5
(Continued)

FOREIGN PATENT DOCUMENTS

JP    2004276727 A   *   10/2004
JP    A-2005-6436        1/2005
(Continued)

OTHER PUBLICATIONS

JPO machine translation of JP 2007-219986.*
(Continued)

*Primary Examiner* — James Trammell
*Assistant Examiner* — David Testardi
(74) *Attorney, Agent, or Firm* — Oliff & Berridge, PLC

(57) ABSTRACT

When a vehicle climbs up/down a step, driving torque suitable for the step climbing operation is applied to a driving wheel, and the center of gravity of a vehicle body is moved in an upward direction of the step. Thus, a stable traveling state and stable posture of the vehicle body can be maintained both when climbing up a step and when climbing down a step, whereby an occupant can operate the vehicle safely and comfortably even on a place having steps. In view of this, the vehicle includes: a vehicle body; a driving wheel rotatably attached to the vehicle body; and a vehicle control apparatus for controlling driving torque that is applied to the driving wheel and controlling posture of the vehicle body. When climbing up/down a step on a road, the vehicle control apparatus controls a position of center of gravity of the vehicle body in accordance with the step.

5 Claims, 32 Drawing Sheets

U.S. PATENT DOCUMENTS

| | | | |
|---|---|---|---|
| 7,004,271 B1 * | 2/2006 | Kamen et al. | 180/21 |
| 7,363,993 B2 * | 4/2008 | Ishii | 180/7.1 |
| 7,677,345 B2 * | 3/2010 | Hosoda | 180/218 |
| 7,703,568 B2 * | 4/2010 | Ishii | 180/218 |
| 7,823,676 B2 * | 11/2010 | Yamada et al. | 180/218 |
| 2010/0017069 A1 * | 1/2010 | Miki et al. | 701/48 |
| 2010/0057319 A1 * | 3/2010 | Inaji et al. | 701/70 |
| 2010/0070132 A1 | 3/2010 | Doi | |
| 2010/0280745 A1 * | 11/2010 | Gorai | 701/124 |

FOREIGN PATENT DOCUMENTS

| | | | |
|---|---|---|---|
| JP | 2006001385 A * | 1/2006 | |
| JP | A-2007-124866 | 5/2007 | |
| JP | A-2007-161198 | 6/2007 | |
| JP | 2007168602 A * | 7/2007 | |
| JP | 2007176399 A * | 7/2007 | |
| JP | A-2007-219986 | 8/2007 | |
| JP | 2007223399 A * | 9/2007 | |
| JP | A-2007-302061 | 11/2007 | |
| WO | WO 2006095823 A1 * | 9/2006 | |
| WO | WO 2007088944 A1 * | 8/2007 | |
| WO | WO 2007129505 A1 * | 11/2007 | |

OTHER PUBLICATIONS

JPO machine translation of JP 2007-176399.*
JPO machine translation of JP 2007-168602.*
International Search Report mailed on Mar. 17, 2009 in corresponding International Application No. PCT/JP2008/072307 (with translation).

* cited by examiner

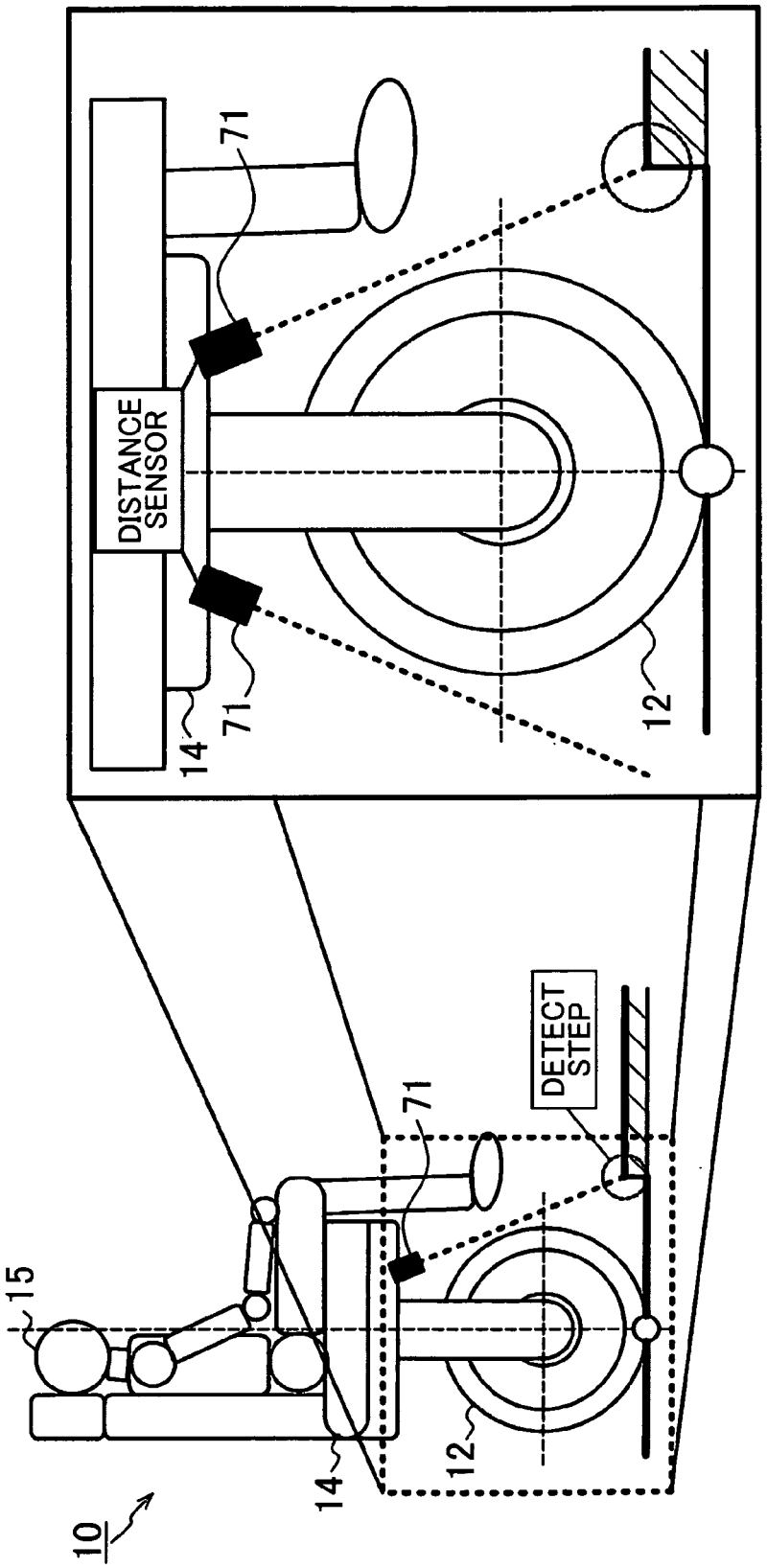

F I G . 29
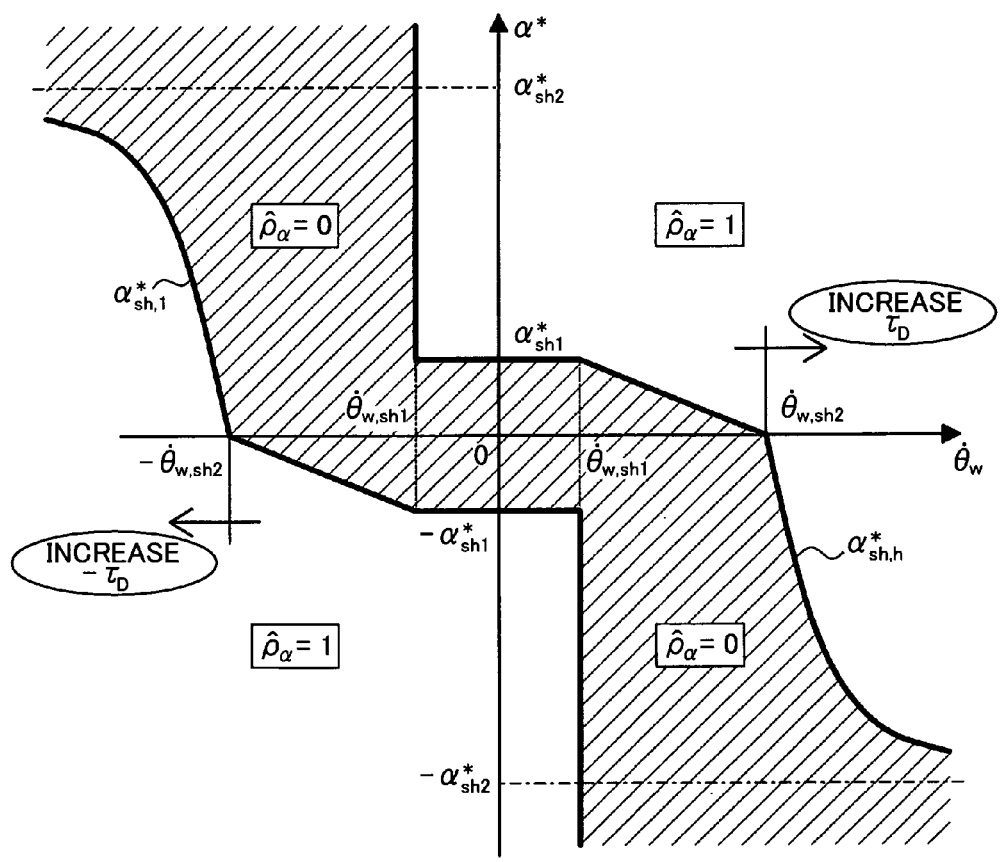

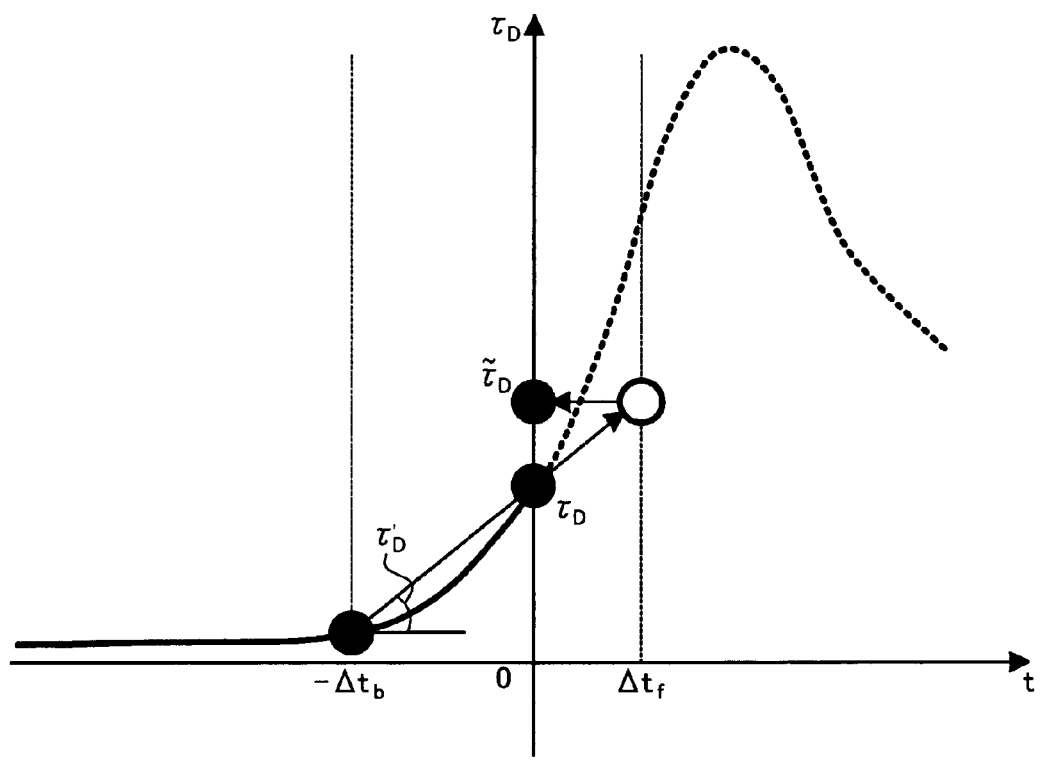
F I G . 34

VEHICLE

TECHNICAL FIELD

The present invention relates to vehicles using posture control of an inverted pendulum.

BACKGROUND ART

Conventionally, techniques relating to vehicles using posture control of an inverted pendulum have been proposed. Examples of the proposed techniques include a vehicle that has two coaxially disposed driving wheels and is driven in accordance with detection of a change in posture of a vehicle body due to shifting of the center of gravity of a driver, and a vehicle that moves while controlling posture of a vehicle body attached to a spherical single driving wheel (see, e.g., Patent Document 1).

In this case, the vehicle is stopped or moved by controlling operation of a rotating body while detecting the balance of the vehicle body and the operating state.

Patent Document 1: Japanese Patent Application Publication No. JP-A-2007-219986

DISCLOSURE OF THE INVENTION

Problem to be Solved by the Invention

In the above conventional vehicle, however, the vehicle body is tilted in a direction opposite to a step when climbing up/down the step, whereby the vehicle cannot maintain its stable posture. For example, if required driving torque is applied to the driving wheel when climbing up a step, the vehicle body is subjected to a reaction force, whereby the vehicle body is significantly tilted in a direction opposite to the step. On the other hand, in order to keep the posture of the vehicle body upright, required driving torque cannot be applied to the driving wheel, and the vehicle cannot safely and comfortably climb up the step. A similar phenomenon occurs when the vehicle climbs down a step, and the vehicle is tilted forward.

The present invention has been developed to solve the problems of the conventional vehicles, and it is an object of the present invention to provide a vehicle that is capable of maintaining a stable traveling state and stable posture of a vehicle body when climbing up and down a step, and capable of traveling safely and comfortably even on a place having steps, by applying driving torque suitable for climbing up/down the step to a driving wheel and moving the center of gravity of the vehicle body in an upper direction of the step when the vehicle is climbing up and down the step.

Means for Solving the Problem

Thus, a vehicle according to the present invention includes: a vehicle body; a driving wheel rotatably attached to the vehicle body; and a vehicle control apparatus for controlling driving torque that is applied to the driving wheel and controlling posture of the vehicle body, wherein when climbing up/down a step on a road, the vehicle control apparatus controls a position of center of gravity of the vehicle body in accordance with the step.

In another vehicle according to the present invention, the vehicle control apparatus controls the position of the center of gravity of the vehicle body by changing a tilt angle of the vehicle body.

Still another vehicle according to the present invention further includes an active weight portion attached to the vehicle body so as to be movable forward and rearward in a traveling direction, wherein the vehicle control apparatus controls the position of the center of gravity of the vehicle body by moving the active weight portion.

In still another vehicle according to the present invention, the vehicle control apparatus moves the position of the center of gravity of the vehicle body in an upward direction of the step.

In still another vehicle according to the present invention, the vehicle control apparatus applies driving torque in accordance with the step to the driving wheel, and controls the position of the center of gravity of the vehicle body so that the driving torque becomes equal to an increase in gravity torque caused by the movement of the center of gravity of the vehicle body.

In still another vehicle according to the present invention, the vehicle control apparatus estimates step resistance torque, which is a resistance of the step, by an observer, and controls the position of the center of gravity of the vehicle body in accordance with the step resistance torque.

Still another vehicle according to the present invention further includes a sensor for detecting the step, wherein the vehicle control apparatus controls the position of the center of gravity of the vehicle body in accordance with a measured value of the step measured by the sensor.

Still another vehicle according to the present invention includes: a driving wheel rotatably attached to a vehicle body; and a vehicle control apparatus for controlling driving torque that is applied to the driving wheel and controlling posture of the vehicle body, wherein the vehicle control apparatus estimates step resistance torque, which is driving torque required to climb up/down a step, in view of the posture of the vehicle body, and corrects the driving torque in accordance with the step resistance torque.

In another vehicle according to the present invention, the vehicle control apparatus estimates the step resistance torque by considering a tilt angle of the vehicle body as the posture of the vehicle body.

In still another vehicle according to the present invention, the vehicle control apparatus estimates the step resistance torque based on the driving torque, a rotational angular acceleration of the driving wheel, and a tilt angular acceleration of the vehicle body.

In still another vehicle according to the present invention, the vehicle control apparatus estimates the step resistance torque by considering that an external force, which is applied to the vehicle body in proportion to the step resistance torque, is equal to a difference between a driving force of the driving wheel and an inertial force.

In still another vehicle according to the present invention, the inertial force is formed of a vehicle translational inertial force and a vehicle body tilting inertial force.

A still another vehicle according to the present invention further includes an active weight portion attached to the vehicle body so as to be movable in a longitudinal direction, wherein the vehicle control apparatus controls the driving torque and/or a position of the active weight portion to control the posture of the vehicle body, and estimates the step resistance torque by considering the tilt angle of the vehicle body and the position of the active weight portion as the posture of the vehicle body.

In still another vehicle according to the present invention, the vehicle control apparatus estimates the step resistance torque based on the driving torque, the rotation angular acceleration of the driving wheel, the tilt angular acceleration of the vehicle body, and acceleration of movement of the active weight portion.

In still another vehicle according to the present invention, the vehicle control apparatus estimates the step resistance torque by considering that an external force, which is applied to the vehicle body in proportion to the step resistance torque, is equal to a difference between a driving force of the driving wheel and an inertial force.

In still another vehicle according to the present invention, the inertial force is formed of the vehicle translational inertial force, the vehicle body tilting inertial force, and an inertial force for moving the active weight portion.

A still another vehicle according to the present invention includes: a driving wheel rotatably attached to a vehicle body; and a vehicle control apparatus for controlling driving torque that is applied to the driving wheel and controlling posture of the vehicle body, wherein, when climbing up/down a step on a road, the vehicle control apparatus estimates step resistance torque of the step by an observer, and if an absolute value of the estimated value of the step resistance torque exceeds a predetermined threshold, the vehicle control apparatus adds driving torque required to climb up/down the step.

In another vehicle according to the present invention, the vehicle control apparatus sets the estimated value of the step resistance torque to zero if the absolute value of the estimated value of the step resistance value is equal to or less than the threshold.

In still another vehicle according to the present invention, the vehicle control apparatus determines the threshold based on statistical characteristic quantities of extreme values included in a time history of the estimated value of the step resistance torque during a time period from a time that is earlier than a current time by a predetermined time to the current time.

In still another vehicle according to the present invention, the vehicle control apparatus determines that the sum of an average value of the extreme values and standard deviation of the extreme values multiplied by a predetermined value is used as an upper limit of the threshold, and that the value obtained by subtracting the standard deviation of the extreme values multiplied by the predetermined value from the average value of the extreme values is used as a lower limit of the threshold.

In still another vehicle according to the present invention, the vehicle control apparatus determines the threshold based on a greatest height of irregularities on a road on which the vehicle travels.

A still another vehicle according to the present invention includes: a vehicle body; a driving wheel rotatably attached to the vehicle body; an input device for inputting a travel command; and a vehicle control apparatus for controlling driving torque that is applied to the driving wheel and controlling posture of the vehicle body, based on the travel command received from the input device, wherein the vehicle control apparatus includes operation intension estimating means for estimating an operation intension based on an operating state of the vehicle and the travel command, and executes or prohibits step climbing control for adding the driving torque for climbing up/down the step, in accordance with the operation intension estimated by the operation intension estimating means.

In another vehicle according to the present invention, the operation intension estimating means estimates the operation intension based on a vehicle speed and a target value of vehicle acceleration.

In another vehicle according to the present invention, the operation intension estimating means includes an operation intension estimation map, which indicates a region by a plurality of predetermined functions regarding the vehicle speed and the target value of the vehicle acceleration, and the operation intension estimating means estimates that the operation intension is to prohibit the step climbing control, if a point defined by the vehicle speed and the target value of the vehicle acceleration is located in the region defined by the operation intension estimating map.

In still another vehicle according to a yet further aspect of the present invention, when the vehicle enters an ascending step, the operation intension estimating means estimates that the operation intension is to prohibit the step climbing control if the vehicle speed and the target value of the vehicle acceleration satisfy predetermined conditions, and estimates that the operation intension is to execute the step climbing control if the vehicle speed and the target value of the vehicle acceleration does not satisfy predetermined conditions.

In still another vehicle according to the present invention, the operation intension estimating means estimates that the operation intension is to prohibit the step climbing control, if the vehicle is in a stopped state, and the target value of the vehicle acceleration has a value commanding to keep the vehicle in the stopped state.

In still another vehicle according to the present invention, the operation intension estimating means estimates that the operation intension is to prohibit the step climbing control, if an absolute value of the vehicle speed is equal to or less than a speed threshold, and the target value of the vehicle acceleration has a value commanding to maintain a traveling speed or to brake the vehicle.

In still another vehicle according to the present invention, the speed threshold is determined in accordance with a value of the step resistance torque.

In still another vehicle according to the present invention, the operation intension estimating means estimates that the operation intension is to prohibit the step climbing control if the target value of the vehicle acceleration in a traveling direction has a value commanding to brake the vehicle suddenly, which is equal to or less than a predetermined negative threshold.

In still another vehicle according to the present invention, the operation intension estimating means executes the step climbing control regardless of the operation intention estimated by the operation intension estimating means if the step is a descending step.

In still another vehicle according to the present invention, the vehicle control apparatus further includes step resistance torque estimating means for estimating step resistance torque, which is a resistance of the step, based on the posture of the vehicle body when the vehicle climbs up/down the step, and the operation intension determining means determines if the step is an ascending step or a descending step in accordance with the step resistance torque, and estimates the operation intention based on the determination result.

In still another vehicle according to the present invention, the vehicle control means further includes step climbing torque ratio determining means for determining a step climbing torque ratio, which changes from zero to one in a predetermined time if it is determined by the operation intension estimating means that the operation intension is to execute the step climbing control, and changes from one to zero in the predetermined time if it is determined by the operation intension estimating means that the operation intension is to prohibit the step climbing control, and a value of a product of the step climbing torque ratio and step resistance torque that is a resistance of the step is added as driving torque for climbing up/down the step.

Still another vehicle according to the present invention includes: a vehicle body; a driving wheel rotatably attached to the vehicle body; an input device for inputting a travel command; and a vehicle control apparatus for controlling driving torque that is applied to the driving wheel and controlling posture of the vehicle body, based on the travel command received from the input device, wherein, while the vehicle is climbing up/down a step on a road, the vehicle control apparatus adds the driving torque in accordance with the step to the driving wheel, and corrects a target value of vehicle acceleration determined in accordance with the travel command.

In another vehicle according to the present invention, the vehicle control apparatus decreases the target value of the vehicle acceleration in a traveling direction when climbing up the step on the road, and increases the target value of the vehicle acceleration in the traveling direction when climbing down the step on the road.

In still another vehicle according to the present invention, the vehicle control apparatus corrects the target value of the vehicle acceleration so as to cancel counter torque, which is applied to the vehicle body by the driving torque added in accordance with the step, by an inertial force caused by acceleration/deceleration of the vehicle.

In still another vehicle according to the present invention, an amount of correction of the target value of the vehicle acceleration is determined in proportion to the driving torque that is added in accordance with the step.

In still another vehicle according to the present invention, the vehicle control apparatus changes the amount of correction of the target value of the vehicle acceleration in accordance with a predicted value of a vehicle terminal velocity, which is a predicted vehicle speed upon completion of the step climbing operation.

In still another vehicle according to the present invention, the predicted value of the vehicle terminal velocity is determined based on a rotation angular velocity of the driving wheel, step resistance torque, which is a resistance of the step, and the target value of the vehicle acceleration, which is determined in accordance with the travel command.

In still another vehicle according to the present invention, the vehicle control apparatus sets the amount of correction of the target value of the vehicle acceleration to zero if the predicted value of the vehicle terminal velocity is equal to or less than a predetermined first threshold.

In still another vehicle according to the present invention, if the predicted value of the vehicle terminal velocity is equal to or higher than a predetermined second threshold value, the vehicle control apparatus uses, as the amount of correction of the target value of the vehicle acceleration, a reference value, which is such an amount of correction of the target value of the vehicle acceleration that counter torque that is applied to the vehicle body by the driving torque added in accordance with the step becomes equal to torque that is applied to the vehicle body by an inertial force caused by acceleration/deceleration of the vehicle.

In still another vehicle according to the present invention, the vehicle control apparatus transitions the amount of correction of the target value of the vehicle acceleration from zero to the reference value when the predicted value of the vehicle terminal velocity is within a range between the first threshold and the second threshold.

Effects of the Invention

A stable traveling state and stable posture of the vehicle body can be maintained both when climbing up a step and when climbing down a step. Thus, the occupant can operate the vehicle safely and comfortably even on a place having steps.

The present invention may be applied to vehicles having no moving mechanism for moving the riding portion. Thus, the structure and a control system can be simplified, and inexpensive, lightweight vehicles can be implemented.

The present invention may be applied to vehicles having a moving mechanism for moving the riding portion, and the posture of the vehicle body can be stably maintained without tilting the vehicle body.

The posture of the vehicle body can be more stably maintained.

The traveling state of the vehicle can be stably controlled.

BRIEF DESCRIPTION OF THE DRAWINGS

FIG. 18A shows a schematic diagram of the structure of a vehicle according to a third embodiment of the present invention, showing the state in which the vehicle detects a step located ahead of the vehicle, and FIG. 18B is an enlarged view of FIG. 18A.

FIG. 29 is a graph of a map for estimating a riding intension according to a fifth embodiment of the present invention, showing thresholds of a target value of vehicle acceleration, and thresholds of a rotation angular velocity of driving wheels.

FIG. 34 is a graph illustrating correction of step resistance torque according to the sixth embodiment of the present invention.

BEST MODES FOR CARRYING OUT THE INVENTION

Embodiments of the present invention will be described in detail below with reference to the accompanying drawings.

Figure 1:
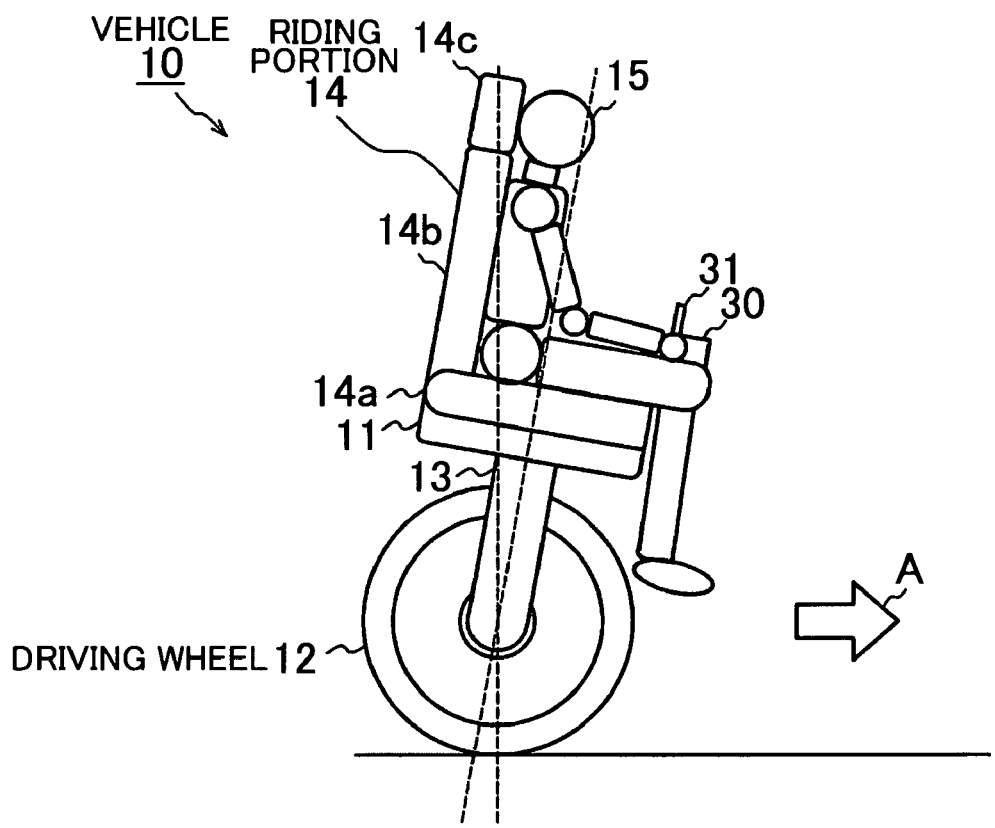
FIG. 1 is a schematic diagram showing the structure of a vehicle according to a first embodiment of the present invention, and showing the state in which the vehicle with an occupant riding thereon is being accelerated to travel forward.
Figure 2:
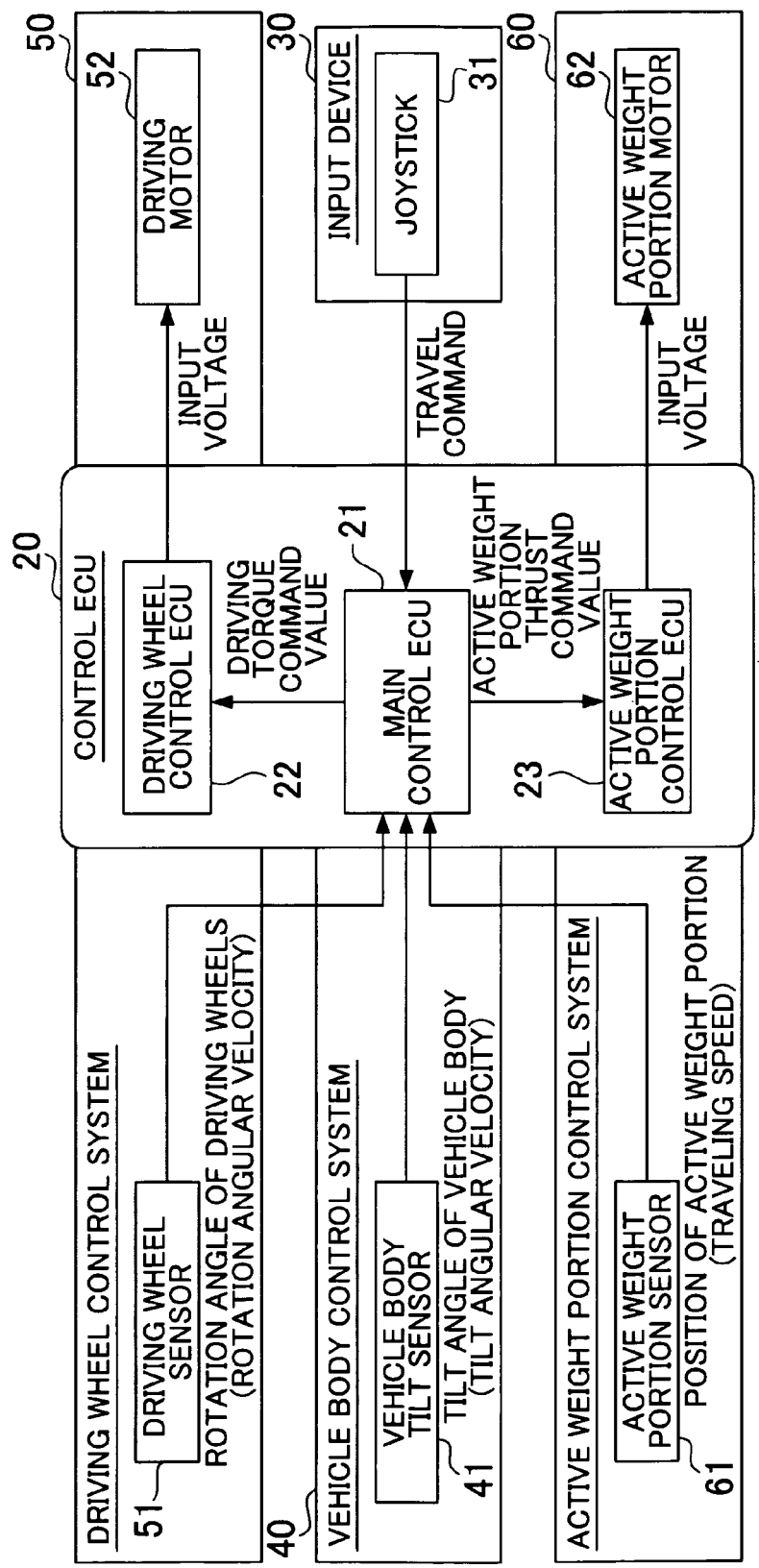
FIG. 2 is a block diagram showing the structure of a control system of the vehicle according to the first embodiment of the present invention.

FIG. 1 is a schematic diagram showing the structure of a vehicle according to a first embodiment of the present invention, and showing the state in which the vehicle with an occupant riding thereon is being accelerated to travel forward. FIG. 2 is a block diagram showing the structure of a control system of the vehicle according to the first embodiment of the present invention.

In FIG. 1, reference numeral 10 indicates the vehicle of the present embodiment. The vehicle 10 has a main body 11 of a vehicle body, driving wheels 12, a support portion 13, and a riding portion 14 on which an occupant 15 rides. The vehicle 10 is capable of tilting the vehicle body in the longitudinal direction. The posture of the vehicle body is controlled in a manner similar to that of posture control of an inverted pendulum. The example of FIG. 1 shows the state in which the vehicle 10 is being accelerated in the direction shown by arrow A, and the vehicle body is tilted in the traveling direction.

The driving wheels 12 are supported so as to be rotatable with respect to the support portion 13 that is a part of the vehicle body. The driving wheels 12 are driven by driving motors 52 as driving actuators, respectively. Note that the axis of the driving wheels 12 extend in the direction perpendicular to the plane shown in FIG. 1, and the driving wheels 12 rotate about the axis. The vehicle 10 may have one driving wheel 12 or a plurality of driving wheels 12. If the vehicle 10 has a plurality of driving wheels 12, the driving wheels 12 are arranged coaxially and parallel with each other. In the present embodiment, it is assumed that the vehicle 10 has two driving wheels 12. In this case, the driving wheels 12 are driven independently of each other by corresponding driving motors 52, respectively. Note that, for example, hydraulic motors, internal combustion engines, or the like may be used as the driving actuators. However, it is herein assumed that the driving motors 52, which are electric motors, are used as the driving actuators.

The main body 11, which is a part of the vehicle body, is supported from beneath by the support portion 13, and is located above the driving wheels 12. The riding portion 14, which functions as an active weight portion, is attached to the main body 11 so as to be movable relatively with respect to the main body 11 in the longitudinal direction of the vehicle 10, that is, so as to be movable relatively in a direction tangential to a rotation circle of the vehicle body.

The active weight portion has a certain amount of mass, and is moved longitudinally with respect to the main body 11 to actively correct the position of the center of gravity of the vehicle 10. The active weight portion need not necessarily be the riding portion 14, and may be, e.g., an apparatus formed by movably attaching a heavy peripheral equipment, such as a battery, to the main body 11, or may be an apparatus formed by movably attaching a dedicated weight member, such as a weight, a plumb, or a balancer, to the main body 11. Alternatively, the riding portion 14, the heavy peripheral equipment, the dedicated weight member, and the like may be combined.

In the present embodiment, an example in which the riding portion 14 with an occupant 15 riding thereon functions as the active weight portion will be described for convenience. However, the occupant 15 need not necessarily ride on the riding portion 14. For example, in the case where the vehicle 10 is operated by remote control, no occupant 15 may ride on the riding portion 14, or goods may be loaded on the riding portion 14 instead of the occupant 15.

The riding portion 14 is similar to a seat for use in automobiles such as passenger cars and buses. The riding portion 14 has a seat portion 14a, a backrest portion 14b, and a headrest 14c, and is attached to the main body 11 via a moving mechanism, not shown.

The moving mechanism includes a low-resistance linearly moving mechanism such as a linear guide apparatus, and an active weight portion motor 62 as an active weight portion actuator. The active weight portion motor 62 drives the riding portion 14 to move the riding portion 14 forward and backward in the traveling direction of the vehicle with respect to the main body 11. Note that, for example, a hydraulic motor, a linear motor, or the like may be used as the active weight portion actuator. However, it is herein assumed that the active weight portion motor 62, which is a rotation electric motor, is used as the active weight portion actuator.

The linear guide apparatus includes, e.g., a guide rail attached to the main body 11, a carriage that is attached to the riding portion 14 and slides along the guide rail, and a rolling element, such as a ball or a roller, which is interposed between the guide rail and the carriage. Two track grooves are respectively formed on both side surfaces of the guide rail so as to extend linearly along the longitudinal direction. The carriage has a U-shaped cross section, and two track grooves are formed in two opposing inner side surfaces so as to face the track grooves of the guide rail, respectively. The rolling element is disposed between the track grooves so as to roll within the track grooves in accordance with relative linear movement of the guide rail and the carriage. Note that a return passage, which connects both ends of the track grooves, is formed in the carriage so that the rolling element circulates in the track grooves and the return passage.

The linear guide apparatus includes a brake or a clutch for fixing movement of the linear guide apparatus. In the case where the riding portion 14 need not be operated, such as when the vehicle 10 is stopped, a relative positional relation between the main body 11 and the riding portion 14 is retained by fixing the carriage to the guide rail by the brake. When the riding portion need be operated, the brake is released, and the distance between a reference position on the main body 11 and a reference position on the riding portion 14 is controlled to a predetermined value.

An input device 30, which has a joystick 31 as a target traveling state obtaining device, is disposed by the side of the riding portion 14. The occupant 15 operates the vehicle 10 by operating the joystick 31 as an operating device. That is, the occupant 15 inputs a travel command, such as acceleration, deceleration, turning, in-situ rotation, stop, or braking of the vehicle 10. Note that, instead of the joystick 31, other devices such as, e.g., a pedal, a steering wheel, a jog dial, a touch panel, and a push button, may be used as the target traveling state obtaining device, as long as the device is capable of being operated by the occupant 15 to input a travel command.

Note that, in the case where the vehicle 10 is operated by remote control, a receiver for receiving a travel command from a controller in a wired or wireless manner can be used as the target traveling state obtaining device, instead of the joystick 31. In the case where the vehicle 10 travels automatically in accordance with predetermined travel command data, a data reader for reading travel command data stored in a storage medium such as a semiconductor memory or a hard disc can be used as the target traveling state obtaining device, instead of the joystick 31.

The vehicle 10 has a control electronic control unit (ECU) 20 as a vehicle control apparatus. The control ECU 20 includes a main control ECU 21, a driving wheel control ECU 22, and an active weight portion control ECU 23. The control ECU 20, and the main control ECU 21, the driving wheel control ECU 22, and the active weight portion control ECU 23 are a computer system that includes operation means such as a central processing unit (CPU) or a micro processing unit (MPU), storage means such as a magnetic disc or a semiconductor memory, an input/output (I/O) interface, and the like, and controls operation of each part of the vehicle 10. This computer system is disposed in, e.g., the main body 11, but may be disposed in the support portion 13 or the riding portion 14. The main control ECU 21, the driving wheel control ECU 22, and the active weight portion control ECU 23 may be formed separately or integrally.

The main control ECU 21, together with the driving wheel control ECU 22, a driving wheel sensor 51, and the driving motors 52, functions as a part of a driving wheel control system 50 for controlling operation of the driving wheels 12. The driving wheel sensor 51 is formed by a resolver, an encoder, or the like, and functions as an apparatus for measuring the rotating state of the driving wheels. The driving wheel sensor 51 detects a rotation angle and/or a rotation angular velocity of the driving wheels, which indicates the rotating state of the driving wheels 12, and sends the detected rotation angle and/or the detected rotation angular velocity to the main control ECU 21. The main control ECU 21 sends a driving torque command value to the driving wheel control ECU 22, and the driving wheel control ECU 22 supplies an input voltage, which corresponds to the received driving torque command value, to the driving motors 52. The driving motors 52 apply driving torque to the driving wheels 12 in accordance with the input voltage, respectively, and thus functions as driving actuators.

The main control ECU 21, together with the active weight portion control ECU 23, an active weight portion sensor 61, and the active weight portion motor 62, functions as a part of an active weight portion control system 60 for controlling operation of the riding portion 14 as the active weight portion. The active weight portion sensor 61 is formed by an encoder or the like, and functions as an apparatus for measuring the moving state of the active weight portion. The active weight portion sensor 61 detects the position and/or the moving speed of the active weight portion, which indicates the moving state of the riding portion 14, and sends the detected position and/or the detected moving speed to the main control ECU 21. The main control ECU 21 sends a thrust command value for the active weight portion to the active weight portion control ECU 23, and the active weight portion control ECU 23 supplies an input voltage, which corresponds to the received thrust command value, to the active weight portion motor 62. The active weight portion motor 62 applies thrust for translating the riding portion 14 to the riding portion 14 in accordance with the input voltage, and thus functions as an active weight portion actuator.

The main control ECU 21, together with the driving wheel control ECU 22, the active weight portion control ECU 23, a vehicle body tilt sensor 41, the driving motors 52, and the active weight portion motor 62, functions as a part of a vehicle body control system 40 for controlling posture of the vehicle body. The vehicle body tilt sensor 41 is formed by an acceleration sensor, a gyro sensor, or the like, and functions as an apparatus for measuring the tilt state of the vehicle body. The vehicle tilt sensor 41 detects the tilt angle and/or the tilt angular velocity of the vehicle body, which indicates the tilt state of the vehicle body, and sends the detected tilt angle and/or the detected tilt angular velocity to the main control ECU 21. The main control ECU 21 sends a driving torque command value to the driving wheel control ECU 22, and sends a thrust command value for the active weight portion to the active weight portion control ECU 23.

Note that a travel command is input from the joystick 31 of the input device 30 to the main control ECU 21. The main control ECU 21 sends a driving torque command value to the driving wheel control ECU 22, and sends a thrust command value for the active weight portion to the active weight portion control ECU 23.

The control ECU 20 functions as step resistance torque estimating means for estimating step resistance torque based on a change in traveling state of the vehicle 10 and in posture of the vehicle body with time. The control ECU 20 also functions as target vehicle body posture determining means for determining target posture of the vehicle body, that is, a target tilt state of the vehicle body and/or a target moving state of the active weight portion, in accordance with a target traveling state and step resistance torque. The control ECU 20 also functions as actuator output determining means for determining an output of each actuator in accordance with the traveling state of the vehicle 10 and the posture of the vehicle body, each obtained by the corresponding sensor, and the target traveling state, target posture of the vehicle body, and step resistance torque. Specifically, the control ECU 20 functions as step climbing torque determining means for determining driving torque to be added in accordance with step resistance torque, and center-of-gravity correction amount determining means for determining the amount of correction of the center of gravity of the vehicle body in accordance with step climbing torque.

Note that each sensor may be a sensor for obtaining a plurality of state quantities. For example, an acceleration sensor and a gyro sensor may be combined as the vehicle body tilt sensor 41, and the tilt angle and the tilt angular velocity of the vehicle body may be determined from the respective measured values of the acceleration sensor and the gyro sensor.

Operation of the vehicle 10 having the above structure will be described below. First, the outline of a traveling and posture control process will be described.

Figure 3A:
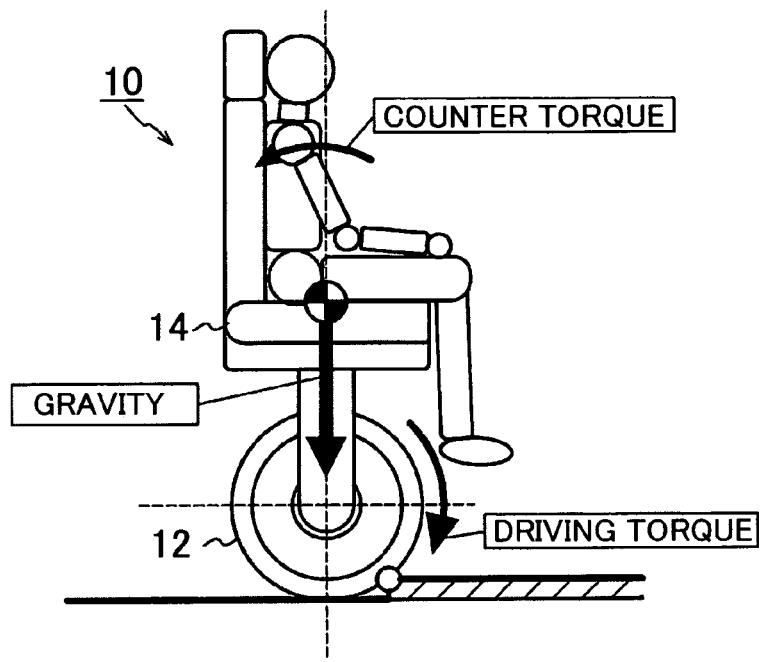
FIG. 3A shows a schematic diagram illustrating a step climbing operation of the vehicle according to an operation example of related art.
Figure 3B:
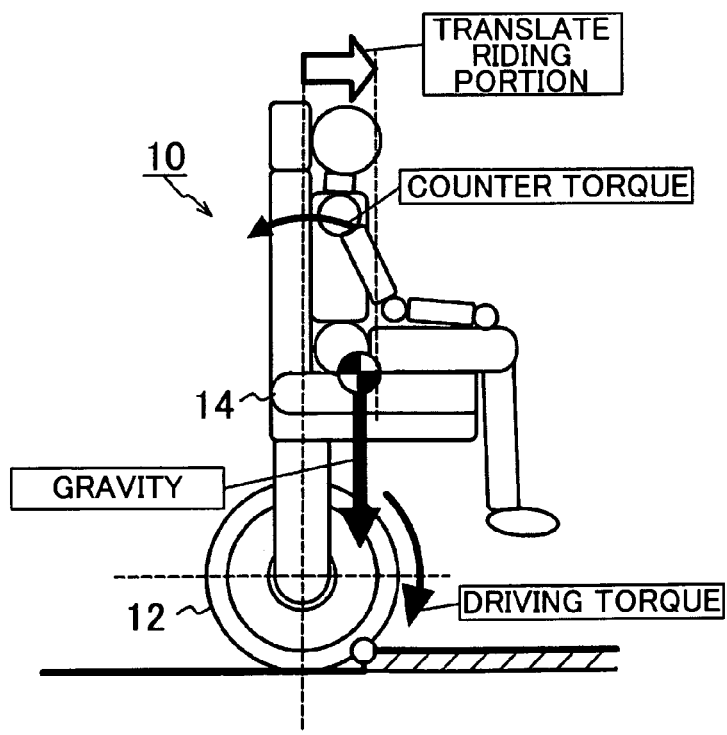
FIG. 3B shows a schematic diagram illustrating a step climbing operation of the vehicle according to the first embodiment of the present invention.
Figure 4:
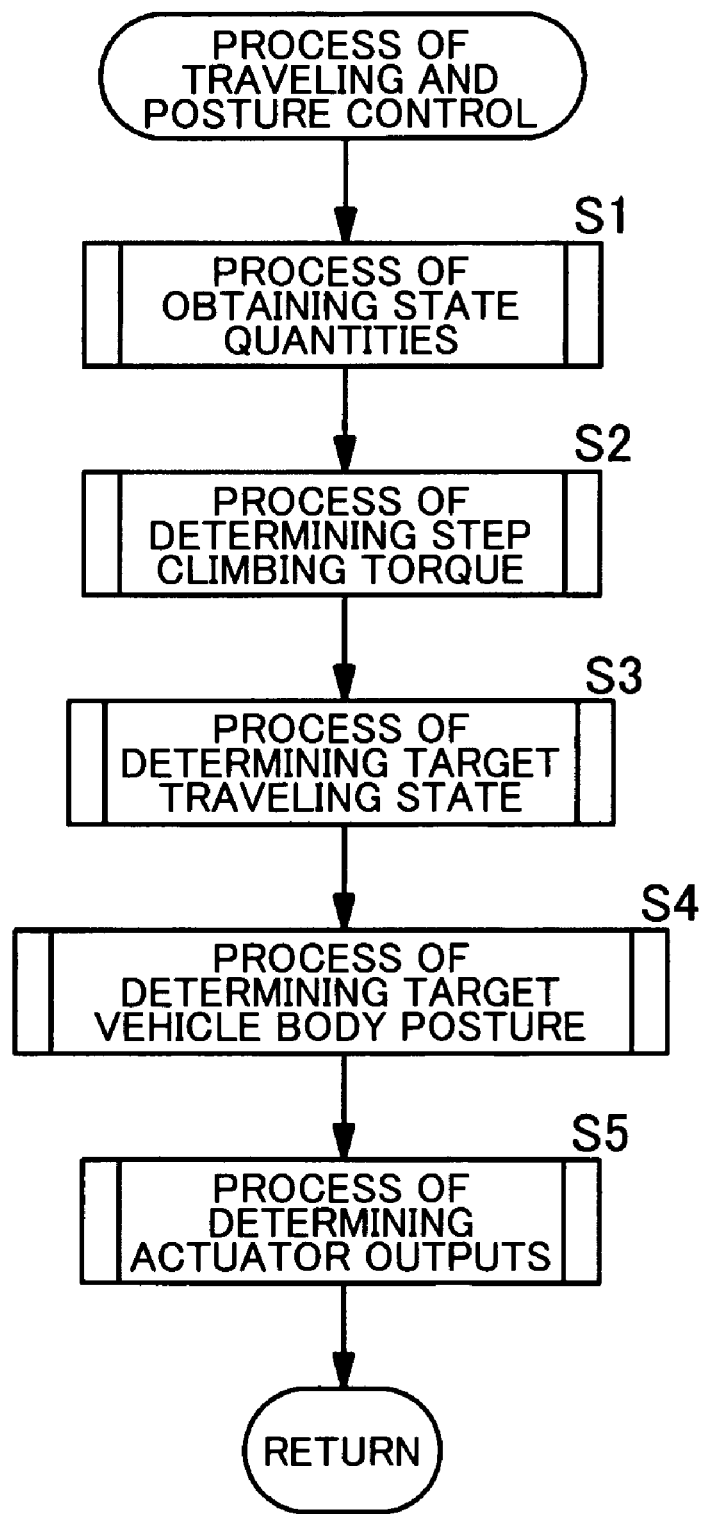
FIG. 4 is a flowchart illustrating an operation of a traveling and posture control process of the vehicle according to the first embodiment of the present invention.

FIG. 3 shows schematic diagrams illustrating a step climbing operation of the vehicle according to the first embodiment of the present invention. FIG. 4 is a flowchart illustrating an operation of the traveling and posture control process of the vehicle according to the first embodiment of the present invention. Note that FIG. 3A shows an operation example of related art for comparison, and FIG. 3B shows an operation of the present embodiment.

In such a conventional vehicle as described in "BACKGROUND ART," as shown in FIG. 3A, the vehicle body is subjected to a reaction force of the driving torque applied to the driving wheel 12 in order to climb up a step, that is, counter torque, whereby the vehicle body is tilted rearward. Thus, the posture of the vehicle body and the traveling of the vehicle cannot be stably controlled when climbing up a step.

On the other hand, in the present embodiment, the riding portion 14 functions as an active weight portion, and as shown in FIG. 3B, the position of the center of gravity of the vehicle 10 is actively corrected by moving the riding portion 14 longitudinally. Thus, when climbing up a step, the center of gravity of the vehicle body is moved forward. Therefore, the vehicle body is not tilted rearward even if the reaction force of the driving torque applied to the driving wheels 12 when climbing up a step, that is, the counter torque, is applied to the vehicle body. Thus, the posture of the vehicle body and the traveling of the vehicle can be stably controlled even when the vehicle 10 climbs up a step. The present embodiment is especially effective when the vehicle enters a step from the stopped state and from a low-speed traveling state.

The driving torque for climbing up a step is estimated and applied to the driving wheels 12 in real time during the climbing operation. Thus, the vehicle 10 is capable of stably climbing up a step of any shape.

That is, in the present embodiment, the vehicle 10 is capable of stably climbing up/down a step by executing the traveling and posture control process including correction of the position of the center of gravity of the vehicle 10 and application of the driving torque.

In the traveling and posture control process, the control ECU 20 first performs a process of obtaining state quantities (step S1). In this step, the control ECU 20 obtains the rotating state of the driving wheels 12, the tilt state of the vehicle body, and the moving state of the riding portion 14 by corresponding sensors, which are the driving wheel sensor 51, the vehicle tilt sensor 41, and the active weight portion sensor 61, respectively.

Then, the control ECU 20 performs a process of determining step climbing torque (step S2). In this step, the control ECU 20 estimates step resistance torque by an observer, based on the state quantities obtained in the state quantity obtaining process, which are the rotating state of the driving wheels 12, the tilt state of the vehicle body, and the moving state of the riding portion 14, and on the respective output values of the actuators, which are the respective output values of the driving motors 52 and the active weight portion motor 62, and determines the step climbing torque. The observer is a method for observing the internal state of a control system based on a dynamic model, and is formed by wired logic or soft logic.

Then, the control ECU 20 performs a process of determining a target traveling state (step S3). In this step, the control ECU 20 determines respective target values of the acceleration of the vehicle 10 and the rotation angular velocity of the driving wheels 12, based on the amount by which the joystick 31 is operated.

Then, the control ECU 20 performs a process of determining target vehicle body posture (step S4). In this step, the control ECU 20 determines a target value of the posture of the vehicle body, that is, respective target values of the tilt angle of the vehicle body and the position of the active weight portion, based on the step climbing torque determined in the process of determining step climbing torque, and the target value of the acceleration of the vehicle 10 determined by the process of determining a target traveling state.

Finally, the control ECU 20 performs a process of determining actuator outputs (step S5). In this step, the control ECU 20 determines respective outputs of the actuators, that is, respective outputs of the driving motors 52 and the active weight portion motor 62, based on the state quantities obtained by the process of obtaining state quantities, the step climbing torque determined by the process of determining step climbing torque, the target traveling state determined by the process of determining a target traveling state, and the target posture of the vehicle body determined by the process of determining target vehicle body posture.

The traveling and posture control process will be described in detail below. First, the process of obtaining state quantities will be described.

Figure 5:
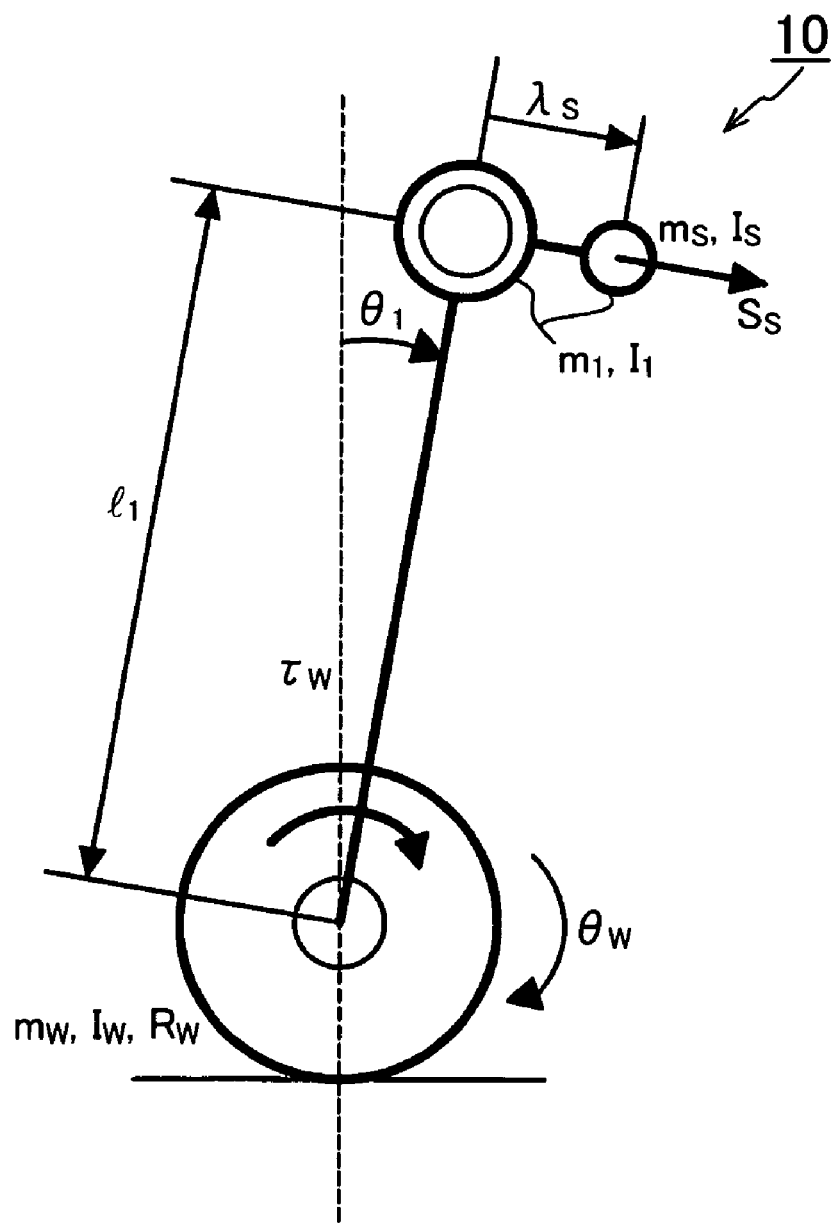
FIG. 5 is a diagram showing a dynamic model and its parameters in the vehicle according to the first embodiment of the present invention.
Figure 6:
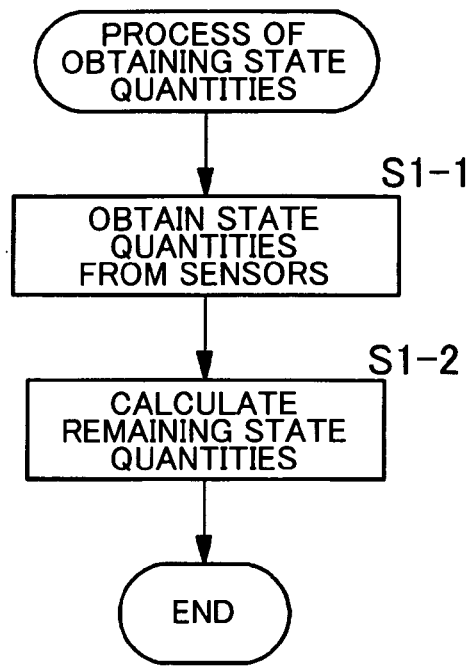
FIG. 6 is a flowchart illustrating an operation of a process of obtaining state quantities according to the first embodiment of the present invention.

FIG. 5 is a diagram showing a dynamic model and its parameters in the vehicle according to the first embodiment of the present invention. FIG. 6 is a flowchart illustrating an operation of the process of obtaining state quantities according to the first embodiment of the present invention.

In the present embodiment, the state quantities and the parameters are represented by the following characters. Note that FIG. 5 shows a part of the state quantities and the parameters.

$\theta_W$: rotation angle of the driving wheel [rad]
$\theta_1$: tilt angle of the vehicle body (with respect to a vertical axis) [rad]
$\lambda_S$: position of the active weight portion (with respect to the center point of the vehicle body) [m]
$\tau_W$: driving torque (the sum of two driving wheels) [Nm]
$S_S$: thrust for the active weight portion [N]
g: gravitational acceleration [m/s²]
$m_W$: mass of the driving wheels (the sum of two driving wheels) [kg]
$R_W$: ground radius of the driving wheel [m]
$I_W$: moment of inertia of the driving wheels (the sum of two driving wheels) [kgm²]
$D_W$: viscous damping coefficient for rotation of the driving wheels [Ns/rad]
$m_1$: mass of the vehicle body (including the active weight portion) [kg]
$l_1$: distance to the center of gravity of the vehicle body (from the axle) [m]
$I_1$: moment of inertia of the vehicle body (around the center of gravity) [kgm²]
$D_1$: viscous damping coefficient for the tilt of the vehicle body [Ns/rad]
$m_S$: mass of the active weight portion [kg]
$l_S$: distance to the center of gravity of the active weight portion (from the axle) [m]
$I_S$: moment of inertia of the active weight portion (around the center of gravity) [kgm²]
$D_S$: viscous damping coefficient for translation of the active weight portion [Ns/rad]

In the process of obtaining state quantities, the main control ECU 21 first obtains respective state quantities from the sensors (step S1-1). In this case, the main control ECU 21 obtains the rotation angle $\theta_W$ and/or the rotation angular velocity $\dot{\theta}_W$ from the driving wheel sensor 51, obtains the tilt angle $\theta_1$ and/or the tilt angular velocity $\dot{\theta}_1$ of the vehicle body from the vehicle body tilt sensor 41, and obtains the position $\lambda_S$ and/or the moving speed $\dot{\lambda}_S$ of the active weight portion from the active weight portion sensor 61.

Then, the main control ECU 21 calculates the remaining state quantities (step S1-2). In this case, the main control ECU 21 calculates the remaining state quantities by time-differentiating or time-integrating the obtained state quantities. For example, if the obtained state quantities are the rotation angle $\theta_W$ of the driving wheels, the tilt angle $\theta_1$ of the vehicle body, and the position $\lambda_S$ of the active weight portion, the rotation angular velocity $\dot{\theta}_W$, the tilt angular velocity $\dot{\theta}_1$, and the moving speed $\dot{\lambda}_S$ can be obtained by time-differentiating the rotation angle $\theta_W$, the tilt angle $\theta_1$, and the position $\lambda_S$, respectively. For example, if the obtained state quantities are the rotation angular velocity $\dot{\theta}_W$, the tilt angular velocity $\dot{\theta}_1$, and the moving speed $\dot{\lambda}_S$, the rotation angle $\theta_W$ of the driving wheels, the tilt angle $\theta_1$ of the vehicle body, and the position $\lambda_S$ of the active weight portion can be obtained by time-integrating the rotation angular velocity $\dot{\theta}_W$, the tilt angular velocity $\dot{\theta}_1$, and the moving speed $\dot{\lambda}_S$, respectively.

The process of determining step climbing torque will be described below.

Figure 7:
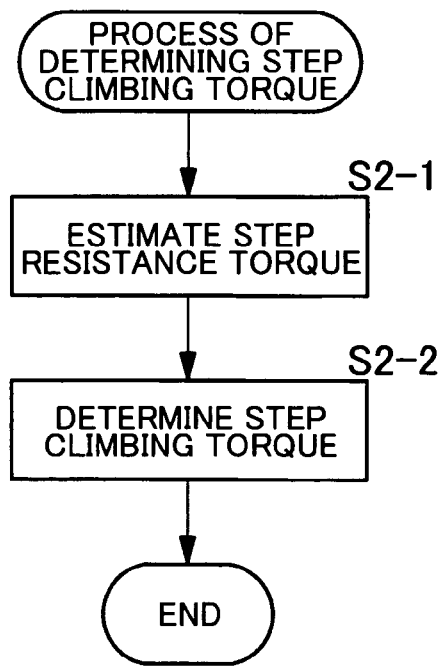
FIG. 7 is a flowchart illustrating an operation of a process of determining step climbing torque according to the first embodiment of the present invention.

FIG. 7 is a flowchart illustrating an operation of the process of determining step climbing torque according to the first embodiment of the present invention.

In the process of determining step climbing torque, the main control ECU 21 first estimates step resistance torque $\tau_D$ (step S2-1). In this case, the main control ECU 21 estimates the step resistance torque $\tau_D$ by the following expression (1) based on the state quantities obtained by the process of obtaining state quantities, and on the respective outputs of the actuators determined by the process of determining actuator outputs in the previous traveling and posture control process (the previous time step).

$$\tau_D = \tau_W - R_W(\tilde{M} R_W \ddot{\theta}_W + m_1 l_1 \ddot{\theta}_1 + m_S \ddot{\lambda}_S) \quad \text{Expression (1)}$$

$$\text{where } M = m_1 + m_W, \text{ and } \tilde{M} = M + \frac{I_W}{R_W^2}.$$

The accelerations $\ddot{\theta}_W$, $\ddot{\theta}_1$, and $\ddot{\lambda}_S$ are obtained by time-differentiating the rotation angular velocity $\dot{\theta}_W$ of the driving wheels, the tilt angular velocity $\dot{\theta}_1$ of the vehicle body, and the moving speed $\dot{\lambda}_S$ of the active weight portion, respectively.

Note that, in the expression (1), $(\tilde{M}R_W\ddot{\theta}_W + m_1 l_1 \ddot{\theta}_1 + m_S \ddot{\lambda}_S)$ represents an inertial force, where $\tilde{M}R_W\ddot{\theta}_W$ represents an inertial force of translation of the vehicle, $m_1 l_1 \ddot{\theta}_1$, represents an inertial force of the tilt of the vehicle body, and $m_S \ddot{\lambda}_S$, represents an inertial force of movement of the active weight portion. Thus, a change in posture of the vehicle body is considered by adding $m_1 l_1 \ddot{\theta}_1$ and $m_S \ddot{\lambda}_S$.

Then, the main control ECU 21 determines the step climbing torque $\tau_C$ (step S2-2). In this case, the main control ECU 21 determines the estimated value of the step resistance torque $\tau_D$ as the value of the step climbing torque $\tau_C$. That is, $\tau_C = \tau_D$.

Thus, in the present embodiment, the step resistance torque is estimated based on the output driving torque of the driving motors 52, and on the rotation angular acceleration of the driving wheels, the tilt angular acceleration of the vehicle body, and the acceleration of the movement of the active weight portion, which indicate the translational acceleration of the vehicle as state quantities. In this case, not only the rotation angular acceleration of the driving wheels, which indicates the rotating state of the driving wheels 12, but also the tilt angular acceleration of the vehicle body and the acceleration of the movement of the active weight portion, which indicate a change in posture of the vehicle body, are considered. That is, a change in posture of the vehicle body, which is a factor specific to vehicles using posture control of an inverted pendulum, which are so-called inverted vehicles.

Conventionally, the step resistance torque is estimated based on the driving torque and the rotation angular acceleration of the driving wheel. Thus, a large error can be caused in the estimated value of the step resistance torque especially when the posture of the vehicle body changes. However, in the present embodiment, the tilt angular acceleration of the vehicle body and the acceleration of the movement of the active weight portion, which indicate a change in posture of the vehicle body, are also considered to estimate the step resistance torque. Thus, the step resistance torque can be estimated accurately without causing such a large error.

Typically, in inverted vehicles, the center of gravity of the vehicle body moves longitudinally relative to the driving wheels. Thus, the center of gravity of the vehicle may move longitudinally even if the driving wheels are stopped. Thus, the influence of such longitudinal movement need be considered in order to accurately estimate the step resistance torque from the acceleration of the center of gravity and from the driving force or the driving torque. In typical inverted vehicles, the weight ratio of the vehicle body to the entire vehicle is high, and the posture changes significantly during step climbing operation, thereby increasing the above influence.

In the present embodiment, the step resistance torque is continuously estimated during step climbing operation. For example, if a certain amount of driving torque is applied to the driving wheels 12 during the step climbing operation, the vehicle 10 can be unnecessarily accelerated or decelerated just before the step climbing operation is completed. This occurs because, when, e.g., climbing up a step, the step resistance torque decreases as the vehicle 10 climbs up the step. Thus, in the present embodiment, the step resistance torque, which changes with the step climbing state, is estimated in real time, and the estimated value is continuously updated, whereby the step climbing torque suitable for the step climbing operation is always applied.

Note that high frequency components of the estimated value of the step resistance torque can be removed by low-pass filtering the estimated value. This delays the estimation, but can suppress fluctuation due to the high frequency components.

Although only the inertial force is considered in the present embodiment, the rolling resistance of the driving wheels 12, the viscous resistance due to friction of the rotation shaft, the air resistance to the vehicle 10, or the like may be considered as secondary influences.

Although a linear model for the rotational movement of the driving wheels 12 is used in the present embodiment, a more accurate nonlinear model may be used, or models for tilting movement of the vehicle body and translation of the active weight portion may be used. Note that, for nonlinear models, functions may be applied in a map form.

A change in posture of the vehicle body need not necessarily be considered for simplification of calculation.

The process of determining a target traveling state will be described below.

Figure 8:
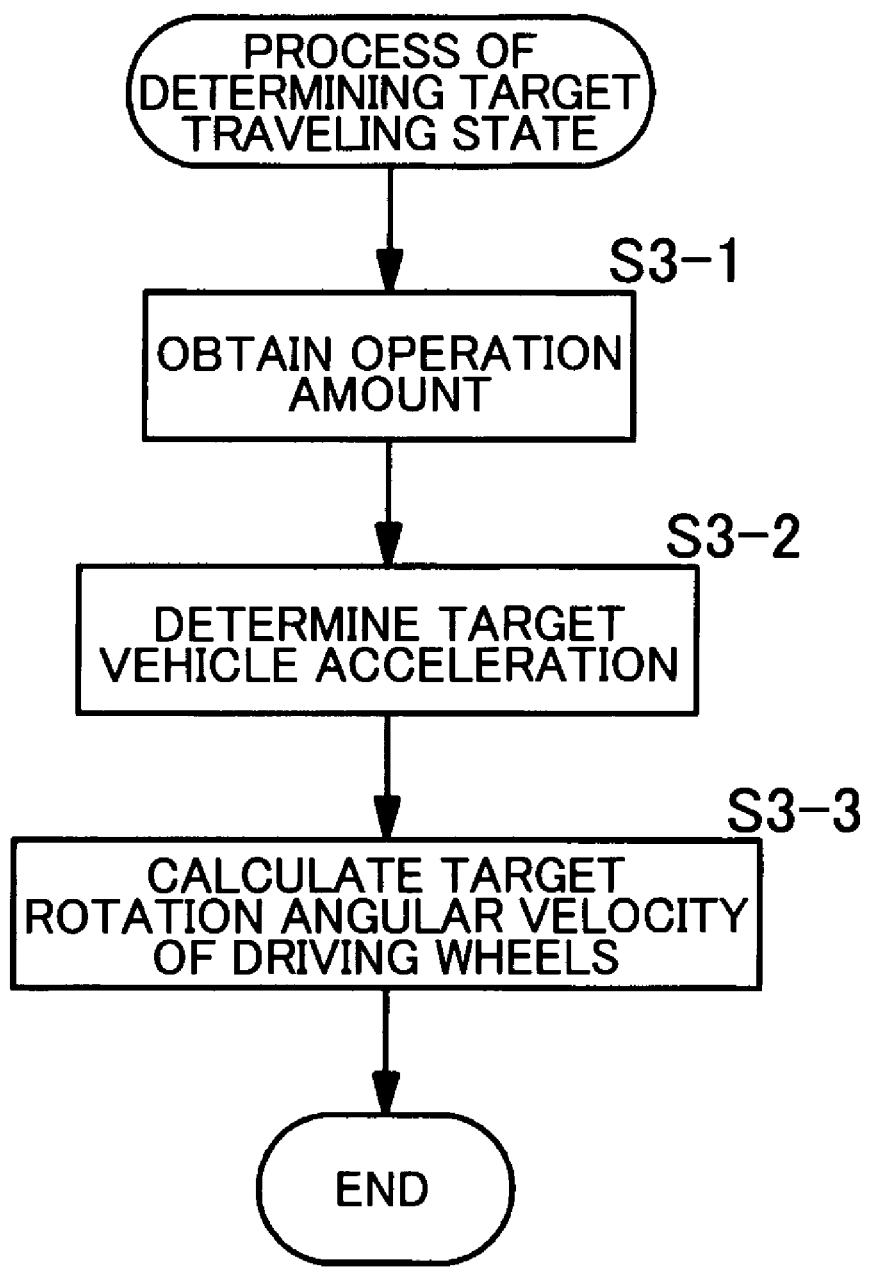
FIG. 8 is a flowchart illustrating an operation of a process of determining a target traveling state according to the first embodiment of the present invention.

FIG. 8 is a flowchart illustrating an operation of the process of determining a target traveling state in the first embodiment of the present invention.

In the process of determining a target traveling state, the main control ECU 21 first obtains the amount of operation (step S3-1). In this case, the main control ECU 21 obtains the amount by which the occupant 15 has operated the joystick 31 to input a travel command such as acceleration, deceleration, turning, in-situ rotation, stop, or braking of the vehicle 10.

Then, the main control ECU 21 determines a target value of vehicle acceleration based on the obtained operation amount of the joystick 31 (step S3-2). For example, a value proportional to the operation amount of the joystick 31 in the longitudinal direction is used as the target value of the vehicle acceleration.

Thereafter, the main control ECU 21 calculates a target value of the rotation angular velocity of the driving wheels from the determined target value of the vehicle acceleration (step S3-3). For example, the main control ECU 21 calculates the target value of the rotation angular velocity by time-integrating the target value of the vehicle acceleration, and dividing the resultant value by the ground radius $R_W$ of the driving wheel.

The process of determining target vehicle body posture will be described below.

Figure 9:
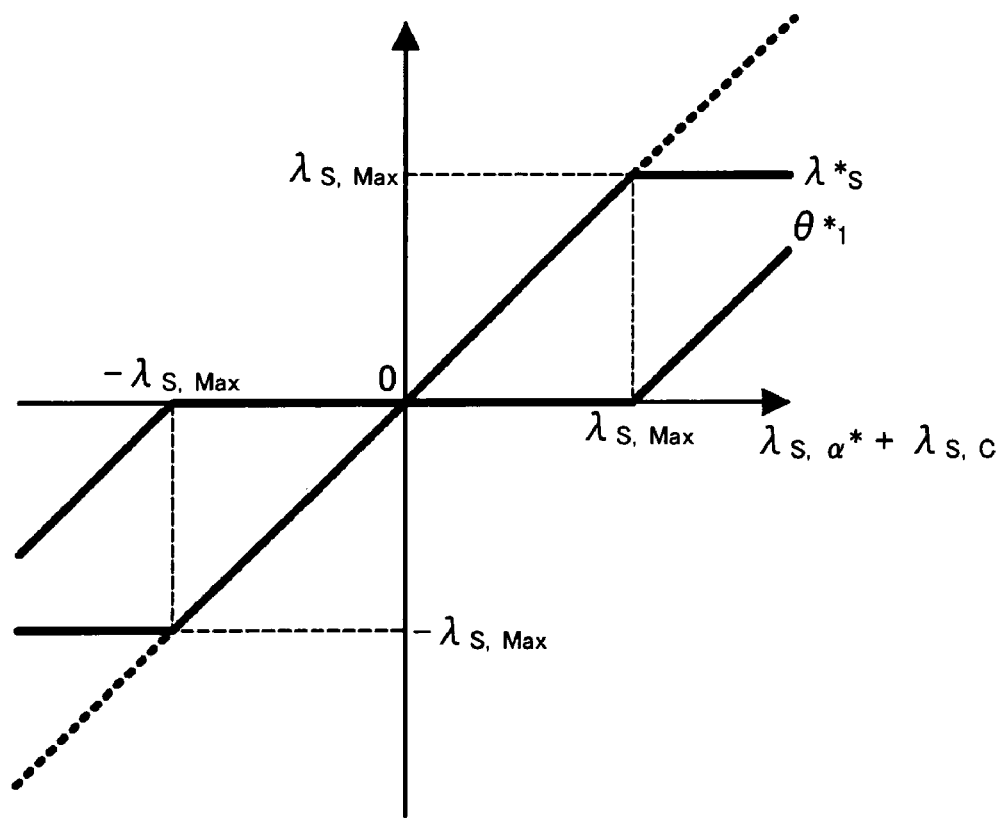
FIG. 9 is a graph showing a change in a target value of the position of an active weight portion, and a change in a target value of the tilt angle of a vehicle body according to the first embodiment of the present invention.
Figure 10:
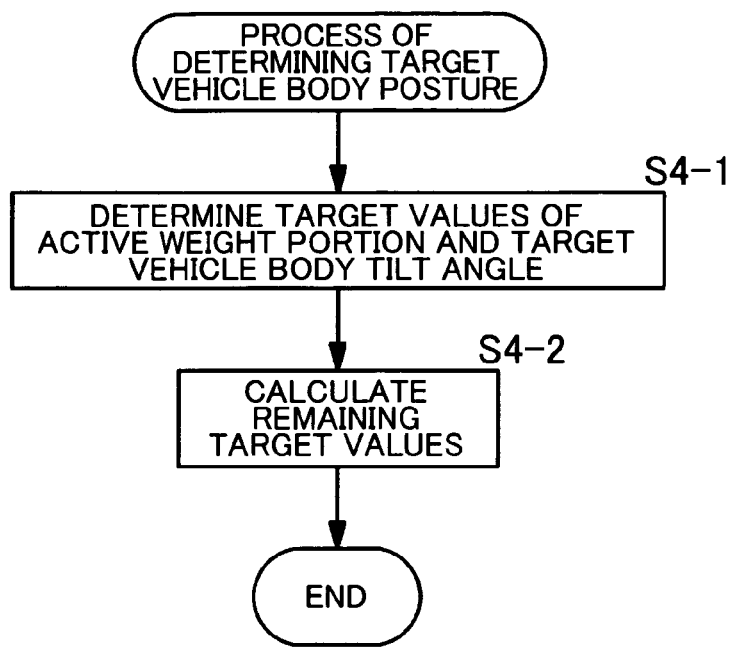
FIG. 10 is a flowchart illustrating an operation of a process of determining target vehicle body posture according to the first embodiment of the present invention.

FIG. 9 is a graph showing a change in a target value of the position of the active weight portion, and a change in a target value of the tilt angle of the vehicle body according to the first embodiment of the present invention. FIG. 10 is a flowchart illustrating an operation of the process of determining target vehicle body posture according to the first embodiment of the present invention.

In the process of determining target vehicle body posture, the main control ECU 21 first determines a target value of the position of the active weight portion, and a target value of the tilt angle of the vehicle body (step S4-1). In this case, the main control ECU 21 determines the target value of the position of the active weight portion and the target value of the tilt angle of the vehicle body by the following expressions (2) and (3), based on the target value of the vehicle acceleration determined by the process of determining a target traveling state and on the step climbing torque $\tau_C$ obtained by the process of determining step climbing torque.

Provided that $\alpha^*[G]$ indicates the target value of the vehicle acceleration, the target value $\lambda_S^*$ of the position of the active weight portion is represented by the following expression (2).

$$\lambda_S^* = \begin{cases} -\lambda_{S,Max} & (\lambda_{S,\alpha}^* + \lambda_{S,C} \leq -\lambda_{S,Max}) \\ \lambda_{S,\alpha}^* + \lambda_{S,C} & (-\lambda_{S,Max} < \lambda_{S,\alpha}^* + \lambda_{S,C} < \lambda_{S,Max}) \\ \lambda_{S,Max} & (\lambda_{S,\alpha}^* + \lambda_{S,C} \geq \lambda_{S,Max}) \end{cases} \quad \text{Expression (2)}$$

$$\text{where } \lambda_{S,\alpha}^* = \frac{m_1 l_1 \tilde{M} R_W}{m_S} \alpha^* \text{ and } \lambda_{S,C} = \frac{\tau_C}{m_S g}.$$

$\lambda_{S,Max}$ indicates the limit of movement of the active weight portion, and is predetermined based on the structure of the moving mechanism for moving the riding portion 14 as the active weight portion, and the like.

$\lambda_{S,\alpha}^*$ indicates the amount of movement of the active weight portion, which is required to balance the vehicle body against the inertial force and the counter torque of the driving motors, which are associated with the vehicle acceleration. That is, $\lambda_{S,\alpha}^*$ indicates the amount of movement that cancels the influence of acceleration/deceleration of the vehicle 10.

On the other hand, $\lambda_{S,C}$ indicates the amount of movement of the active weight portion, which is required to balance the vehicle body against the counter torque of the step climbing torque $\tau_C$ in accordance with the step resistance torque $\tau_D$. That is, $\lambda_{S,C}$ indicates the amount of movement that cancels the influence of the step resistance torque $\tau_D$.

The target value $\theta_1^*$ of the tilt angle of the vehicle body is represented by the following expression (3).

$$\theta_1^* = \quad \text{Expression (3)}$$

$$\begin{cases} \theta_{1,\alpha}^* + \theta_{1,C} + \theta_{S,Max} & (\lambda_{S,\alpha}^* + \lambda_{S,C} \leq -\lambda_{S,Max}) \\ 0 & (-\lambda_{S,Max} < \lambda_{S,\alpha}^* + \lambda_{S,C} < \lambda_{S,Max}) \\ \theta_{1,\alpha}^* + \theta_{1,C} - \theta_{S,Max} & (\lambda_{S,\alpha}^* + \lambda_{S,C} \geq \lambda_{S,Max}) \end{cases}$$

where $\theta_{1,\alpha}^* = \dfrac{m_1 l_1 + M\tilde{R}_W}{m_1 l_1}\alpha^*$, $\theta_{1,C} = \dfrac{\tau_C}{m_1 g l_1}$, and $\theta_{S,Max} = \dfrac{m_S \lambda_{S,Max}}{m_1 l_1}$.

$\theta_{S,Max}$ indicates the tilt angle of the vehicle body, which is calculated so as to correspond to the effect of moving the riding portion 14 as the active weight portion to the moving limit $\lambda_{S,Max}$ of the active weight portion, and is a portion for subtracting the amount by which the riding portion 14 has been moved.

$\theta_{1,\alpha}^*$ indicates the tilt angle of the vehicle body, which is required to balance the vehicle body against the inertial force and the counter torque of the driving motors, which are associated with the vehicle acceleration. That is, $\theta_{1,\alpha}^*$ indicates the tilt angle that cancels the influence of acceleration/deceleration of the vehicle 10.

On the other hand, $\theta_{1,C}$ indicates the tilt angle of the vehicle body, which is required to balance the vehicle body against the counter torque of the step climbing torque $\tau_C$ in accordance with the step resistance torque $\tau_D$. That is, $\theta_{1,C}$ indicates the tilt angle that cancels the influence of the step resistance torque $\tau_D$.

Then, the main control ECU 21 calculates the remaining target values (step S4-2). That is, the main control ECU 21 calculates the respective target values of the rotation angle of the driving wheels, the tilt angular velocity of the vehicle body, and the moving speed of the active weight portion by time-differentiating or time-integrating each target value.

Thus, in the present embodiment, not only the inertial force and the counter torque of the driving motors, which are applied to the vehicle body due to the vehicle acceleration, but also the counter torque, which is applied to the vehicle body due to the step climbing torque $\tau_C$ in accordance with the step resistance torque $\tau_D$, are considered to determine the target value of the posture of the vehicle body, that is, the respective target values of the position of the active weight portion and the tilt angle of the vehicle body.

At this time, the center of gravity of the vehicle body is moved so as to cancel the torque that is applied to the vehicle body to tilt the vehicle body, that is, the vehicle body tilting torque, by the action of the gravity. For example, when the vehicle 10 climbs up a step, the riding portion 14 is moved forward, or the vehicle body is also tilted forward. When the vehicle 10 climbs down a step, the riding portion 14 is moved rearward, or the vehicle body is also tilted rearward.

In the present embodiment, as shown in FIG. 9, the riding portion 14 is first moved without tilting the vehicle body. The vehicle body starts being tilted when the riding portion 14 reaches the moving limit of the active weight portion. Thus, the vehicle body is neither tilted forward nor backward in response to very small acceleration/deceleration, whereby riding comfort of the occupant 15 is improved. Moreover, the vehicle body remains upright even on a step unless the step is significantly high. Thus, the field of vision of the occupant 15 can be easily secured. Moreover, the vehicle body is not tilted greatly even on a step unless the step is significantly high. This prevents a part of the vehicle body from contacting the road surface.

Note that, in the present embodiment, it is assumed that the moving limit of the active weight portion is equal in the forward and backward directions. However, if the moving limit of the active weight portion is different between the forward and backward directions, whether to tilt the vehicle body or not may be switched in accordance with each limit. For example, in order to make braking performance higher than accelerating performance, the rearward moving limit of the active weight portion needs to be located at a position farther than that of the forward moving limit thereof.

In the present embodiment, when the acceleration is low or the height of the step is low, the vehicle body tilting torque of vehicle 10 is cancelled by merely moving the riding portion 14. However, a part or all of the vehicle body tilting torque of the vehicle 10 may be cancelled by tilting the vehicle body. Tilting the vehicle body can reduce a longitudinal inertial force that is applied to the occupant 15.

Although the expressions based on the linear dynamic model are used in the present embodiment, expressions based on a more accurate nonlinear model or a model produced in view of the viscous resistance may be used. Note that in the case of nonlinear expressions, functions may be applied in a map form.

The process of determining actuator outputs will be described below.

Figure 11:
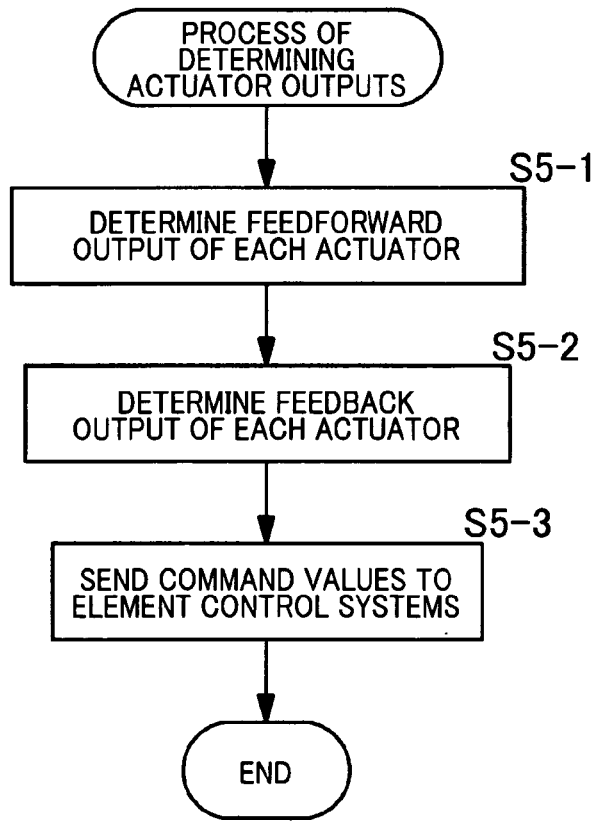
FIG. 11 is a flowchart illustrating an operation of a process of determining actuator outputs according to the first embodiment of the present invention.

FIG. 11 is a flowchart illustrating an operation of the process of determining actuator outputs in the first embodiment of the present invention.

In the process of determining actuator outputs, the main control ECU 21 first determines respective feedforward outputs of the actuators (step S5-1). In this case, the main control ECU 21 determines the feedforward output of the driving motors 52 by the following expression (4) based on each target value and the step climbing torque $\tau_C$, and determines the feedforward output of the active weight portion motor 62 by the following expression (5).

The feedforward output $\tau_{W,FF}$ of the driving motors 52 is represented by the following expression (4).

$$\tau_{W,FF} = \tilde{M}\tilde{R}_W g\alpha^* + \tau_C \quad \text{Expression (4)}$$

$\tilde{M}\tilde{R}_W g\alpha^*$ indicates the driving torque required to implement the target value $\alpha^*$ of the vehicle acceleration, and $\tau_C$ indicates the driving torque required to climb up/down a step, that is, the step climbing torque.

Automatically adding the step climbing torque $\tau_C$ in accordance with the step resistance torque $\tau_D$, that is, correcting the driving torque in accordance with the step resistance torque $\tau_D$, can provide an operation feeling similar to that on the level ground, even when climbing up/down a step. That is, the vehicle 10 can climb up/down a step by an operation similar to that on the level ground. Moreover, even if the joystick 31 is operated in a certain manner, the vehicle 10 is not unnecessarily accelerated or decelerated when climbing up/down a step.

The feedforward output $S_{S,FF}$ of the active weight portion motor 62 is represented by the following expression (5).

$$S_{S,FF} = -m_S g \theta_1^* + m_S g \alpha^* \quad \text{Expression (5)}$$

$-m_S g \theta_1^*$ indicates thrust for the riding portion, which is required to hold the riding portion 14 at a target position for the target value $\theta_1^*$ of the tilt angle of the vehicle body. $m_S g \alpha^*$ indicates thrust for the riding portion, which is required to hold the riding portion 14 at a target position for the inertial force associated with the target value $\alpha^*$ of the vehicle acceleration.

Thus, in the present embodiment, more accurate control is implemented by theoretically applying feedforward outputs.

Note that, if necessary, the feedforward outputs may be omitted. In this case, values close to the feedforward outputs are indirectly applied with a steady-state deviation by feedback control. The steady-state deviation can be reduced by applying an integral gain.

Then, the main control ECU 21 determines respective feedback outputs of the actuators (step S5-2). In this case, the main control ECU 21 determines the feedback output of the driving motors 52 by the following expression (6), and determines the feedback output of the active weight portion motor 62 by the following expression (7), based on the deviation between each target value and an actual state quantity.

The feedback output $\tau_{W,FB}$ of the driving motors 52 is represented by the following expression (6).

$$\tau_{W,FB} = -K_{W1}(\theta_W - \theta^*_W) - K_{W2}(\dot{\theta}_W - \dot{\theta}^*_W) - K_{W3}(\theta_1 - \theta^*_1) - K_{W4}(\dot{\theta}_1 - \dot{\theta}^*_1) - K_{W5}(\lambda_S - \lambda^*_S) - K_{W6}(\dot{\lambda}_S - \dot{\lambda}^*_S) \quad \text{Expression (6)}$$

$K_{W1}$ to $K_{W6}$ indicate feedback gains. For example, optimal regulator values are set as the feedback gains in advance.

Note that * indicates a target value.

The feedback output $S_{S,FB}$ of the active weight portion motor 62 is represented by the following expression (7).

$$S_{S,FB} = -K_{S1}(\theta_W - \theta^*_W) - K_{S2}(\dot{\theta}_W - \dot{\theta}^*_W) - K_{S3}(\theta_1 - \theta^*_1) - K_{S4}(\dot{\theta}_1 - \dot{\theta}^*_1) - K_{S5}(\lambda_S - \lambda^*_S) - K_{S6}(\dot{\lambda}_S - \dot{\lambda}^*_S) \quad \text{Expression (7)}$$

$K_{S1}$ to $K_{S6}$ indicate feedback gains. For example, optimal regulator values are set as the feedback gains in advance.

Note that * indicates a target value.

Note that nonlinear feedback control, such as sliding mode control, may be introduced. As simpler control, some of the feedback gains other than $K_{W2}$, $K_{W3}$, and $K_{S5}$ may be set to zero. An integral gain may be introduced in order to eliminate a steady-state deviation.

Finally, the main control ECU 21 sends a command value to each element control system (step S5-3). In this case, the main control ECU 21 transmits the respective sums of the feedforward outputs and the feedback outputs, which are determined as described above, to the driving wheel control ECU 22 and the active weight portion control ECU 23 as a driving torque command value, and a thrust command value for the active weight portion, respectively.

Thus, in the present embodiment, the step resistance torque $\tau_D$ is estimated by the observer, the step climbing toque $\tau_C$ is applied, and the riding portion 14 is moved in the upper direction of a step. Thus, the vehicle body can be held upright even on the step, whereby the vehicle 10 can climb up and down a step. Moreover, no apparatus for measuring a step is required, whereby the system configuration can be simplified, and the cost is reduced.

Moreover, the step climbing torque $\tau_C$ is estimated in view of the tilt angle $\theta_1$ of the vehicle body and the position $\lambda_S$ of the active weight portion, which indicate the posture of the vehicle body. Thus, the step climbing torque $\tau_C$ can be estimated with very high accuracy without causing a large error.

Note that the present embodiment is effective not only when climbing up a step, but also when climbing down a step. Acceleration of the vehicle 10 when climbing down a step is suppressed by applying the step climbing torque, and the vehicle body is held upright by moving the riding portion 14 rearward. The same applies to second to eighths embodiments described below.

A second embodiment of the present invention will be described below. Note that elements having the same structure as that of the first embodiment are denoted with the same reference characters, and description thereof will be omitted. Description of the same operations and the same effects as those of the first embodiment will also be omitted.

Figure 12:
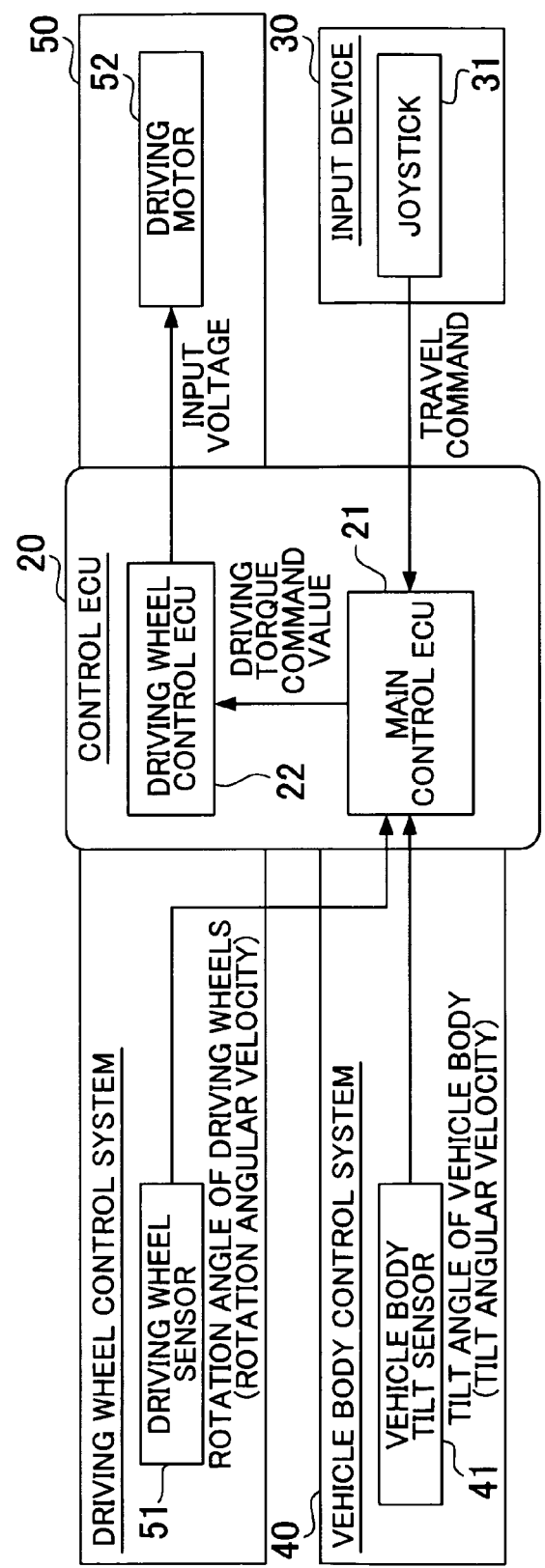
FIG. 12 is a block diagram showing the structure of a control system of a vehicle according to a second embodiment of the present invention.
Figure 13:
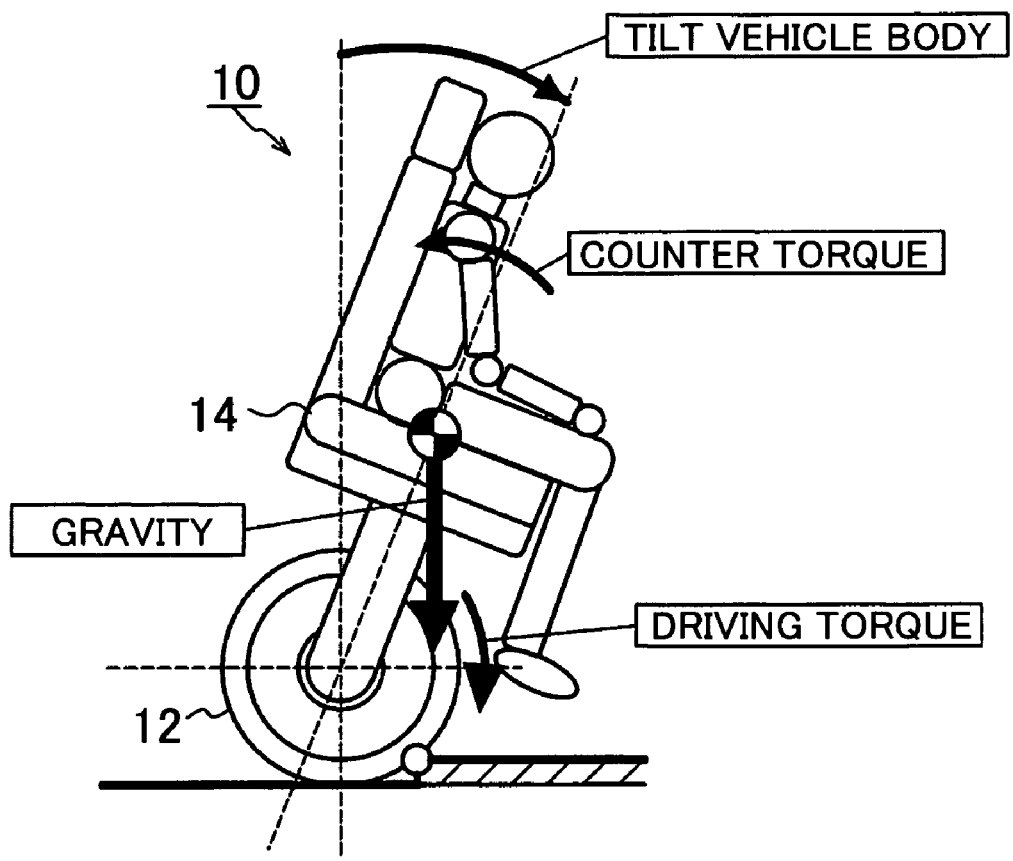
FIG. 13 is a schematic diagram showing a step climbing operation of the vehicle according to the second embodiment of the present invention.

FIG. 12 is a block diagram showing the structure of a control system of a vehicle according to the second embodiment of the present invention. FIG. 13 is a schematic diagram showing a step climbing operation of the vehicle according to the second embodiment of the present invention.

In the first embodiment, the riding portion 14 is attached so as to be able to translate relative to the main body 11 in the longitudinal direction of the vehicle 10, and functions as an active weight portion. In this case, the moving mechanism having the active weight portion motor 62 is provided to translate the riding portion 14. This complicates the structure, increases the cost and the weight, and also complicates the control system. On the other hand, the first embodiment may not be applied to inverted vehicles having no moving mechanism for moving the riding portion 14.

Thus, the moving mechanism for moving the riding portion 14 is omitted in the present embodiment. As shown in FIG. 12, the active weight portion control system 60 is omitted from the control system, and the active weight portion control ECU 23, the active weight portion sensor 61, and the active weight portion motor 62 are omitted. Note that, since the structure is otherwise similar to that of the first embodiment, description thereof will be omitted.

When climbing up/down a step, driving torque is applied to the driving wheels 12 to climb up/down the step. That is, step climbing torque is applied to the driving wheels 12. At this time, vehicle body tilting torque is applied as counter torque to the vehicle body as a reaction force of the step climbing torque. In the present embodiment, as shown in FIG. 13, the vehicle body is tilted in the upper direction of the step by an angle corresponding to the step climbing torque, whereby the vehicle body tilting torque is cancelled by the action of the gravity, and the vehicle 10 is balanced.

Note that, as described in "BACKGROUND ART," if required driving torque is applied to the driving wheel when, e.g., climbing up a step, the vehicle body is subjected to a reaction force. Thus, the vehicle body is tilted greatly in a direction opposite to the step, that is, in the lower direction of the step. On the other hand, if it is desired to keep the posture of the vehicle body upright, required driving torque cannot be applied to the driving wheel, whereby the vehicle cannot climb up the step. A similar phenomenon occurs when climbing down a step, whereby the vehicle body is tilted forward.

On the other hand, in the present embodiment, the vehicle body is intentionally tilted in the upward direction of a step by an angle suitable for the height of the step. Thus, stable posture of the vehicle body can be maintained even when climbing up/down a step, and the occupant 15 can operate the vehicle 10 safely and comfortably even on a place having steps.

A traveling and posture control process of the present embodiment will be described in detail below. Note that the outline of the traveling and posture control process and the process of determining a target traveling state are similar to those of the first embodiment, and description thereof will be omitted. Only a process of obtaining state qualities, a process of determining step climbing torque, a process of determining target vehicle body posture, and a process of determining an actuator output will be described. First, the process of obtaining state quantities will be described.

Figure 14:
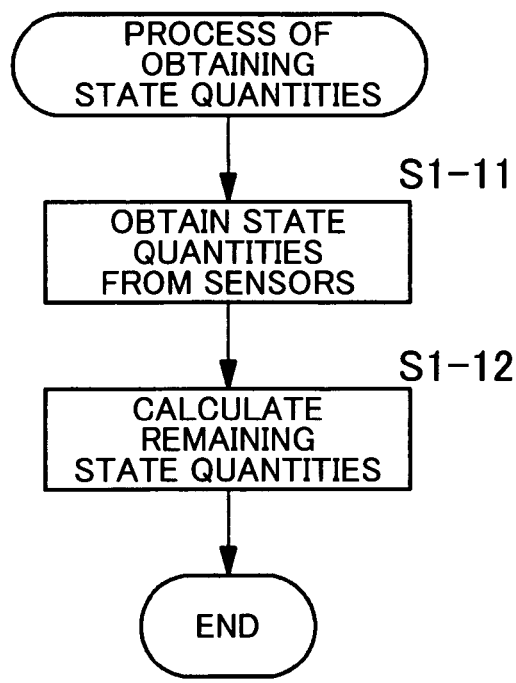
FIG. 14 is a flowchart illustrating an operation of a process of obtaining state quantities according to the second embodiment of the present invention.

FIG. 14 is a flowchart illustrating an operation of the process of obtaining state quantities in the second embodiment of the present invention.

In the process of obtaining state quantities, the main control ECU 21 first obtains respective state quantities from sensors (step S1-11). In this case, the main control ECU 21 obtains the rotation angle $\theta_W$ and/or the rotation angular velocity $\dot{\theta}_W$ from the driving wheel sensor 51, and obtains the tilt angle $\theta_1$ and/or the tilt angular velocity $\dot{\theta}_1$ of the vehicle body from the vehicle body tilt sensor 41.

Then, the main control ECU 21 calculates the remaining state quantities (step S1-12). In this case, the main control ECU 21 calculates the remaining state quantities by time-differentiating or time-integrating the obtained state quantities. For example, if the obtained state quantities are the rotation angle $\theta_W$ of the driving wheels and the tilt angle $\theta_1$ of the vehicle body, the rotation angular velocity $\dot{\theta}_W$ and the tilt angular velocity $\dot{\theta}_1$ can be obtained by time-differentiating the rotation angle $\theta_W$ and the tilt angle $\theta_1$, respectively. For example, if the obtained state quantities are the rotation angular velocity $\dot{\theta}_W$ and the tilt angular velocity $\dot{\theta}_1$, the rotation angle $\theta_W$ of the driving wheels and the tilt angle $\theta_1$ of the vehicle body can be obtained by time-integrating the rotation angular velocity $\dot{\theta}_W$ and the tilt angular velocity $\dot{\theta}_1$, respectively.

The process of determining step climbing torque will be described below.

Figure 15:
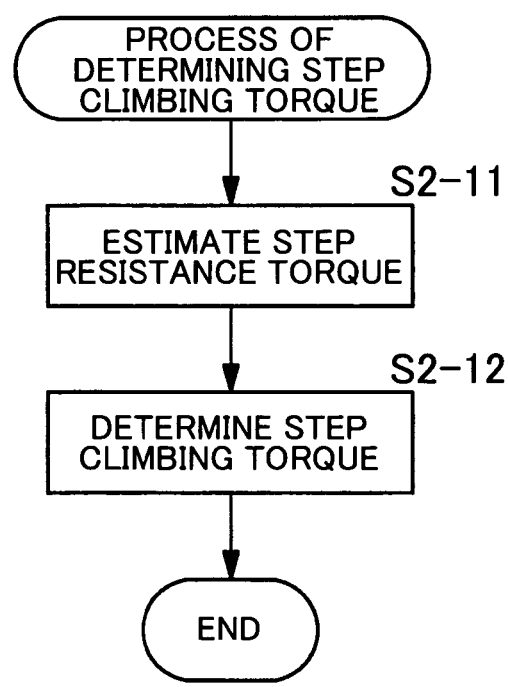
FIG. 15 is a flowchart illustrating an operation of a process of determining step climbing torque according to the second embodiment of the present invention.

FIG. 15 is a flowchart illustrating an operation of the process of determining step climbing torque according to the second embodiment of the present invention.

In the process of determining step climbing torque, the main control ECU 21 estimates step resistance torque $\tau_D$ (step S2-11). In this case, the main control ECU 21 estimates the step resistance torque $\tau_D$ by the following expression (8) based on the state quantities obtained by the process of obtaining state quantities, and on the respective outputs of the actuators determined by the process of determining actuator outputs in the previous traveling and posture control process (the previous time step).

$$\tau_D = \tau_W - R_W(\tilde{M} R_W \ddot{\theta}_W + m_1 l_1 \ddot{\theta}_1) \quad \text{Expression (8)}$$

where $M = m_1 + m_W$, and $\tilde{M} = M + \dfrac{I_W}{R_W^2}$.

$\ddot{\theta}_W$ and $\ddot{\theta}_1$ are obtained by time-differentiating the rotation angular velocity $\dot{\theta}_W$ of the driving wheels and the tilt angular velocity $\dot{\theta}_1$ of the vehicle body.

Note that, in the expression (8), ($\tilde{M} R_W \ddot{\theta}_W + m_1 l_1 \ddot{\theta}_1$) represents an inertial force, where ($\tilde{M} R_W \ddot{\theta}_W$) represents an inertial force of translation of the vehicle, and $m_1 l_1 \ddot{\theta}_1$ represents an inertial force of the tilt of the vehicle body. Thus, a change in posture of the vehicle body is considered by adding $m_1 l_1 \ddot{\theta}_1$.

Then, the main control ECU 21 determines step climbing torque $\tau_C$ (step S2-12). In this case, the main control ECU 21 determines the estimated value of the step resistance torque $\tau_D$ as the value of the step climbing torque $\tau_C$. That is, $\tau_C = \tau_D$.

Thus, in the present embodiment, the step resistance torque is estimated based on the output driving torque of the driving motors 52, and on the rotation angular acceleration of the driving wheels and the tilt angular acceleration of the vehicle body, which are state quantities. In this case, not only the rotation angular acceleration of the driving wheels, which indicates the rotating state of the driving wheels 12, but also the tilt angular acceleration of the vehicle body, which indicates a change in posture of the vehicle body, are considered. That is, a change in posture of the vehicle body, which is a factor specific to vehicles using posture control of an inverted pendulum, which are so-called inverted vehicles.

Conventionally, the step resistance torque is estimated based on the driving torque and the rotation angular acceleration of the driving wheel. Thus, a large error can be caused in the estimated value of the step resistance torque especially when the posture of the vehicle body changes greatly. However, in the present embodiment, the tilt angular acceleration of the vehicle body, which indicates a change in posture of the vehicle body, is considered so as to estimate the step resistance torque. Thus, the step resistance torque can be estimated accurately without causing such a large error.

In the present embodiment, the step resistance torque is continuously estimated during step climbing operation. For example, if a certain amount of driving torque is applied to the driving wheels 12 during the step climbing operation, the vehicle 10 can be unnecessarily accelerated or decelerated just before the step climbing operation is completed. This occurs because, when, e.g., climbing up a step, the step resistance torque decreases as the vehicle 10 climbs up the step. Thus, in the present embodiment, the step resistance torque, which changes with the step climbing state, is estimated in real time, and the estimated value is continuously updated, whereby the step climbing torque suitable for the step climbing operation is always applied.

Note that high frequency components of the estimated value of the step resistance torque can be removed by low-pass filtering the estimated value. This delays the estimation, but can suppress fluctuation due to the high frequency components.

Although only the inertial force is considered in the present embodiment, the rolling resistance of the driving wheels 12, the viscous resistance due to friction of the rotation shaft, the air resistance to the vehicle 10, or the like may be considered as secondary influences.

A more accurate nonlinear model may be used, or a model for tilting movement of the vehicle body may be used. Note that, for nonlinear models, functions may be applied in a map form.

A change in posture of the vehicle body need not necessarily be considered for simplification of calculation.

The process of determining target vehicle body posture will be described below.

Figure 16:
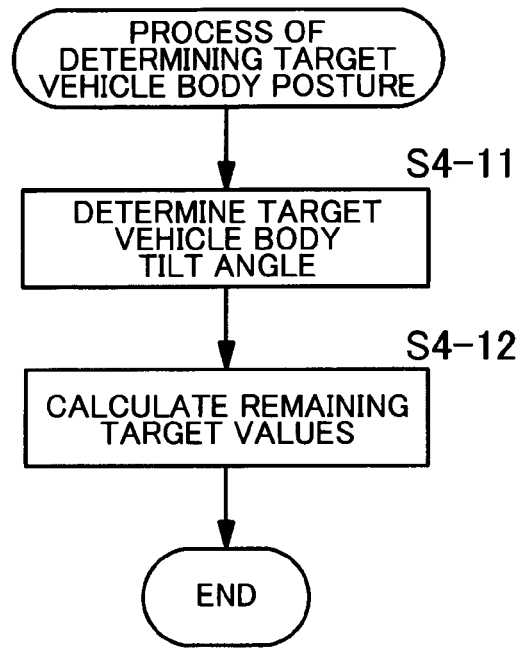
FIG. 16 is a flowchart illustiating an operation of a process of determining target vehicle body posture according to the second embodiment of the present invention.

FIG. 16 is a flowchart illustrating an operation of the process of determining target vehicle body posture according to the second embodiment of the present invention.

In the process of determining target vehicle body posture, the main control

ECU 21 first determines a target value of the tilt angle of the vehicle body (step S4-11). In this case, the main control ECU 21 determines the target value of the tilt angle of the vehicle body by the following expression (9), based on the target value of the vehicle acceleration determined by the process of determining a target traveling state, and on the step climbing torque $\tau_C$ obtained by the process of determining step climbing torque.

The target value of the tilt angle of the vehicle body is represented by the following expression (9).

$$\cdots \quad \text{Expression (9)}$$

where and .

$\theta_{1,\alpha^*}$ indicates the tilt angle of the vehicle body, which is required to balance the vehicle body against the inertial force and the counter torque of the driving motors, which are associated with the vehicle acceleration. That is, $\theta_{1,\alpha^*}$ indicates the tilt angle that cancels the influence of acceleration/deceleration of the vehicle 10.

On the other hand, $\theta_{1,C}$ indicates the tilt angle of the vehicle body, which is required to balance the vehicle body against the counter torque of the step climbing torque $\tau C$ in accordance with the step resistance torque τD. That is, θ1,C indicates the tilt angle that cancels the influence of the step resistance torque τD.

Then, the main control ECU 21 calculates the remaining target values (step S4-12). That is, the main control ECU 21 calculates the respective target values of the rotation angle of the driving wheels and the tilt angular velocity of the vehicle body by time-differentiating or time-integrating each target value.

Thus, in the present embodiment, not only the inertial force and the counter torque of the driving motors, which are applied to the vehicle body due to the vehicle acceleration, but also the counter torque, which is applied to the vehicle body due to the step climbing torque $\tau_C$ in accordance with the step resistance torque $\tau_D$, are considered to determine the target value of the posture of the vehicle body, that is, the target value of the tilt angle of the vehicle body.

At this time, the center of gravity of the vehicle body is moved so as to cancel the vehicle body tilting torque by the action of the gravity. For example, the vehicle body is tilted forward when the vehicle 10 accelerates and when the vehicle 10 climbs up a step. The vehicle body is tilted rearward when the vehicle 10 decelerates and when the vehicle 10 climbs down a step.

Note that, although the expressions based on the linear dynamic model are used in the present embodiment, expressions based on a more accurate nonlinear model or a model produced in view of the viscous resistance may be used. Note that in the case of nonlinear expressions, functions may be applied in a map form.

The process of determining an actuator output will be described below.

Figure 17:
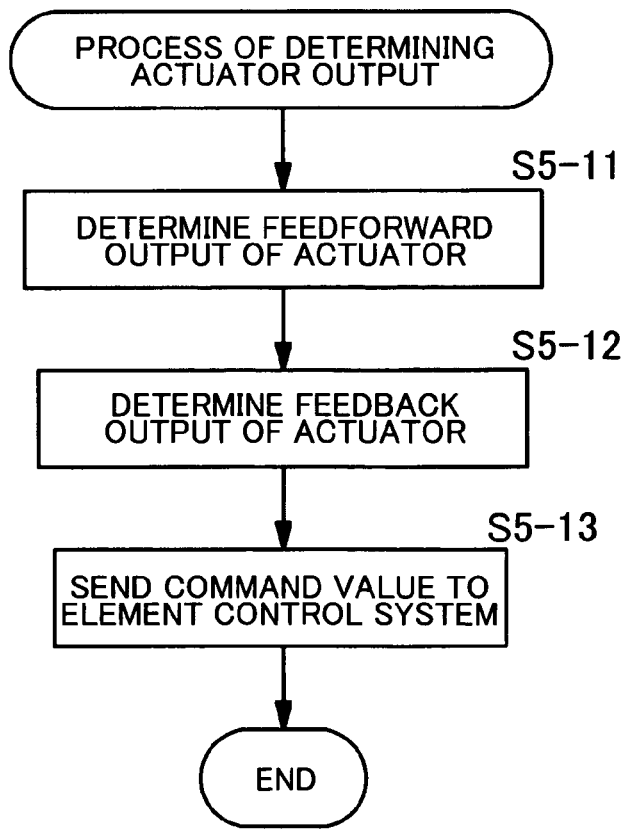
FIG. 17 is a flowchart illustrating an operation of a process of determining actuator output according to the second embodiment of the present invention.

FIG. 17 is a flowchart illustrating an operation of the process of determining an actuator output in the second embodiment of the present invention.

In the process of determining an actuator output, the main control ECU 21 first determines a feedforward output of an actuator (step S5-11). In this case, the main control ECU 21 determines the feedforward output of the driving motors 52 by the expression (4) described above in the first embodiment, based on the target value and the step climbing torque $\tau_C$.

As shown by the expression (4), automatically adding the step climbing torque $\tau_C$ in accordance with the step resistance torque $\tau_D$ can provide an operation feeling similar to that on the level ground, even when climbing up/down a step. That is, the vehicle 10 can climb up/down a step by an operation similar to that on the level ground. Moreover, even if the joystick 31 is operated in a certain manner, the vehicle 10 is not unnecessarily accelerated or decelerated when climbing up/down a step.

Note that, in the present embodiment, more accurate control is implemented by theoretically applying a feedforward output. However, if necessary, the feedforward output may be omitted. In this case, a value close to the feedforward output is indirectly applied with a steady-state deviation by feedback control. The steady-state deviation can be reduced by applying an integral gain.

Then, the main control ECU 21 determines a feedback output of the actuator (step S5-12). In this case, the main control ECU 21 determines the feedback output of the driving motors 52 by the following expression (10), based on the deviation between each target value and an actual state quantity.

The feedback output $\tau_{W,FB}$ of the driving motors 52 is represented by the following expression (10).

$$\tau_{W,FB} = -K_{W1}(\theta_W - \theta^*_W) - K_{W2}(\dot{\theta}_W - \dot{\theta}^*_W) - K_{W3}(\theta_1 - \theta^*_1) - K_{W4}(\dot{\theta}_1 - \dot{\theta}^*_1)$$  Expression (10)

$K_{W1}$ to $K_{W4}$ indicate feedback gains. For example, optimal regulator values are set as the feedback gains in advance. Note that * indicates a target value.

Note that nonlinear feedback control, such as sliding mode control, may be introduced. As simpler control, some of the feedback gains other than $K_{W2}$ and $K_{W3}$ may be set to zero. An integral gain may be introduced in order to eliminate a steady-state deviation.

Finally, the main control ECU 21 sends a command value to an element control system (step S5-13). In this case, the main control ECU 21 sends the sum of the feedforward output and the feedback output, which are determined as described above, to the driving wheel control ECU 22 as a driving torque command value.

Thus, in the present embodiment, the vehicle body can be tilted in the upper direction of a step to keep balance when climbing up/down the step. Thus, the present embodiment may be applied to inverted vehicles having no moving mechanism for moving the riding portion 14. By simplifying the structure and the control system, a stable step climbing operation can be implemented even in inexpensive, lightweight inverted vehicles.

A third embodiment of the present invention will be described below. Note that elements having the same structure as that of the first and second embodiments are denoted with the same reference characters, and description thereof will be omitted. Description of the same operations and the same effects as those of the first and second embodiments will also be omitted.

Figure 19C:
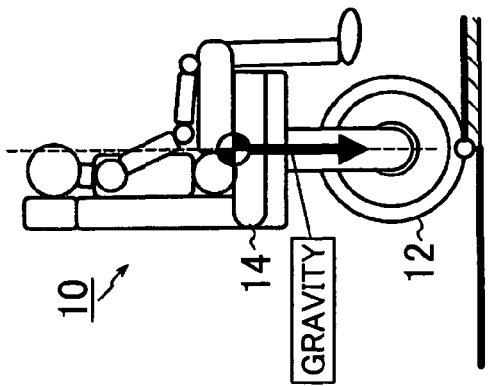
FIGS. 19A, 19B and 19C show schematic diagrams illustrating a step climbing operation of the vehicle according to the third embodiment of the present invention.
Figure 19B:
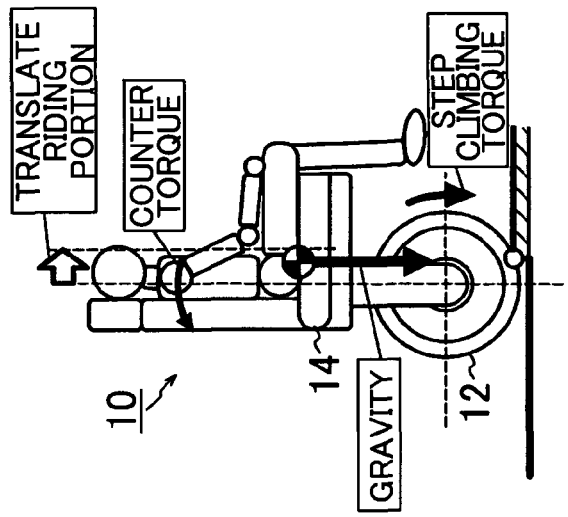
Figure 19A:
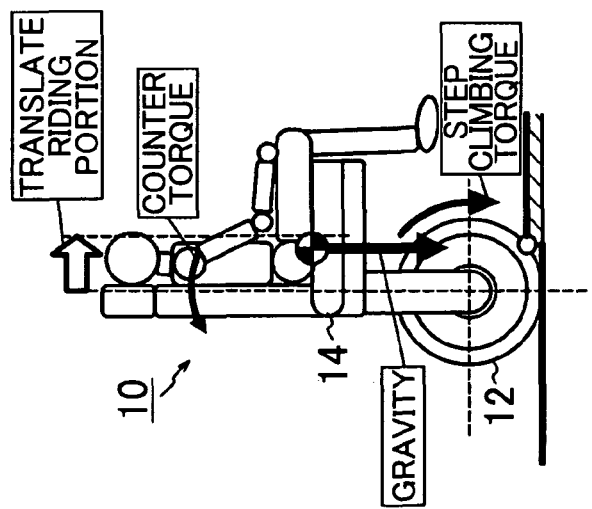
Figure 20:
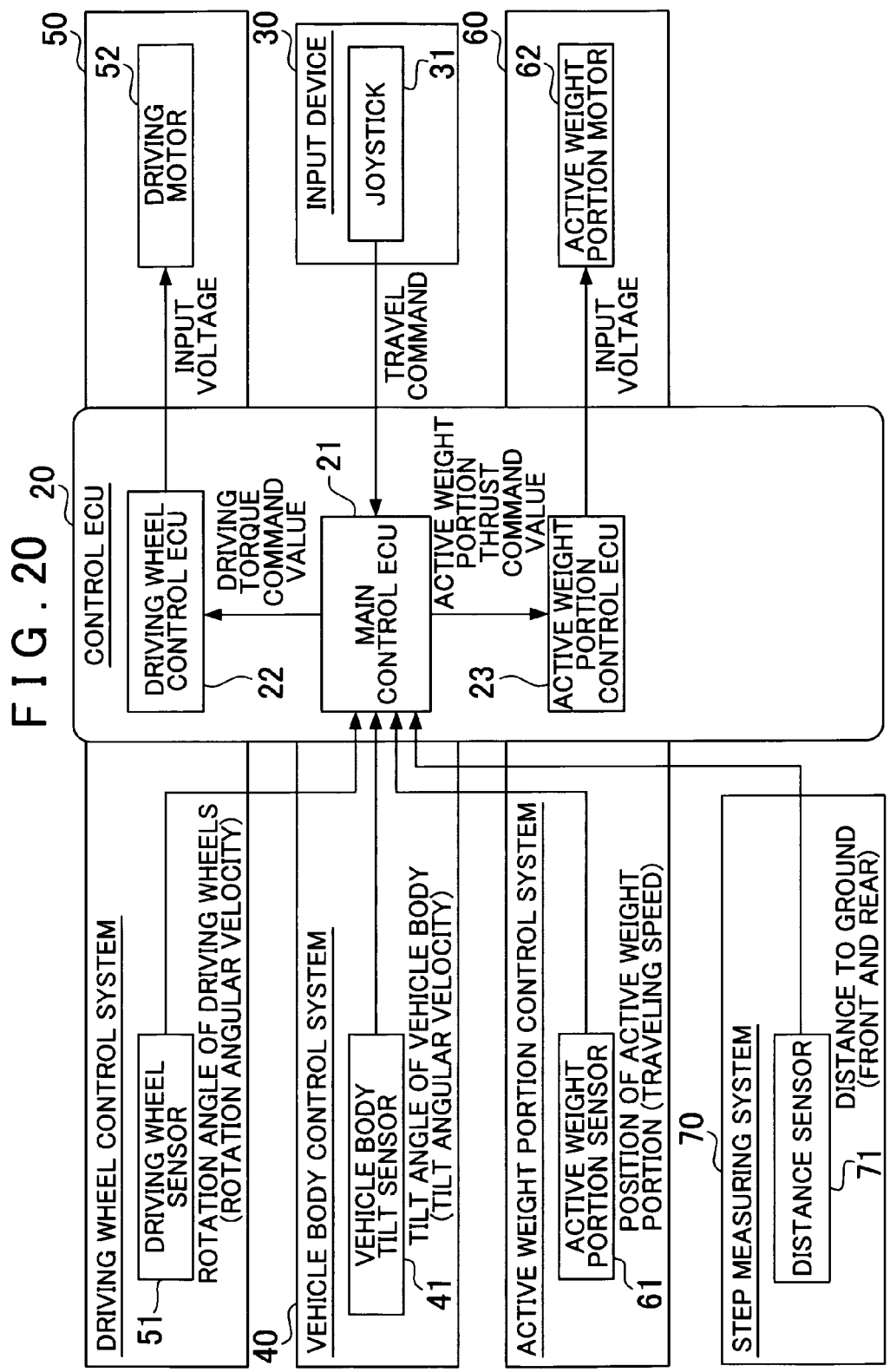
FIG. 20 is a block diagram showing the structure of a control system of the vehicle according to the third embodiment of the present invention.

FIG. 18 shows schematic diagrams of the structure of a vehicle according to the third embodiment of the present invention, showing the state where the vehicle detects a step located ahead of the vehicle. FIG. 19 shows schematic diagrams illustrating a step climbing operation of the vehicle according to the third embodiment of the present invention. FIG. 20 is a block diagram showing the structure of a control system of the vehicle according to the third embodiment of the present invention. Note that FIG. 18B is an enlarged view of a main part of FIG. 18A, and FIGS. 19A to 19C are diagrams illustrating a series of operations.

If fixed driving torque is applied to the driving wheels 12 during the step climbing operation, the vehicle 10 can be unnecessarily accelerated or decelerated right before the step climbing operation is completed. This is because, in the case of, e.g., climbing up a step, the step resistance torque decreases as the vehicle 10 climbs up the step.

Thus, in the present embodiment, a step in the traveling direction of the vehicle 10 is detected by a sensor, and the step climbing torque is changed in accordance with the position and height of the step measured by the sensor, and the rotation angle of the driving wheels corresponding to the step climbing state.

Therefore, in the present embodiment, as shown in FIG. 18, the vehicle 10 has distance sensors 71 as step measuring sensors. The distance sensors 71 are, e.g., sensors using laser light, but may be any type of sensors. In the example shown in FIG. 18, two distance sensors 71 are positioned on the lower surface of the riding portion 14 so as to be spaced apart longitudinally. Each distance sensor 71 measures the distance from the lower surface of the riding portion 14 to the road surface. Based on a change in the measured value of each distance sensor 71, a step on the road can be detected, and the position and height of the detected step can be obtained. It is desirable to position the distance sensors 71 so that one distance sensor 71 is located ahead of the respective contact parts of the driving wheels 12 with the road surface, and the other distance sensor 71 is located behind the respective contact parts of the driving wheels 12 with the road surface. Since the two distance sensors 71 measure the distance to the road surface at the positions located ahead of and behind the respective contact parts of the driving wheels 12 with the ground, steps located ahead of and behind the vehicle 10 can be detected.

As shown in FIG. 20, the vehicle 10 has a step measuring system 70 including the distance sensors 71. The distance sensors 71 detect the distance to the ground as the distance to the road surface at the two positions (the front and rear positions), and send to the main control ECU 21 the detected distances to the ground.

Thus, when, e.g., climbing up a step, as shown in FIG. 19, the traveling amount of the riding portion 14, the driving torque for climbing up the step, and the like are changed as the vehicle 10 climbs up the step, whereby the posture of the vehicle body and the traveling can be stably controlled.

The traveling and posture control process in the present embodiment will be described in detail below. Note that, since the outline of the traveling and posture control process, the process of obtaining state quantities, the process of determining a target traveling state, the process of determining target vehicle body posture, and the process of determining actuator outputs are similar to those of the first embodiment, description thereof will be omitted, and only the process of determining step climbing torque will be described below.

Figure 21:
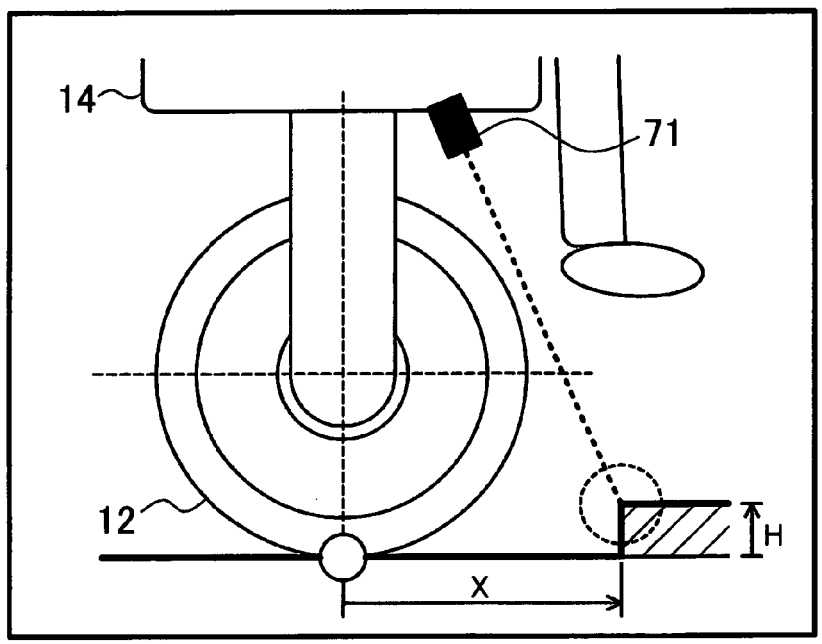
FIG. 21 is a diagram showing geometric conditions when measuring an ascending step according to the third embodiment of the present invention.
Figure 22:
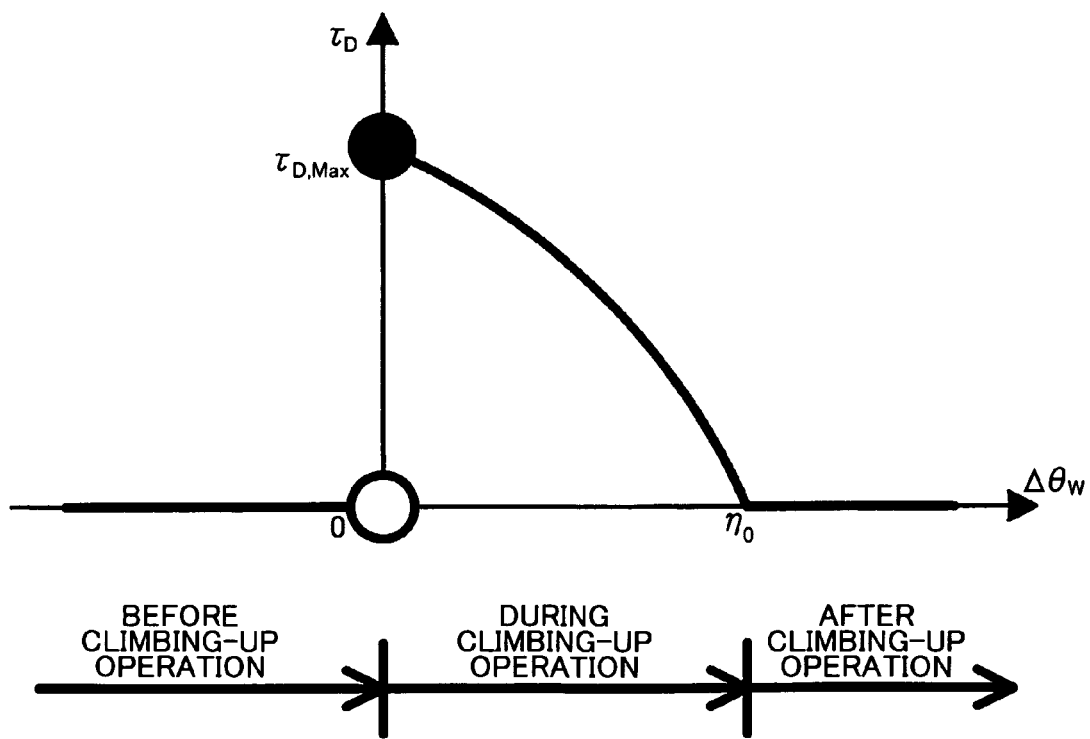
FIG. 22 is a graph showing a change in step climbing resistivity of an ascending step according to the third embodiment of the present invention.
Figure 23:
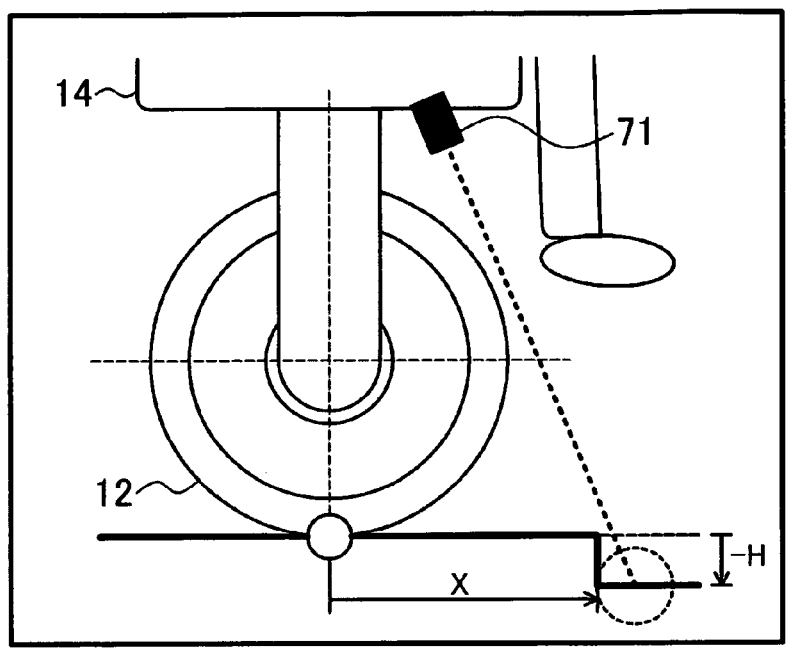
FIG. 23 is a diagram showing geometric conditions when measuring a descending step according to the third embodiment of the present invention.
Figure 24:
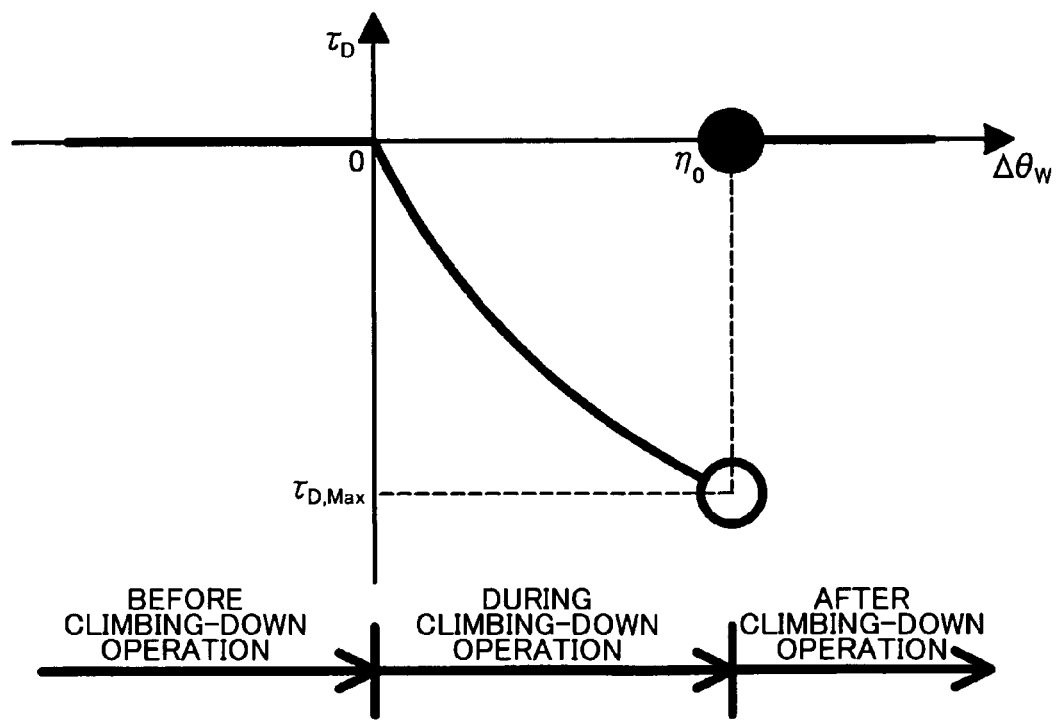
FIG. 24 is a graph showing a change in step climbing resistivity of a descending step according to the third embodiment of the present invention.
Figure 25:
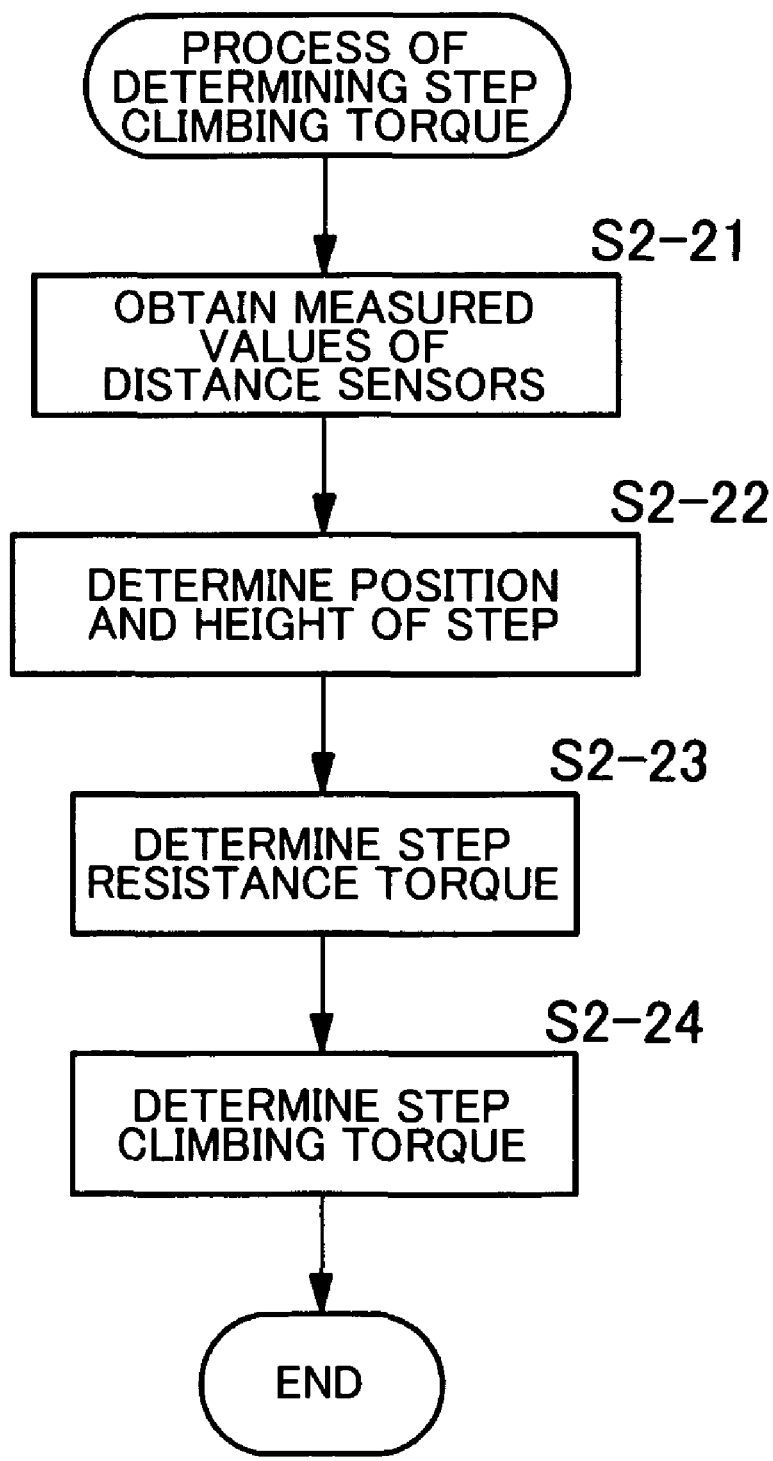
FIG. 25 is a flowchart illustrating an operation of a process of determining step climbing torque according to the third embodiment of the present invention.

FIG. 21 is a diagram showing geometric conditions when measuring an ascending step in the third embodiment of the present invention. FIG. 22 is a graph showing a change in step climbing resistivity of an ascending step according to the third embodiment of the present invention. FIG. 23 is a diagram showing geometric conditions when measuring a descending step according to the third embodiment of the present invention. FIG. 24 is a graph showing a change in step climbing resistivity of a descending step according to the third embodiment of the present invention. FIG. 25 is a flowchart illustrating an operation of the process of determining step climbing torque according to the third embodiment of the present invention.

In the process of determining step climbing torque, the main control ECU 21 first obtains the respective measured values of the distance sensors 71 (step S2-21). In this case, the main control ECU 21 obtains the respective measured values of the distance to the ground from the front and rear distance sensors 71.

Then, the main control ECU 21 determines the position and height of a step (step S2-22). In the case, the main control ECU 21 determines the position and height of the step based on the time history of the respective distances to the ground obtained from the distance sensors 71, the tilt angle $\theta_1$ of the vehicle body, and the position of the riding portion 14, that is, the position $\lambda_S$ of the active weight portion.

Then, the main control ECU 21 determines step resistance torque $\tau_D$ (step S2-23). In this case, the main control ECU 21 calculates the step resistance torque $\tau_D$ by the following expression (11).

$$\tau_D = \xi \tau_{D,Max} \qquad \text{Expression (11)}$$

where $\tau_{D,Max}$ indicates the maximum step resistance torque, and $\xi$ indicates the step climbing resistivity.

As shown in FIG. 21, when the step is an ascending step, that is, when the vehicle 10 climbs up the step, the maximum step resistance torque $\tau_{D,Max}$ and the step climbing resistivity $\xi$ are represented by the following expressions (12) and (13), respectively. Note that, in FIG. 21, X indicates the distance to the step upon detection of the step, and H indicates the height of the step. H is zero or more in the case of an ascending step.

$$\tau_{D,Max} = MgR_W \sin \eta_0 \qquad \text{Expression (12)}$$

$$\xi = \begin{cases} \dfrac{\sin(\eta_0 - \Delta\theta_W)}{\sin\eta_0} & (0 \le \Delta\theta_W \le \eta_0) \\ 0 & (\Delta\theta_W < 0, \Delta\theta_W > \eta_o) \end{cases} \qquad \text{Expression (13)}$$

where $\eta_0 = \cos^{-1}\left(1 - \dfrac{H}{R_W}\right)$, $\Delta\theta_W = \theta_W - \theta_{W,S}$, and $\theta_{W,S} = \theta_{W,0} + \dfrac{X}{R_W} - \sin\eta_0$.

Note that $\eta_0$ indicates a virtual uphill angle, and corresponds to the rotation angle of the driving wheels, which is required to climb up the step. $\theta_{W,S}$ indicates a rotation angle of the driving wheels when the driving wheels 12 contact the step. $\theta_{W,0}$ indicates a rotation angle of the driving wheels upon detection of the step. $\Delta\theta_W$ indicates a rotation angle of the driving wheels after the driving wheels contact the step. $\Delta\theta_W$ becomes zero when the driving wheels 12 contact the step.

The value of the step resistance torque $\tau_D$ changes as shown in FIG. 22. That is, the step resistance torque $\tau_D$ becomes the maximum value $\tau_{D,Max}$ when the driving wheels 12 contact the step. The step resistance torque $\tau_D$ gradually decreases while the vehicle 10 is climbing up the step, and becomes zero, which is the minimum value, upon completion of the climbing up operation.

As shown in FIG. 23, when the step is a descending step, that is, when the vehicle 10 climbs down the step, the maximum step resistance torque $\tau_{D,Max}$ and the step climbing resistivity $\xi$ are represented by the following expressions (14) and (15), respectively. Note that, in FIG. 23 as well, X indicates the distance to the step upon detection of the step, and H indicates the height of the step. However, H is less than zero, that is, has a negative value, in the case of a descending step.

$$\tau_{D,Max} = -MgR_W \sin \eta_0 \qquad \text{Expression (14)}$$

$$\xi = \begin{cases} \dfrac{\sin\Delta\theta_W}{\sin\eta_0} & (0 \le \Delta\theta_W \le \eta_0) \\ 0 & (\Delta\theta_W < 0, \Delta\theta_W \ge \eta_o) \end{cases} \qquad \text{Expression (15)}$$

where $\eta_0 = \cos^{-1}\left(1 - \dfrac{-H}{R_W}\right)$, $\Delta\theta_W = \theta_W - \theta_{W,S}$, and $\theta_{W,S} = \theta_{W,0} + \dfrac{X}{R_W}$.

The value of the step resistance torque $\tau_D$ changes as shown in FIG. 24. That is, the step resistance torque $\tau_D$ is zero, which is the minimum value, when the driving wheels 12 contact the step. The step resistance torque $\tau_D$ gradually decreases while the vehicle 10 is climbing down the step, and reaches the maximum value $\tau_{D,Max}$ just before completion of the climbing down operation.

Finally, the main control ECU 21 determines the step climbing torque $\tau_C$ (step S2-24). In this case, the main control ECU 21 determines the estimated value of the step resistance torque $\tau_D$ as the step climbing torque $\tau_C$. That is, $\tau_C = \tau_D$.

In the step of determining step climbing torque, the magnitude of the step resistance torque $\tau_D$ is changed in accordance with the height H of the step. That is, the value of the step resistance torque $\tau_D$ is increased as the height H of the step is increased.

The magnitude of the step resistance torque $\tau_D$ is changed in accordance with the step climbing state of the vehicle 10.

That is, the step climbing state of the vehicle 10 is estimated from the rotation angle $\theta_W$ of the driving wheels, and the step climbing resistivity $\xi$ is changed. Thus, the control can be performed in view of the change in speed of the vehicle 10 as well.

Specifically, when climbing up a step, that is, when the height H of the step is zero or more, the step resistance torque $\tau_D$ (the step climbing resistivity $\xi$) is decreased as the rotation angle $\theta_W$ of the driving wheels increases. This is because the driving torque required to support the vehicle 10 decreases as the vehicle 10 climbs up the step.

On the other hand, when climbing down a step, that is, when the height H of the step is less than zero, the step resistance torque $\tau_D$ (the step climbing resistivity $\xi$) is increased as the rotation angle $\theta_W$ of the driving wheels increases. This is because the driving torque required to support the vehicle 10 increases as the vehicle 10 climbs down the step.

Thus, the traveling state of the vehicle 10 can be stably controlled when climbing up/down a step.

Note that, although only an example in which the vehicle 10 travels forward to enter a step located ahead of the vehicle 10 is described in the present embodiment, similar control can be performed even when the vehicle 10 travels backward to enter a step located behind the vehicle 10.

Although an example in which the distance sensors 71 are not used during the step climbing operation is described in the present embodiment, the measured values of the distance sensors 71 may be used to more accurately obtain the step climbing state of the vehicle 10. Thus, stable control can be performed even if the driving wheels 12 slip.

Moreover, although an example of using a discontinuous function in the expression for determining the step climbing resistivity $\xi$ is described in the present embodiment, a function having a discontinuous portion corrected to a continuous state may be used. In order to prevent chattering of the control or hunting of the vehicle operation in the discontinuous portion, hysteresis control (e.g., control in which two thresholds are determined, and the thresholds are changed in accordance with the rotation direction of the driving wheels 12) may be introduced.

Moreover, although an example of using the expressions based on the nonlinear dynamic model is described in the present embodiment, linearly approximated expressions may be used for simplification. Alternatively, more sophisticated expressions in view of deformation, rolling friction, and slip conditions of the driving wheels 12, and the like may be used.

As described above, in the present embodiment, a step located in the traveling direction of the vehicle 10 is detected by the distance sensors 71, and the value of the step climbing torque $\tau_C$ is changed in accordance with the position and height H of the step measured by the distance sensors 71, and the rotation angle $\theta_W$ of the driving wheels. Thus, the inverted posture of the vehicle body can be stably maintained during the step climbing operation. Thus, the occupant 15 can operate the vehicle 10 safely and comfortably even on a place having steps.

Note that, although an example in which the two distance sensors 71 detect a step and measure the position and height H of the step is described in the present embodiment, other apparatuses and methods may be used. For example, the step may be detected and the position and height H of the step may be measured by obtaining an image in the traveling direction of the vehicle 10 by a camera, and analyzing the obtained image. Alternatively, by using, e.g., a Global Positioning System (GPS), information on steps that are located around the vehicle 10 may be obtained based on the a vehicle position obtaining system for obtaining the position of the vehicle 10, and map data including information on the road surface and steps.

A fourth embodiment of the present invention will be described below. Note that elements having the same structures as those of the first to third embodiments are denoted by the same reference characters, and description thereof will be omitted. Description of the same operations and the same effects as those of the first to third embodiments will also be omitted.

Figure 26A:
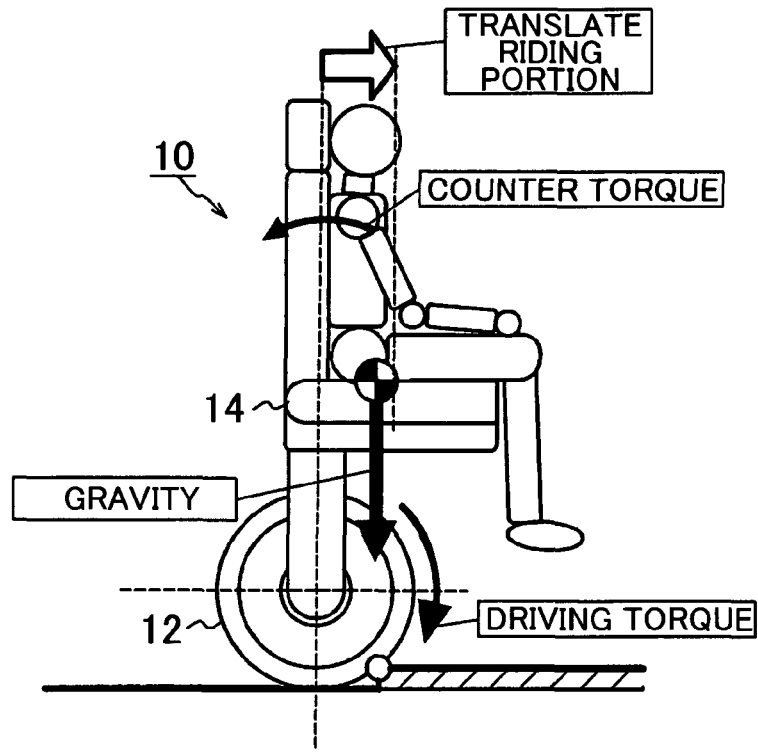
FIG. 26A is a schematic diagram illustrating a step climbing operation of a vehicle according to the first embodiment of the present invention.
Figure 26B:
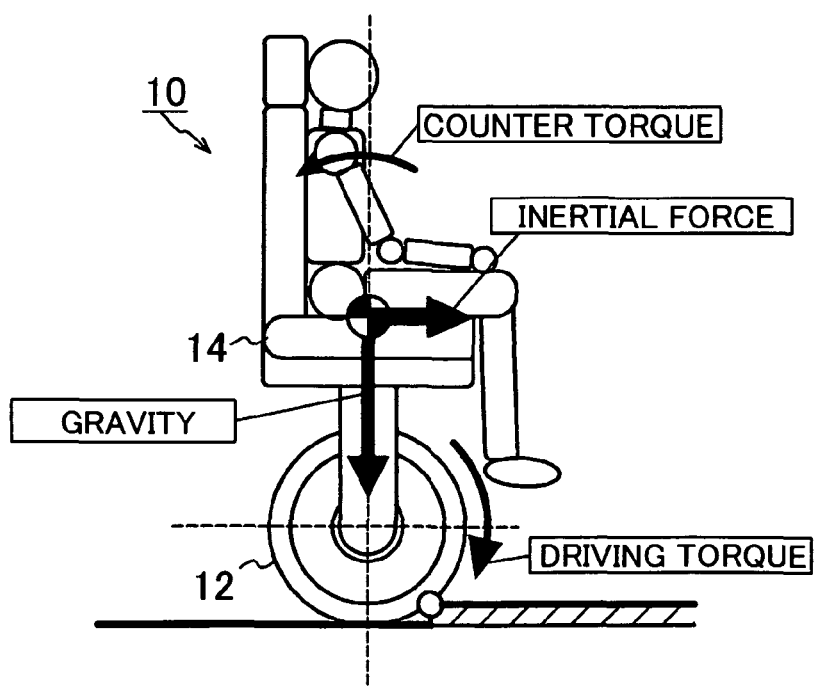
FIG. 26B is a schematic diagram illustrating a step climbing operation of a vehicle according to a fourth embodiment of the present invention.
Figure 27:
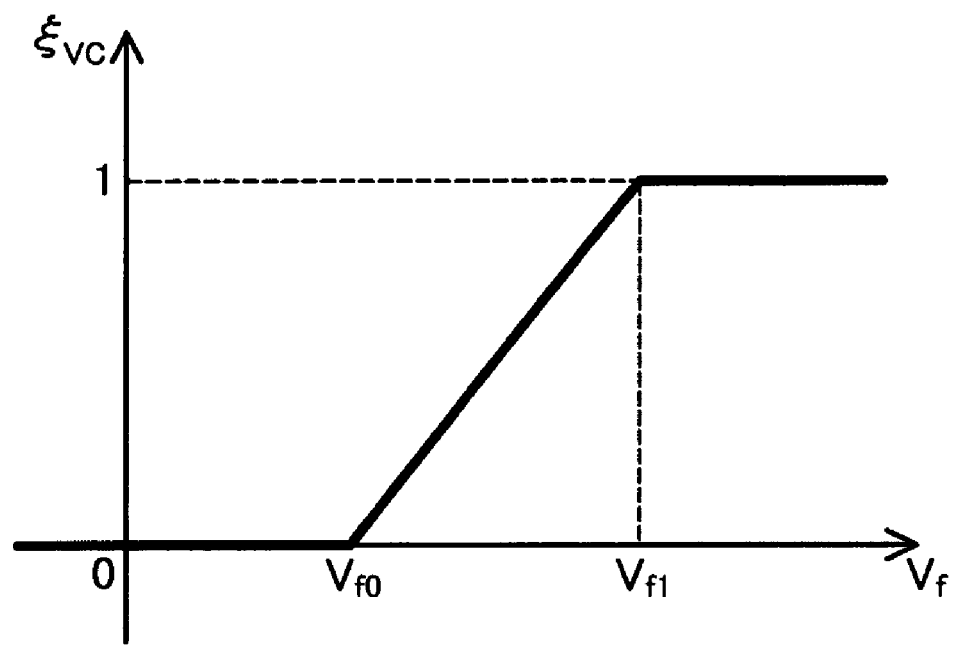
FIG. 27 is a graph showing a change in a terminal velocity correction coefficient according to the fourth embodiment of the present invention.
Figure 28:
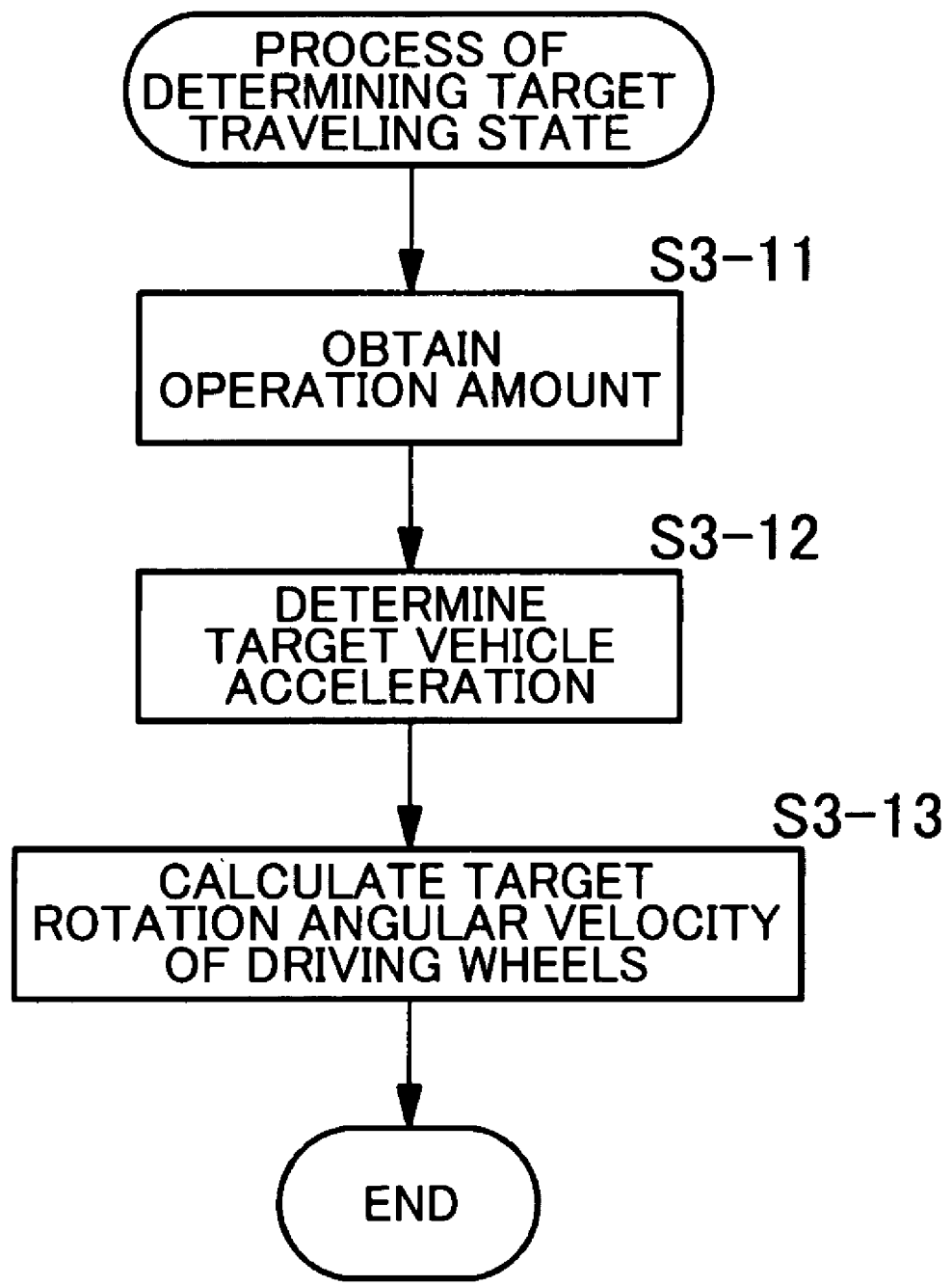
FIG. 28 is a flowchart illustrating an operation of a process of determining a target traveling state according to the fourth embodiment of the present invention.

FIG. 26 shows schematic diagrams illustrating a step climbing operation of a vehicle according to the fourth embodiment of the present invention. FIG. 27 is a graph showing a change in a terminal velocity correction coefficient according to the fourth embodiment of the present invention. FIG. 28 is a flowchart illustrating an operation of a process of determining a target traveling state according to the fourth embodiment of the present invention. Note that FIG. 26A shows an operation example of the first embodiment, and FIG. 26B shows an operation of the present embodiment.

In a control operation of adding driving torque for climbing up/down a step when the vehicle 10 climbs up/down the step (hereinafter referred to as the "step climbing control"), even if an attempt is made to control the vehicle body posture so as to cancel the added driving torque by gravity torque that is caused by moving the center of gravity of the vehicle body, an actual operation may be delayed due to a rapid change in a target value of the vehicle body posture. In this case, the vehicle body posture cannot be controlled sufficiently, whereby the vehicle 10 can be unnecessarily accelerated or decelerated, or the vehicle body can be tilted greatly. This is because the control of the tilt angle of the vehicle body and the control of the position of the riding portion 14, which are the control of the vehicle body posture, have a delay with respect to setting of a target value. That is, the response speed of the control of the vehicle body posture is lower than that of the control of adding the driving torque, thereby causing an imbalance in the control of the vehicle body posture.

It is possible to increase the response speed of the control of the vehicle body posture. However, for example, increasing the moving speed of the riding portion 14 to increase the response speed of the control of the vehicle body posture requires a high-power active weight portion motor 62 as an actuator, thereby increasing the weight and cost of the vehicle 10. Moreover, a too high response speed of the control of the vehicle body posture may reduce riding comfort of the occupant 15.

In the present embodiment, the target value of the vehicle acceleration, which is determined based on the operation amount of the joystick 31, is corrected so that the posture of the vehicle body becomes constant during the step climbing operation. Specifically, as shown in FIG. 26B, when climbing up a step, the target value of the vehicle acceleration is reduced so as to cancel the counter torque, which is applied to the vehicle body by the step climbing torque $\tau_C$, by an inertial force caused by deceleration of the vehicle 10, so that the posture of the vehicle body becomes constant continuously from the start to the end of the step climbing operation. That is, the target value of the vehicle acceleration is corrected so that the counter torque, which is applied to the vehicle body as a reaction force of the step climbing torque $\tau_C$ required to climb up/down the step, balance with the torque caused by the inertial force associated with acceleration/deceleration of the vehicle 10.

Note that, if the vehicle speed is low or the step is high, the vehicle 10 cannot finish climbing up/down the step. Thus, the target value of the vehicle acceleration is not corrected. That is, as described in the first embodiment, and as shown in FIG. 26A, the riding portion 14 is driven to move forward or backward in the traveling direction of the vehicle 10 with respect to the main body 11 so as to cancel the counter torque, which is applied to the vehicle body by the step climbing torque $\tau_C$, by the gravity caused by the movement of the riding portion 14.

This can suppress a rapid change in the posture of the vehicle body during the step climbing operation, whereby the occupant 15 can operate the vehicle 10 safely and comfortably even when on a place having steps.

The traveling and posture control process of the present embodiment will be described in detail below. Note that the outline of the traveling and posture control process, the process of obtaining state quantities, the process of determining step climbing torque, the process of determining target vehicle body posture, and the process of determining actuator outputs are similar to those of the first embodiment, and description thereof will be omitted. Only the process of determining a target traveling state will be described below.

In the process of determining a target traveling state, the main control ECU 21 first obtains the amount of operation (step S3-11). In this case, the main control ECU 21 obtains the amount by which the occupant 15 has operated the joystick 31 to input a travel command such as acceleration, deceleration, turning, in-situ rotation, stop, or braking of the vehicle 10.

Then, the main control ECU 21 determines a target value of vehicle acceleration based on the obtained operation amount of the joystick 31 (step S3-12). In this case, the main control ECU 21 determines the target value $\alpha^*$ of the vehicle acceleration by the following expression (16), based on the operation amount of the joystick 31, the rotation angular velocity of the driving wheels, and the step resistance torque.

$$\alpha^* = \alpha_d^* - \Delta\alpha^* \qquad \text{Expression (16)}$$

where $\alpha_d^*$ indicates the target value of the vehicle acceleration in accordance with the obtained operation amount of the joystick 31, and $\Delta\alpha^*$ indicates the amount of correction of the target vehicle acceleration, and is represented by the following expression (17).

$$\Delta\alpha^* = \xi_{VC} \Delta\alpha_1^* \qquad \text{Expression (17)}$$

$\xi_{VC}$ indicates a terminal velocity correction coefficient, and is changed as shown in FIG. 27 by a predicted vehicle terminal velocity $V_f$, which is a predicted vehicle speed at the time the vehicle 10 finishes climbing up the step. That is, the terminal velocity correction coefficient $\xi_{VC}$ is reduced as the predicted vehicle terminal velocity $V_f$ is reduced. Note that $\xi_{VC}=0$ means that the target value of the vehicle acceleration is not corrected, and this corresponds to such control as described in the first embodiment.

Specifically, the terminal velocity correction coefficient $\xi_{VC}$ is determined by the following expression (18).

$$\xi_{VC} = \begin{cases} 0 & (V_f \le V_{f0}) \\ \xi_{VC,l} & (V_{f0} < V_f < V_{f1}) \\ 1 & (V_f < V_{f1}) \end{cases} \qquad \text{Expression (18)}$$

Note that $\xi_{VC,l} = \dfrac{V_f - V_{f0}}{V_{f1} - V_{f0}}$.

$V_{f0}$ and $V_{f1}$ indicate a lower threshold as a first threshold of the predicted vehicle terminal velocity $V_f$, and a higher threshold as a second threshold of the predicted vehicle terminal velocity $V_f$, respectively, and have predetermined values, respectively. The predicted vehicle terminal velocity $V_f$ is given by the following expression (19).

$$V_f = V - (C_I \eta - \alpha_d^*) \frac{R_W g}{V} \eta \qquad \text{Expression (19)}$$

$C_I$ indicates a parameter regarding inertia, V indicates a corrected vehicle speed, and $\eta$ indicates a virtual uphill angle. $C_I$, V, and $\eta$ are represented by the following expressions (20), (21), and (22), respectively.

$$C_I = \frac{M R_W}{m_1 l_1 + \tilde{M} R_W} \qquad \text{Expression (20)}$$

$$V = \begin{cases} R_W \dot\theta_W & (R_W \dot\theta_W > \varepsilon) \\ \varepsilon & (R_W \dot\theta_W \le \varepsilon) \end{cases} \qquad \text{Expression (21)}$$

$$\eta = \sin^{-1}\left(\frac{\tau_D}{M g R_W}\right) \qquad \text{Expression (22)}$$

$\varepsilon$ indicates a very small constant, and has a value that is predetermined to prevent the denominator of the expression (19) from becoming zero.

Note that the virtual uphill angle $\eta$ indicates the rotation angle of the driving wheels 12, which is required to complete the step climbing operation. For example, when each of the driving wheels 12 is in contact with the step as shown in FIG. 26B, the virtual uphill angle $\eta$ is equal to the angle of the tangent to the peripheral surface of the driving wheel 12 at the contact point between the peripheral surface of the driving wheel 12 and the step, with respect to the road surface (the horizontal plane).

On the other hand, $\Delta\alpha^*_1$ in the above expression (17) indicates a corrected value of the amount of correction of the target vehicle acceleration, and is represented by the following expression (23).

$$\Delta\alpha_1^* = \begin{cases} \Delta\alpha_0^* & (\Delta\alpha_0^* < \Delta\alpha_{1,Max}^*) \\ \Delta\alpha_{1,Max}^* & (\Delta\alpha_0^* \ge \Delta\alpha_{1,Max}^*) \end{cases} \qquad \text{Expression (23)}$$

where $\Delta\alpha^*_{1,Max}$ indicates a maximum value of the amount of correction of the target vehicle acceleration, and has a value predetermined in order to prevent excessively strong deceleration from occurring. $\Delta\alpha^*_0$ indicates a reference value of the amount of correction of the target vehicle acceleration, and is represented by the following expression (24).

$$\Delta\alpha_0^* = \left\{ \frac{\tau_C}{g(m_1 l_1 + \tilde{M} R_W)} \right. \qquad \text{Expression (24)}$$

Finally, the main control ECU 21 calculates a target value of the rotation angular velocity of the driving wheels from the determined target value of the vehicle acceleration (step S3-13). For example, the main control ECU 21 calculates the target value of the rotation angular velocity of the driving wheels by time-integrating the target value of the vehicle acceleration, and dividing the resultant value by the ground radius $R_W$ of the driving wheel.

Note that only an example in which the vehicle 10 travels forward to enter and climb up a step located ahead of the vehicle 10 is described above. However, similar control can be performed when the vehicle 10 travels backward to enter a step located behind the vehicle 10, and when the vehicle 10 climbs down a step.

As described above, the main control ECU 21 corrects the target value of the vehicle acceleration so that the posture of the vehicle body becomes constant during the step climbing operation.

Specifically, the main control ECU 21 corrects the target value of the vehicle acceleration so that the counter torque, which is applied to the vehicle body as a reaction force of the step climbing torque required to climb up/down the step, balances with the torque caused by the inertial force associated with acceleration/deceleration of the vehicle 10. In the case where the vehicle 10 travels forward to climb up a step, an inertial force, which serves to decelerate the vehicle 10 to tilt the vehicle body forward, is generated so as to cancel the counter torque, which serves to tilt the vehicle body rearward as a reaction force of the step climbing torque. At this time, the reference value of the amount of correction of the target vehicle acceleration for implementing appropriate deceleration is determined as a function proportional to the step climbing torque. This can suppress an abrupt change in posture of the vehicle body (such as the tilt angle of the vehicle body, the position of the riding portion 14, and the like) during the step climbing operation, whereby a stable, comfortable step climbing operation can be implemented.

Moreover, the amount of correction of the target vehicle acceleration is limited to prevent excessive correction. That is, the reference value of the amount of correction of the target vehicle acceleration is limited by the maximum value of the amount of correction of the target vehicle acceleration, which is a predetermined maximum value, thereby preventing a mismatch between the control and the operation feeling of the occupant 15 due to the automatic correction, and also preventing reduction in riding comfort due to sudden acceleration/deceleration.

Moreover, while the vehicle 10 is traveling at a low speed, the amount of correction of the target vehicle acceleration is limited to prevent failure to complete the step climbing operation and to prevent a returning operation. Thus, even if the vehicle 10 enters a step at a low speed, required step climbing control is appropriately executed, whereby a stable step climbing operation can be implemented.

Specifically, it is first determined whether or not the step climbing operation can be completed when the target vehicle acceleration is corrected by the corrected value of the amount of correction of the target vehicle acceleration, based on the predicted vehicle terminal velocity, which is a predicted vehicle speed upon completion of the step climbing operation. The predicted vehicle terminal velocity is determined as a function of the target vehicle acceleration in accordance with the operation amount of the joystick 31 that determines the respective target values of the rotation angular velocity of the driving wheels, the step resistance torque, and the fixed posture of the vehicle body, based on a dynamic model. Thus, the vehicle terminal velocity, which is an important factor for the determination, can be accurately predicted.

Then, when the predicted vehicle terminal velocity is equal to or higher than the predetermined higher threshold, the terminal velocity correction coefficient is set to 1, and correction is performed. That is, it is determined that it is unlikely that the vehicle speed decreases significantly, and that the step climbing operation fails to be completed and the returning operation occurs. Thus, the vehicle is decelerated to climb up the step in a stable state without changing the posture of the vehicle body.

On the other hand, if the predicted vehicle terminal velocity is equal to or lower than the predetermined lower threshold, the terminal velocity correction coefficient is set to 0, and no correction is performed. That is, it is determined that it is highly likely that the step climbing operation fails to be completed or the returning operation occurs if the vehicle speed decreases significantly. Thus, the posture of the vehicle body is changed to move the center of gravity, thereby causing the vehicle 10 to climb up the step in a stable state without changing the traveling state.

If the predicted vehicle terminal velocity is between the higher threshold and the lower threshold, the terminal velocity correction coefficient is given by a linearly interpolated function, thereby preventing an abrupt change in the traveling state or in the posture of the vehicle body due to switching of the control, and also preventing such fluctuation that the control is periodically switched around the threshold.

Appropriate correction in view of the vehicle speed and the height of the step (the magnitude of the step resistance torque) can be easily implemented by the above method.

Note that, in the present embodiment, the control is executed so as to make the posture of the vehicle body constant by setting the terminal velocity correction coefficient to 1 when the predicted vehicle terminal velocity is equal to or higher than the predetermined higher threshold, that is, the control is executed so that priority is given to the posture of the vehicle body. However, the posture of the vehicle body and the traveling state of the vehicle may be balanced to some extent by setting the terminal velocity correction coefficient to 1 or less. Alternatively, the joystick 31 as an operating device may be provided with a parameter adjustment device so that the occupant 15 can adjust the value of the terminal velocity correction coefficient.

In the present embodiment, whether to perform the correction or not is determined by comparing the predicted vehicle terminal velocity with the predetermined higher and lower thresholds. However, whether to perform the correction or not may be determined based on the difference or the ratio between the current vehicle speed and the predicted vehicle terminal velocity, or based on other indices.

In the present embodiment, the vehicle terminal velocity is predicted based on the measured value of the rotation angular velocity of the driving wheels. However, the vehicle terminal velocity may be predicted based on the target value of the rotation angular velocity of the driving wheels. This can prevent minute fluctuation of the rotation angular velocity of the driving wheels due to disturbances or the like from affecting the control, whereby more stable step climbing control can be implemented.

In the present embodiment, nonlinear functions are used to determine the predicted vehicle terminal velocity and the virtual uphill angle. However, calculation may be simplified by using linear functions obtained by approximation of the nonlinear functions. Alternatively, nonlinear functions may be applied in a map form.

In the present embodiment, the height of the step is estimated by the estimated value of the step resistance torque, and the vehicle terminal velocity is predicted based on the estimated height of the step. However, as described in the third embodiment, a step measuring sensor, such as the distance sensor 71, may be used, and control may be executed based on the measurement result of the step measuring sensor.

A fifth embodiment of the present invention will be described below. Note that elements having the same structure as that of the first to fourth embodiments are denoted with the same reference characters, and description thereof will be omitted. Description of the same operations and the same effects as those of the first to fourth embodiments is also omitted.

Figure 30:
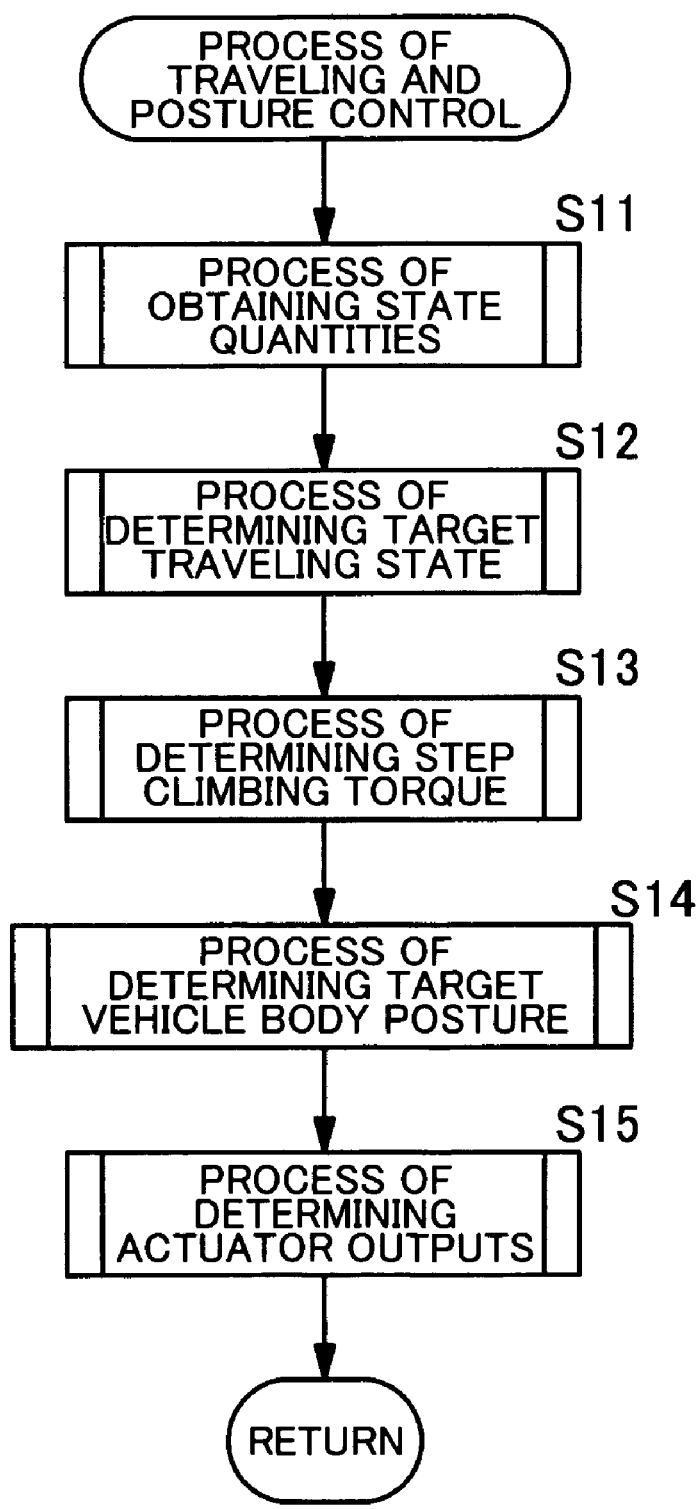
FIG. 30 is a flowchart illustrating an operation of a traveling and posture control process of a vehicle according to the fifth embodiment of the present invention.
Figure 31:
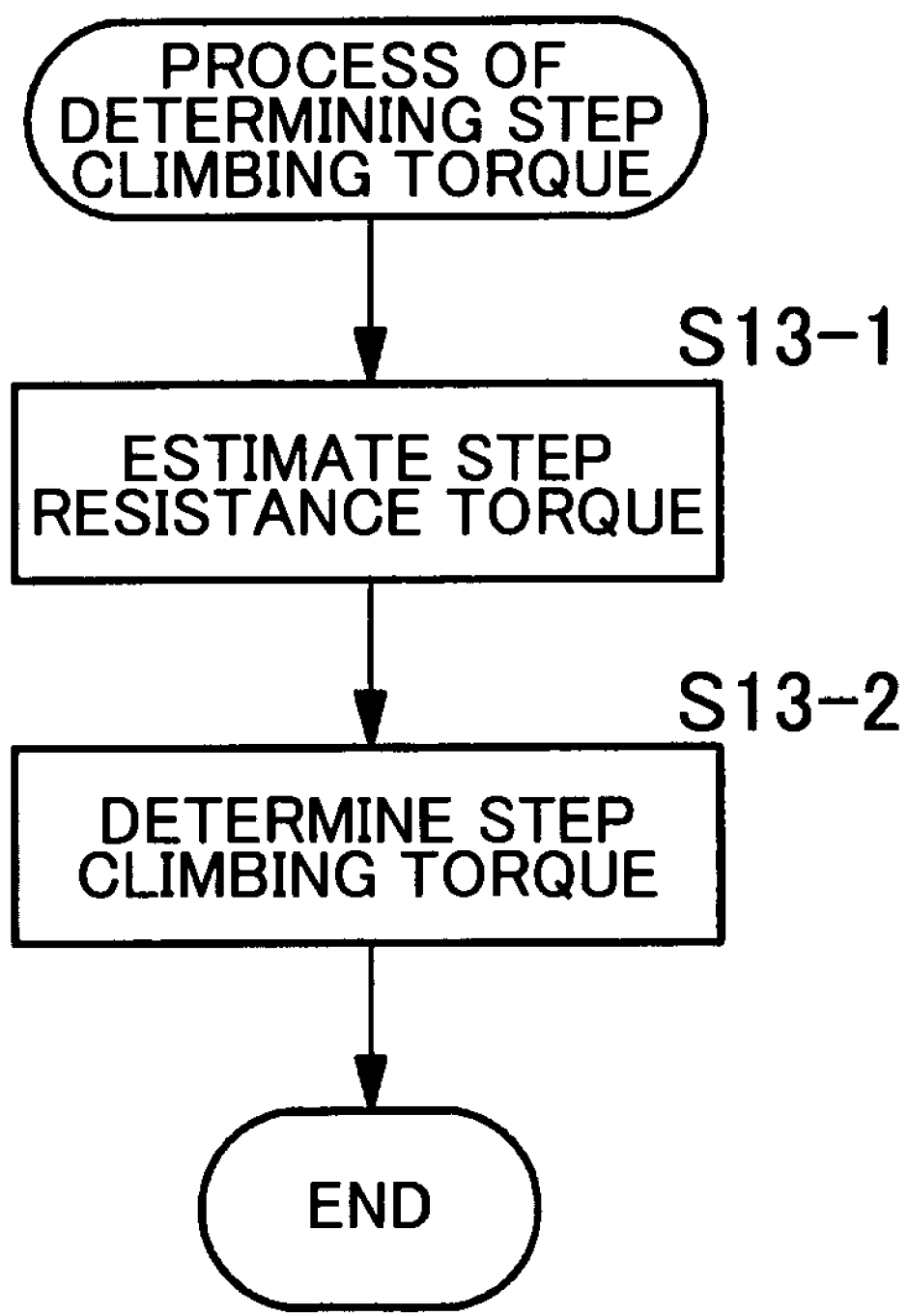
FIG. 31 is a flowchart illustrating an operation of a process of determining step climbing torque according to the fifth embodiment of the present invention.

FIG. 29 is a graph of a map for estimating a riding intention according to the fifth embodiment of the present invention, showing thresholds of a target value of vehicle acceleration, and thresholds of rotation angular velocity of the driving wheels. FIG. 30 is a flowchart illustrating an operation of a vehicle traveling and posture control process according to the fifth embodiment of the present invention. FIG. 31 is a flowchart illustrating an operation of the process of determining step climbing torque according to the fifth embodiment of the present invention.

In the following cases (a) to (c), it is more appropriate to prohibit a control operation of adding the driving torque for climbing up/down a step (hereinafter referred to as the "step climbing control"), that is, not to execute the step climbing control.

(a) When the vehicle 10 stops with the driving wheels 12 being in contact with an ascending step, and the occupant 15 does not operate the joystick 31: in this case, it is highly likely that the operation intention of the occupant 15 is to keep the vehicle 10 in the stopped state.

(b) When the driving wheels 12 contact an ascending step at a relatively low vehicle speed, and the occupant 15 operates the joystick 31 to input a brake command as a travel command: in this case, it is highly likely that the operation intention of the occupant 15 is to stop the vehicle 10 in contact with the step.

(c) When the occupant 15 operates the joystick 31 to input a sudden-brake command as a travel command: in this case, it is highly likely that the operation intention of the occupant 15 is to stop the vehicle 10 in contact with the step, or to stop the vehicle 10 with the shortest possible braking distance.

In the following cases (d) and (e), it is more appropriate to execute the step climbing control.

(d) When the driving wheels 12 contact an ascending step at a relatively high vehicle speed, and the occupant 15 operates the joystick 31 to input a brake command as a travel command: in this case, it is highly likely that the occupant 15 recognizes that the vehicle 10 cannot be stopped in contact with the step, or that the occupant 15 intends to stop the vehicle 10 after passing the step.

(e) When the vehicle 10 enters a descending step: in this case, it is highly likely that the occupant 15 experiences a shock when landing from the step and feels uncomfortable, unless the driving torque for climbing down the step is added.

Thus, in the present embodiment, the operation intention of the occupant 15 is estimated based on the traveling state of the vehicle 10 and a travel command, and whether to execute or prohibit the step climbing control is selected in accordance with the estimated operation intention. That is, the control ECU 20 as a vehicle control apparatus includes operation intention estimating means for estimating the operation intention of the occupant 15, and selects whether to execute or prohibit the step climbing control in accordance with the estimated operation intention. Specifically, the operation intension estimating means estimates the operation intension of the occupant 15 in view of the vehicle speed (the rotation angular velocity of the driving wheels) as the traveling state of the vehicle 10, the target value of the vehicle acceleration determined in accordance with the operation amount of the joystick 31 as a travel command, and the step resistance torque corresponding to the height of the step, and selects whether to execute or prohibit the step climbing control.

In the case where the vehicle speed and the target value of the vehicle acceleration satisfy predetermined conditions when the vehicle 10 enters an ascending step, the operation intention estimating means estimates that the operation intention is to prohibit the step climbing control. In the case where the vehicle speed and the target value of the vehicle acceleration do not satisfy the predetermined conditions, the operation intention estimating means estimates that the operation intention is to execute the step climbing control.

More specifically, when the vehicle 10 is in a stopped state, and the target value of the vehicle acceleration is zero or a value commanding to stop the vehicle 10, no step climbing control is executed. In the case where the vehicle 10 enters an ascending step at a relatively low vehicle speed, and the target value of the vehicle acceleration is a value commanding to brake the vehicle 10, no step climbing control is executed. On the other hand, in the case where the vehicle 10 enters an ascending step at a relatively high vehicle speed, the step climbing control is executed even if the target value of the vehicle acceleration is a value commanding to brake the vehicle 10. In the case where the target value of the vehicle acceleration is a value commanding to suddenly brake the vehicle 10, no step climbing control is executed even if the vehicle speed is high. Moreover, when the vehicle 10 enters a descending step, the step climbing control is executed regardless of the vehicle speed and the target value of the vehicle acceleration.

Thus, the operation intension of the occupant 15 can be accurately estimated, and the step climbing control can be executed appropriately. Thus, an inverted vehicle, which can be operated by the occupant 15 at will even if there is a step, can be provided.

The outline of the traveling and posture control process of the present embodiment will be described below.

In the traveling and posture control process, the main control ECU 21 first performs a process of obtaining state quantities indicating the operating state of the vehicle 10 (step S11). In this step, the main control ECU 21 obtains the rotating state of the driving wheels 12, the tilt state of the vehicle body, and the moving state of the riding portion 14 by respective sensors, which are the driving wheel sensor 51, the vehicle body tilt sensor 41, and the active weight portion sensor 61, respectively.

Next, the control ECU 20 performs the process of determining a target traveling state (step S12). In this step, the control ECU 20 determines a target value of the acceleration of the vehicle 10 and a target value of the rotation angular velocity of the driving wheels 12, based on the operation amount of the joystick 31.

Then, the control ECU 20 performs the process of determining step climbing torque (step S13). In this step, the control ECU 20 estimates step resistance torque by an observer, based on the state quantities obtained by the process of obtaining state quantities, that is, based on the rotating state of the driving wheels 12, the tilt state of the vehicle body, the moving state of the riding portion 14, and the output value of each actuator, which is the output value of the driving motors 52 and/or the active weight portion motor 62. The control ECU 20 determines the step climbing torque based on the target value of the acceleration of the vehicle 10, the rotation angular velocity of the driving wheels 12, and the like determined in the process of determining the target traveling state.

Then, the control ECU 20 performs the process of determining target posture of the vehicle body (step S14). In this step, the control ECU 20 determines the target value of the posture of the vehicle body, that is, the respective target values of the tilt angle of the vehicle body and the position of the active weight portion, based on the step climbing torque determined by the process of determining step climbing torque, and the target value of the acceleration of the vehicle 10 determined by the process of determining the target traveling state.

Finally, the control ECU 20 performs the process of determining actuator outputs (step S15). In this step, the control ECU 20 determines the respective outputs of the actuators, that is, the respective outputs of the driving motors 52 and the active weight portion motor 62, based on the state quantities obtained by the process of obtaining state quantities, the target traveling state determined by the process of determining a target traveling state, the step climbing torque determined by the process of determining step climbing torque, and the target posture of the vehicle body determined by the process of determining target vehicle body posture.

The process of determining step climbing torque in the present embodiment will be described in detail below. Note that, since the process of obtaining state quantities, the process of determining a target traveling state, the process of determining target posture of the vehicle body, and the process of determining actuator outputs are similar to those of the first embodiment, description thereof will be omitted.

In the process of determining step climbing torque, the main control ECU 21 first estimates step resistance torque $\tau_D$ (step S13-1). In this case, as in the first embodiment, the main control ECU 21 estimates the step resistance torque $\tau_D$ by the above expression (1), based on the state quantities obtained in the process of obtaining state quantities, and the respective outputs of the actuators determined in the process of determining actuator outputs in the previous traveling and posture control process (the previous time step).

Then, the main control ECU 21 determines step climbing torque $\tau_C$ (step S13-2). In this case, the main control ECU 21 determines the step climbing torque $\tau_C$ by the following expression (25), based on the step resistance torque $\tau_D$, the target value of the vehicle acceleration, and the rotational angular velocity of the driving wheels.

$$\tau_C = \rho \tau_D \qquad \text{Expression (25)}$$

where $\rho$ indicates a step climbing torque ratio, and is represented by the following expression (26).

$$\rho = LPF(\hat{\rho}; T_{LPF}) \qquad \text{Expression (26)}$$

Note that $LPF(*; T_{LPF})$ indicates a low pass filter having a time constant $T_{LPF}$. The time constant is a predetermined value.)

$\hat{\rho}$ indicates a designated value of the step climbing torque ratio.

Note that the low pass filter avoids a temporally discontinuous change in the step climbing torque $\tau_C$ when the designated value $\hat{\rho}$ of the step climbing torque ratio switches between 0 and 1. This can prevent an abrupt change in the traveling state and in the posture of the vehicle body, and also prevents a phenomenon that switching of the control is continuously and periodically repeated on the boundary where the designated value $\hat{\rho}$ of the step climbing torque ratio is switched.

The designated value $\hat{\rho}$ of the step climbing torque ratio is represented by the following expression (27).

$$\hat{\rho} = \begin{cases} \hat{\rho}_\alpha & (\tau_D \dot{\theta}_W \geq 0) \\ 1 & (\tau_D \dot{\theta}_W < 0) \end{cases} \qquad \text{Expression (27)}$$

$\tau_D \dot{\theta}_W \geq 0$ indicates that the step is an ascending step, and $\tau_D \dot{\theta}_W < 0$ indicates that the step is a descending step. If $\tau_D \dot{\theta}_W \geq 0$ and the designated value $\hat{\rho}$ of the step climbing torque ratio is 1, this means that the step climbing control is always executed in the case of a descending step, regardless of the operation intention, that is, regardless of the target value $\alpha^*$ of the vehicle acceleration.

$\hat{\rho}_\alpha$ indicates an operation intention determination value, and is represented by the following expression (28).

$$\hat{\rho}_\alpha = \begin{cases} 0 & (\alpha^*_{sh,l} \leq \alpha^* \leq \alpha^*_{sh,h}) \\ 1 & (\alpha^* < \alpha_{sh,l}, \alpha^* > \alpha^*_{sh,h}) \end{cases} \qquad \text{Expression (28)}$$

Thus, the operation intension determination value $\hat{\rho}_\alpha$ changes as shown in FIG. 29, in accordance with the magnitude of the target value $\alpha^*$ of the vehicle acceleration, which reflects the operation amount of the joystick 31. Note that $\alpha^*_{sh,l}$ and $\alpha^*_{sh,h}$ respectively indicate a lower threshold and an upper threshold of the target vehicle acceleration, which determine the range of $\hat{\rho}_\alpha = 0$, and are represented by the following expressions (29) and (30), respectively. $\alpha^*_{sh,l}$ and $\alpha^*_{sh,h}$ change as shown in FIG. 29.

$$\alpha^*_{sh,h} = \begin{cases} \infty & (\dot{\theta}_W < -\dot{\theta}_{W,sh1}) \\ \alpha^*_{sh1} & (-\dot{\theta}_{W,sh1} \leq \dot{\theta}_W \leq \dot{\theta}_{W,sh1}) \\ \alpha^*_{sh1}(1 - r_{1p}) & (\dot{\theta}_{W,sh1} < \dot{\theta}_W \leq \dot{\theta}_{w,sh2}) \\ -\alpha^*_{sh2}\left(\dfrac{1-}{e^{-r_{2p}}}\right) & (\dot{\theta} > \dot{\theta}_{W,sh2}) \end{cases} \qquad \text{Expression (29)}$$

$$\alpha^*_{sh,l} = \begin{cases} \alpha^*_{sh2}(1 - e^{-r_{2m}}) & (\dot{\theta}_W < -\dot{\theta}_{W,sh2}) \\ -\alpha^*_{sh1}\left(\dfrac{1-}{r_{1m}}\right) & (-\dot{\theta}_{W,sh2} \leq \dot{\theta}_W \leq -\dot{\theta}_{W,sh1}) \\ -\alpha^*_{sh1} & (-\dot{\theta}_{W,sh1} \leq \dot{\theta}_W \leq -\dot{\theta}_{w,sh1}) \\ -\infty & (\dot{\theta}_W > \dot{\theta}_{W,sh1}) \end{cases} \qquad \text{Expression (30)}$$

Note that $r_{1p} = \dfrac{\dot{\theta}_W - \dot{\theta}_{W,sh1}}{\dot{\theta}_{W,sh2} - \dot{\theta}_{W,sh1}}$, $r_{2p} = \dfrac{\dot{\theta}_W - \dot{\theta}_{W,sh2}}{\Delta \dot{\theta}_{W,sh2}}$, $r_{1m} = \dfrac{-\dot{\theta}_W - \dot{\theta}_{W,sh1}}{\dot{\theta}_{W,sh2} - \dot{\theta}_{W,sh1}}$, and $r_{2m} = \dfrac{-\dot{\theta}_W - \dot{\theta}_{W,sh2}}{\Delta \dot{\theta}_{W,sh2}}$.

$\alpha^*_{sh1}$ indicates a first threshold of the target vehicle acceleration, is a predetermined value, and indicates an upper limit of the vehicle acceleration for prohibiting the step climbing control when the vehicle is in a stopped state. $\alpha^*_{sh2}$ indicates a second threshold of the target vehicle acceleration. $\alpha^*_{sh2}$ has a predetermined value, and indicates an upper reference value of the vehicle deceleration for executing the step climbing control when the vehicle is in a braked state. $\dot{\theta}_{W,sh1}$ indicates a first threshold of the rotation angular velocity of the driving wheels. $\dot{\theta}_{W,sh1}$ has a predetermined value, and indicates an upper limit of the rotation angular velocity of the driving wheels for determining whether the vehicle is stopped or not. $\dot{\theta}_{W,sh2}$ indicates a second threshold of the rotation angular velocity of the driving wheels. $\dot{\theta}_{W,sh2}$ is a variable that varies in accordance with the step resistance torque $\tau_D$, and indicates a lower limit of the rotation angular velocity of the driving wheels for reexecuting the step climbing control. $\Delta\dot{\theta}_{W,sh2}$ is a constant of characteristics of an increase in the second threshold of the target vehicle acceleration, and is a predetermined value. The second threshold value $\dot{\theta}_{W,sh2}$ of the rotation angular velocity of the driving wheels is represented by the following expression (31).

$$\dot{\theta}_{W,sh2} = \max(\dot{\theta}_{W,sh2}^\tau, \dot{\theta}_{W,sh1}) \qquad \text{Expression (31)}$$

where $\dot{\theta}_{W,sh2}^\tau$ indicates the minimum rotation angular velocity of the driving wheels when inertially climbing up a step, and is represented by the following expression (32).

$$\dot{\theta}_{W,sh2}^\tau = \sqrt{\frac{2g}{R_W}(1-\cos\eta)} \qquad \text{Expression (32)}$$

$\eta$ indicates a virtual uphill angle, and is represented by the following expression (33).

$$\eta = \sin^{-1}\left(\frac{\tau_D}{MgR_W}\right) \qquad \text{Expression (33)}$$

Thus, the main control ECU 21 prohibits, or does not execute, the step climbing control if it is estimated that the occupant 15 does not wish to climb up the step, that is, the operation intention of the occupant 15 is not to execute the step climbing control.

Specifically, whether the occupant 15 wants the vehicle 10 to climb up the step or not is determined based on the target value of the vehicle acceleration determined by the operation amount of the joystick 31 by the occupant 15, the rotation angular velocity of the driving wheels indicating the operating state of the vehicle 10, and the estimated value of the step resistance torque corresponding to the height of the step.

In this case, whether to execute the step climbing control or not is switched by multiplying the estimated value of the step resistance torque by the step climbing torque ratio. Moreover, smooth switching of whether to execute the step climbing control or not is implemented by low-pass filtering the designated value of the step climbing torque ratio. Thus, the operation intention of the occupant 15 can be appropriately determined, and the step climbing control is executed only when the occupant 15 wants the vehicle 10 to climb up the step.

In the case where the vehicle 10 is in a stopped state, and the occupant 15 does not perform an operation corresponding to an input of the target value of the vehicle acceleration, no step climbing control is executed. This corresponds to the case (a) described above, and a point corresponding to the conditions of the rotation angular velocity of the driving wheels and the target vehicle acceleration is present in a rectangular hatched region including the origin, in the operation intention determining map in FIG. 29. That is, this is the case where the following conditions are satisfied: an absolute value of the rotation angular velocity of the driving wheels is equal to or less than the predetermined first threshold of the rotation angular velocity of the driving wheels, and an absolute value of the target vehicle acceleration is equal to or less than the predetermined first threshold of the target vehicle acceleration. In this case, it is determined that the occupant 15 does not want the vehicle 10 to climb up/down the step, and the operation intension determination value is set to 0. Thus, when the vehicle 10 is stopped with the driving wheels 12 being in contact with an ascending step, the stopped state of the vehicle 10 is stably maintained, and the vehicle 10 can be prevented from climbing up the step against the intention of the occupant 15.

In the case where the vehicle 10 enters a step at a low speed, and the occupant 15 inputs braking as a travel command, that is, the occupant 15 requests braking, no step climbing control is executed. This corresponds the case (b) described above, and a point corresponding to the conditions of the angular velocity of the driving wheels and the target vehicle acceleration is present in right and left hatched regions, which are located on the right and left sides of the rectangular hatched region including the origin, respectively, in the operation intention determining map in FIG. 29. That is, this corresponds to the case where the following conditions are satisfied: in the direction in which the vehicle 10 enters the step, the rotation angular velocity of the driving wheels is equal to or less than the second threshold of the rotation angular velocity of the driving wheels, and an absolute value of the target vehicle acceleration is equal to or less than zero.

In this case, it is determined that the occupant 15 wishes to brake or stop the vehicle 10 by using the step, and the operation intention determination value is set to 0. Note that the right and left hatched regions include a region where the operation intention determination value is set to 0 for a very small acceleration request of the occupant 15. This region is provided by linearly decreasing the upper threshold of the target vehicle acceleration from the first threshold of the target vehicle acceleration to zero in a range where the rotation angular velocity of the driving wheels is higher than the first threshold of the rotation angular velocity of the driving wheels, and is equal to or less than the second threshold of the rotation angular velocity of the driving wheels. Thus, the operation of the occupant 15 intending to perform an operation of bringing the driving wheels 12 into contact with the step to stop the vehicle 10, or intending to perform an operation of decelerating the vehicle 10 by climbing up the step, can be appropriately determined, whereby the operation intended by the occupant 15 can be easily implemented.

In the case where the vehicle 10 enters a step at a high speed, and the occupant 15 inputs gentle braking as a travel command, that is, the occupant 15 requests gentle braking, the step climbing control is executed. This corresponds to the case (d) described above, and in the operation intention determining map in FIG. 29, a point corresponding to the conditions of the rotation angular velocity of the driving wheels and the target vehicle acceleration is present in a non-hatched region, which is located on the right side of the right hatched region, and where the target value of the vehicle acceleration is negative, or in a non-hatched region, which is located on the left side of the left hatched region, and where the target value of the vehicle acceleration is negative. That is, this corresponds to the case where the following conditions are satisfied: in the direction in which the vehicle 10 enters the step, the rotation angular velocity of the driving wheels is higher than the second threshold of the rotation angular velocity of the driving wheels, and the target value of the vehicle acceleration is larger than the upper threshold of the target vehicle acceleration.

In this case, it is determined that the occupant 15 intends to climb up the step, or allows the vehicle 10 to climb up the step, and the intention determination value is set to 1. Note that the non-hatched regions where the target value of the vehicle acceleration is negative are regions that are provided by decreasing the upper threshold of the target vehicle acceleration from zero by such an exponential function that is asymptotic to the second threshold of the target vehicle acceleration, in a range where the rotation angular velocity of the driving wheels is higher than the second threshold of the rotation angular velocity of the driving wheels. In other words, the threshold for executing the step climbing control, that is, the threshold of the rotation angular velocity of the driving wheels for setting the operation intention determining value to 1, is increased as the target deceleration requested by the occupant 15 is increased. Thus, the higher the vehicle speed is, the more it is determined that the occupant 15 intends to perform an operation of stopping the vehicle 10 after climbing up the step, whereby the operation of the occupant 15 can be appropriately determined, and the operation intended by the occupant 15 can be easily and stably implemented.

Moreover, the threshold of the vehicle speed for executing the step climbing control is increased as the height of the step to be climbed up is increased. That is, the second threshold of the rotation angular velocity of the driving wheels, which is a threshold for switching the operation intension determination value when the vehicle 10 travels at a high speed, is increased as the estimated value of the step resistance torque is increased. This prevents the vehicle 10 from climbing up a high step unnaturally. Moreover, the second threshold of the rotation angular velocity of the driving wheels is determined based on the minimum rotation angular velocity of the driving wheels for inertially climbing up a step, which is the lowest vehicle speed that allows the vehicle 10 to climb up a step inertially (without using the driving torque). This implements a more natural operation of the vehicle 10. Thus, the operation intention of the occupant 15 in consideration of the height of the step is more appropriately determined, and the operation can be easily implemented.

Moreover, in the case where the occupant 15 requests sudden braking, no step climbing control is executed regardless of the vehicle speed at which the vehicle 10 enters a step. This corresponds the case (c) described above, and a point corresponding to the conditions of the rotation angular velocity of the driving wheels and the target vehicle acceleration is present in hatched regions located outside two chain lines, respectively, in the operation intention determining map in FIG. 29. That is, this corresponds to the case where the following conditions are satisfied: in the direction in which the vehicle 10 enters the step, the rotation angular velocity of the driving wheels is higher than the first threshold of the rotation angular velocity of the driving wheels, and the target vehicle acceleration is lower than the second threshold value of the target vehicle acceleration.

In this case, the operation intension determination value is set to zero, and no step climbing control for adding the driving torque is executed. Thus, the operation intention of the occupant 15, who refuses to brake the vehicle 10 suddenly or to climb up the step, can be appropriately determined, and control assisting in implementing the operation can be executed.

The step climbing control is always executed in the case where the vehicle 10 climbs down a step. This corresponds to the case (e) described above. That is, if the rotation angular velocity of the driving wheels and the step resistance torque have different signs from each other (positive and negative), it is determined that the vehicle 10 is going to climb down the step, and the designated value of the step climbing torque ratio is set to 1. In this case, riding comfort can be improved by giving priority to reducing a shock generated when climbing down the step over using an increase in vehicle acceleration caused by climbing down the step.

Note that, in the present embodiment, smooth switching of whether to execute the step climbing control or not is implemented by low-pass filtering the designated value of the step climbing torque ratio. However, the designated value of the step climbing torque ratio need not necessarily be low-pass filtered if responsiveness is more emphasized than smooth switching. Moreover, a transition zone may be provided for the upper threshold of the target vehicle acceleration and the lower threshold of the target vehicle acceleration as a function of the target value of the vehicle acceleration and the rotation angular velocity of the driving wheels as shown by curve in the operation intention determination map in FIG. 29. That is, in FIG. 29, the curve for switching the designated value of the step climbing torque ratio from 0 to 1 may be replaced with a band having a predetermined width, so that the designated value of the step climbing torque ratio is linearly changed from 0 to 1 in the band. Thus, both the smooth switching and the responsiveness to a change in the operation amount by the occupant 15 can be balanced to some extent.

In the present embodiment, the step climbing control, prohibited in response to a request to brake the vehicle 10 when contacting an ascending step located ahead of the vehicle 10, may be temporarily re-executed just before the vehicle 10 is stopped. For example, in the state that satisfies the conditions that the rotation angular velocity of the driving wheels is higher than the first threshold of the rotation angular velocity of the driving wheels, and is equal to or less than the second threshold of the rotation angular velocity of the driving wheels, if the target value of the vehicle acceleration is maintained at a constant value that is lower than the negative first threshold of the target vehicle acceleration, the designated value of the step climbing torque ratio is changed from 0 to 1 when the rotation angular velocity of the driving wheels becomes smaller than the first threshold value of the rotation angular velocity of the driving wheels. In order to solve this problem, the designated value of the step climbing torque ratio may be determined further in view of the respective directions in which the target value of the vehicle acceleration and the rotation angular velocity of the driving wheels change. For example, the designated value of the step climbing torque ratio is switched from 0 to 1 in the case where a region is entered where the rotation angular velocity of the driving wheels is higher than zero and is equal to or less than the first threshold of the rotation angular velocity of the driving wheels, and the target value of the vehicle acceleration is lower than the negative first threshold of the target vehicle acceleration, due to the change of the target value of the vehicle acceleration. However, the designated value of the step climbing torque ratio is maintained at 0 in the case where the above region is entered due to the change of the rotation angular velocity of the driving wheels. This can prevent unnecessary re-execution of the step climbing control.

In the present embodiment, whether to execute or prohibit the step climbing control is switched based on the measured value of the rotation angular velocity of the driving wheels. However, whether to execute or prohibit the step climbing control may be switched based on the target value of the rotation angular velocity of the driving wheels. This prevents minute fluctuation of the rotation angular velocity of the driving wheels due to disturbance or the like from affecting the switching of whether to execute or prohibit the step climbing operation, whereby more stable step climbing control can be implemented.

In the present embodiment, nonlinear functions are used to determine a part of the thresholds of the target vehicle acceleration, and the minimum rotation angular velocity of the driving wheels for climbing up a step inertially. However, linear functions approximating the nonlinear functions may be used to simplify calculation. Nonlinear functions may be applied in a map form.

In the present embodiment, whether to execute or prohibit the step climbing control is switched in view of various operation intentions of the occupant 15. However, some switching operations may be omitted depending on the usages of the vehicle 10, the conditions under which the vehicle 10 are used, and the like. For example, if the vehicle 10 travels only at a low speed, the step climbing control to be executed when the vehicle enters a step at a high speed may not be executed, and the step climbing control may always be prohibited in response to a brake request.

In the present embodiment, whether the step is an ascending step or a descending step, and the height of the step are estimated based on the estimated value of the step resistance torque, and whether to execute or prohibit the step climbing control is switched based on the estimated values of the step. However, as described in the third embodiment, a step measuring sensor such as the distance sensors 71 may be used, and whether to execute or prohibit the step climbing control may be switched based on the measurement result of the step measuring sensor.

In the present embodiment, the operation intention of the occupant 15 is estimated based on the target value of the vehicle acceleration corresponding to the operation amount of the joystick 31 by the occupant 15. However, in the case where the operation amount of the joystick 31 corresponds to the target value of the vehicle speed, the target value of the vehicle acceleration may be replaced with the target value of the vehicle speed, or with a time difference of the target value of the vehicle speed.

Alternatively, the operation intention of the occupant 15 may be estimated based on the operation amount of the joystick 31. For example, the vehicle 10 may be provided with an accelerator pedal and a brake pedal as an operating apparatus, and whether to execute or prohibit the step climbing control may be switched based on the stepping amount of each pedal, and the rotation angular velocity of the driving wheels. The vehicle 10 may be provided with a switch for switching between the traveling state and the stopped state by the occupant 10, and prohibition of the step climbing control at the time the vehicle 10 is stopped may be selected depending on the operating state of the switch.

A sixth embodiment of the present invention will be described below. Note that elements having the same structure as that of the first to fifth embodiments are denoted with the same reference characters, and description thereof will be omitted. Description of the same operations and the same effects as those of the first to fifth embodiments is also omitted.

Figure 32:
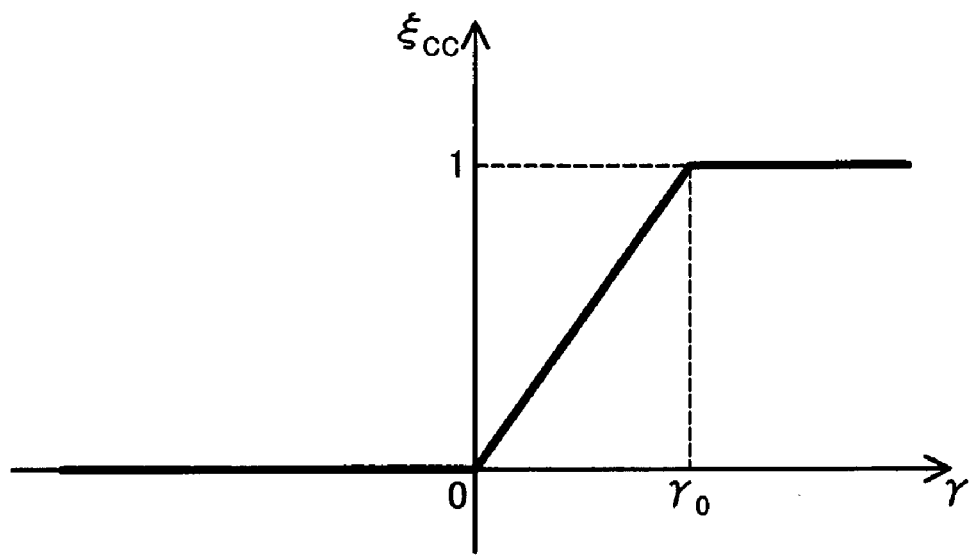
FIG. 32 is a graph showing a change in a curvature correction coefficient according to a sixth embodiment of the present invention.
Figure 33:
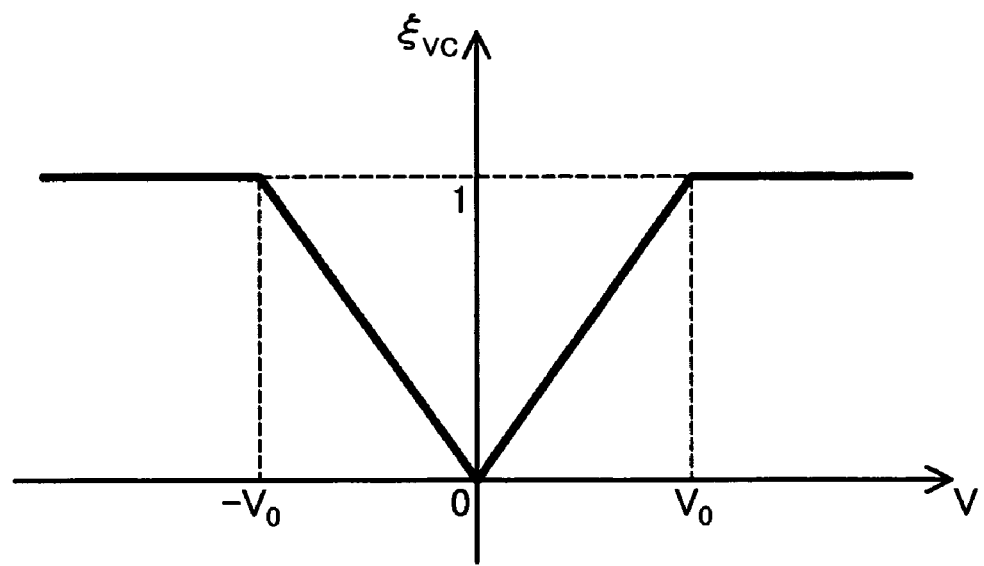
FIG. 33 is a graph showing a change in a speed correction coefficient according to the sixth embodiment of the present invention.
Figure 35:
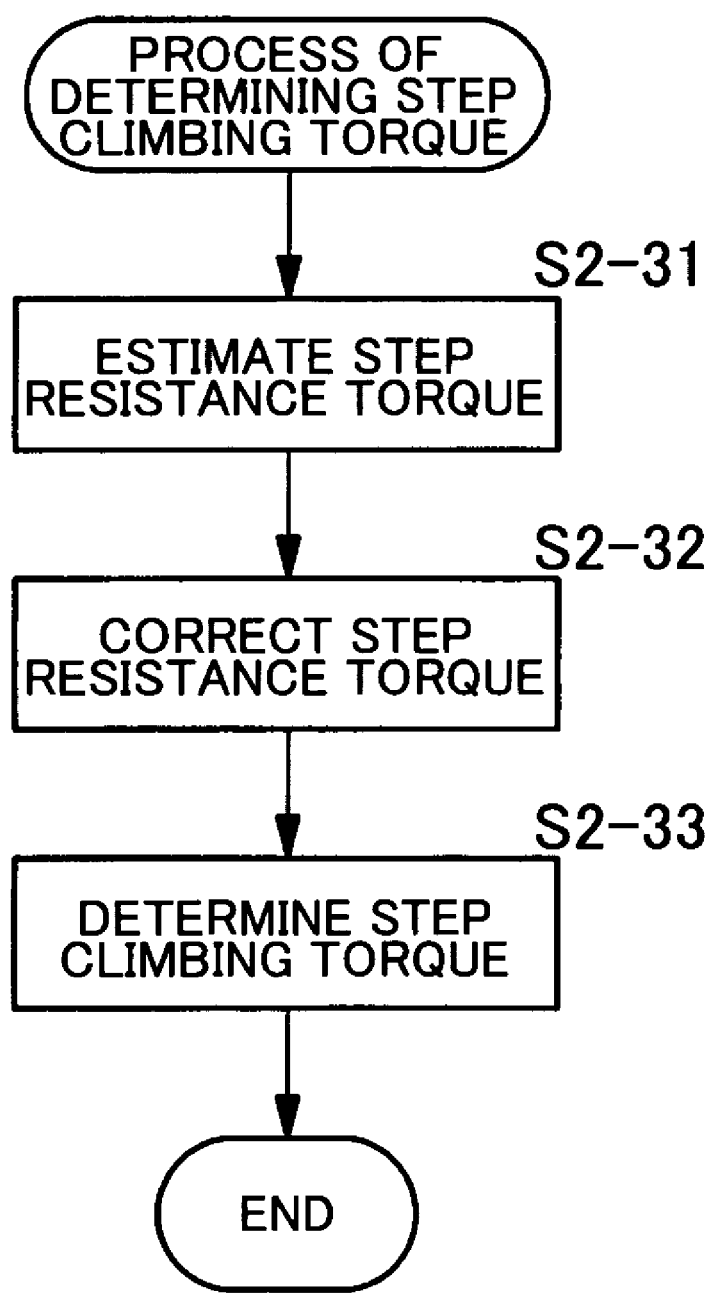
FIG. 35 is a flowchart illustrating an operation of a process of determining step climbing torque according to the sixth embodiment of the present invention.

FIG. 32 is a graph showing a change in a curvature correction coefficient according to the sixth embodiment of the present invention. FIG. 33 is a graph showing a change in a speed correction coefficient according to the sixth embodiment of the present invention. FIG. 34 is a graph illustrating correction of step resistance torque according to the sixth embodiment of the present invention. FIG. 35 is a flowchart illustrating an operation of the process of determining step climbing torque according to the sixth embodiment of the present invention.

Estimation of the step resistance torque $\tau_D$, and the traveling and posture control of the vehicle 10 based on the estimated step resistance torque $\tau_D$ can be delayed. This is because a low pass filter is used to remove the noise of the estimated value of the step resistance torque $\tau_D$ due to the noise of the measured values of the sensors such as the driving wheel sensor 51, the vehicle body tilt sensor 41, and the active weight portion sensor 61, and because backward difference calculation is performed to obtain the acceleration required to calculate the estimated value of the step resistance torque $\tau_D$. The influence of the delay is significant especially when the vehicle 10 enters a step at a high speed. Such a delay causes unnecessary acceleration/deceleration of the vehicle 10 and significant tilting of the vehicle body, thereby reducing riding comfort.

Thus, in the present embodiment, the estimated value of the step resistance torque $\tau_D$ is corrected to a value to be obtained at a little later time, based on the estimated value of the step resistance torque $\tau_D$ and the time rate of change in the estimated value. Specifically, the estimated value of the step resistance torque $\tau_D$ is corrected to a value that is predicted to be obtained at a little later time, by linear extrapolation. The estimated value of the step resistance torque $\tau_D$ is not corrected if the time rate of change and the curvature (the time change acceleration) of the estimated value have different signs from each other (positive and negative). The amount of correction of the estimated value is increased as the absolute value of the rotating speed of the driving wheels 12 is increased.

This further stabilizes the traveling state of the vehicle 10 and the posture of the vehicle body when climbing up/down a step. This also stabilizes the step climbing operation even if the vehicle 10 enters a step at a high speed.

The traveling and posture control process of the present embodiment will be described in detail below. Note that, since the outline of the traveling and posture control process, the process of obtaining state quantities, the process of determining a target traveling state, the process of determining target vehicle body posture, and the process of determining actuator outputs are similar to those of the first embodiment, description thereof will be omitted, and only the process of determining step climbing torque will be described below.

In the process of determining step climbing torque, the main control ECU 21 first estimates the step resistance torque $\tau_D$ (step S2-31). In this case, as in the first embodiment, the main control ECU 21 estimates the step resistance torque $\tau_D$ based on the state quantities obtained in the process of obtaining state quantities, and the respective outputs of the actuators determined in the process of determining actuator outputs in the previous traveling and posture control process (the previous time step).

Then, the main control ECU 21 corrects the step resistance torque $\tau_D$ (step S2-32). In this case, the main control ECU 21 corrects the estimated value of the step resistance torque $\tau_D$ by the following expression (34), based on the time history of the step resistance torque $\tau_D$, and the rotation angular velocity $\dot{\theta}_W$ of the driving wheels 12.

$$\hat{\tau}_D = \tau_D + \xi_{CC}\xi_{VC}\dot{\tau}_D \Delta t_f \qquad \text{Expression (34)}$$

$\tau_D$ indicates an estimated value of the step resistance torque before correction, and $\hat{\tau}_D$ indicates a corrected estimated value of the step resistance torque.

$\Delta t_f$ indicates a time interval representing a little later time, and has a predetermined value.

$\xi_{CC}$ indicates a curvature correction coefficient. $\xi_{CC}$ is represented by the following expression (35), and changes as shown in FIG. 32.

[Expression 24]

$$\xi_{CC} = \begin{cases} 0 & (\gamma \le 0) \\ \gamma/\gamma^0 & (0 < \gamma < 1) \\ 1 & (\gamma \ge 1) \end{cases} \quad \text{Expression (35)}$$

$$\gamma = \left( \frac{\tau'_D \tau''_D \Delta t_f}{\tau'^2_D + \varepsilon} \right).$$

Note that $\gamma$ indicates a dimensionless curvature, and $\gamma^0$ indicates a dimensionless curvature threshold. $\tau'_D$ indicates a time rate of change, $\tau''_D$ indicates a curvature (time change acceleration), $$\tau'_D(t) = \frac{\tau_D(t) - \tau_D(t - \Delta t_b)}{\Delta t_b}, \text{ and}$$

$$\tau''_D(t) = \frac{\tau'_D(t) - \tau'_D(t - \Delta t_b)}{\Delta t_b}.$$

Note that $\varepsilon$ is a very small value for preventing division by zero, and has a predetermined value.

Note that $\Delta t_b$ indicates a time interval for difference calculation. For example, the time intervals $\Delta t_f$ and $\Delta t_b$ are determined so as to satisfy the condition represented by the following expression (36), based on a time constant $T_{LPF}$ of a low pass filter.

$$\Delta t_f \le T_{LPF} \le \Delta t_b \quad \text{Expression (36)}$$

$\xi_{VC}$ indicates a speed correction coefficient. $\xi_{VC}$ is represented by the following expression (37), and changes as shown in FIG. 33.

$$\xi_{VC} = \begin{cases} |V|/V_0 & (|V| < V_0) \\ 1 & (|V| \ge V_0) \end{cases} \quad \text{Expression (37)}$$

$$V = R_W \dot{\theta}_W.$$

Note that V indicates a vehicle speed, and $V_0$ indicates a vehicle speed threshold.

Thus, the estimated value of the step resistance torque $\tau_D$ is corrected to a value that is predicted to be obtained at a little later time, based on the estimated value of the step resistance torque $\tau_D$, and the time rate of change $\tau_D'$ in the estimated value. Specifically, as shown in FIG. 34, the estimated value to be obtained at a little later time is predicted by linear extrapolation. In this case, as represented by the expression (36), the time interval of the difference calculation for obtaining the time rate of change is larger than the time constant of the low pass filter for calculation of the estimated value, and the time interval of the linear extrapolation is smaller than the time constant of the lower pass filter for calculation of the estimated value, thereby ensuring stability and consistency of the control. Thus, the influence of the estimation delay can be reduced by appropriately predicting a value to be obtained at a later time.

Note that no correction is performed if the time rate of change $\tau_D'$ in the estimated value and the curvature $\tau_D''$ have different signs from each other (positive and negative), that is, if the product of these two values is negative. In other words, as shown by the expression (35) and in FIG. 32, in the range where $\gamma$ is zero or less, the curvature correction coefficient $\xi_{CC}$ is set to zero, and no correction is performed. A continuous correction function is applied in order to eliminate discontinuity when the sign of the above product is inverted. This prevents excessive correction in the linear extrapolation, and appropriate estimation and control can be performed.

The amount of correction of the estimated value is increased as the absolute value of the rotation angular velocity $\dot{\theta}_W$ of the driving wheels 12 is increased, that is, as the absolute value of the vehicle speed V is increased. In this case, a correction function proportional to the absolute value of the rotational angular speed $\dot{\theta}_W$ of the driving wheels 12 is applied when the absolute value of the rotational angular speed $\dot{\theta}_W$ is within a predetermined threshold range. That is, as shown by the expression (37) and in FIG. 33, in the range where the absolute value of the vehicle speed V is less than the vehicle speed threshold $V_0$, the speed correction coefficient $\xi_{VC}$ is increased as the absolute value of the vehicle speed V is increased. Thus, the correction amount can be appropriately determined when a substantial influence of the estimation delay is increased with an increase in the vehicle speed V.

Finally, the main control ECU 21 determines the step climbing torque $\tau_C$ (step S2-33). In this case, the main control ECU 21 determines the estimated value of the step resistance torque $\tau_D$ as the step climbing torque $\tau_C$. That is, $\tau T_C = \tau_D$.

This can further stabilize the traveling state of the vehicle 10 and the posture of the vehicle body when climbing up/down a step.

Note that only an example in which the value at a later time is predicted by linear extrapolation, that is, by first order extrapolation, is described in the present embodiment. However, the amount of correction may be determined by higher-order extrapolation.

Although only an example in which the correction is performed regardless of the magnitude of the estimated value of the step resistance torque $\tau_D$ is described in the present embodiment, the correction may be performed only when the absolute value of the estimated value exceeds a predetermined threshold, so that appropriate correction can be performed only for a step.

As described above, in the present embodiment, the estimated value of the step resistance torque $\tau_D$ is corrected to a value that is predicted to be obtained at a later time based on the time rate of change in the estimated value. This further stabilizes the traveling state of the vehicle 10 and the posture of the vehicle body when climbing up/down a step. In particular, the step climbing operation is stabilized even if the vehicle 10 enters a step at a high speed. Thus, the occupant 15 can operate the vehicle 10 more safely and more comfortably when climbing up/down a step.

A seventh embodiment of the present invention will be described below. Note that elements having the same structure as that of the first to sixth embodiments are denoted with the same reference characters, and description thereof will be omitted. Description of the same operations and the same effects as those of the first to sixth embodiments is also omitted.

Figure 36:
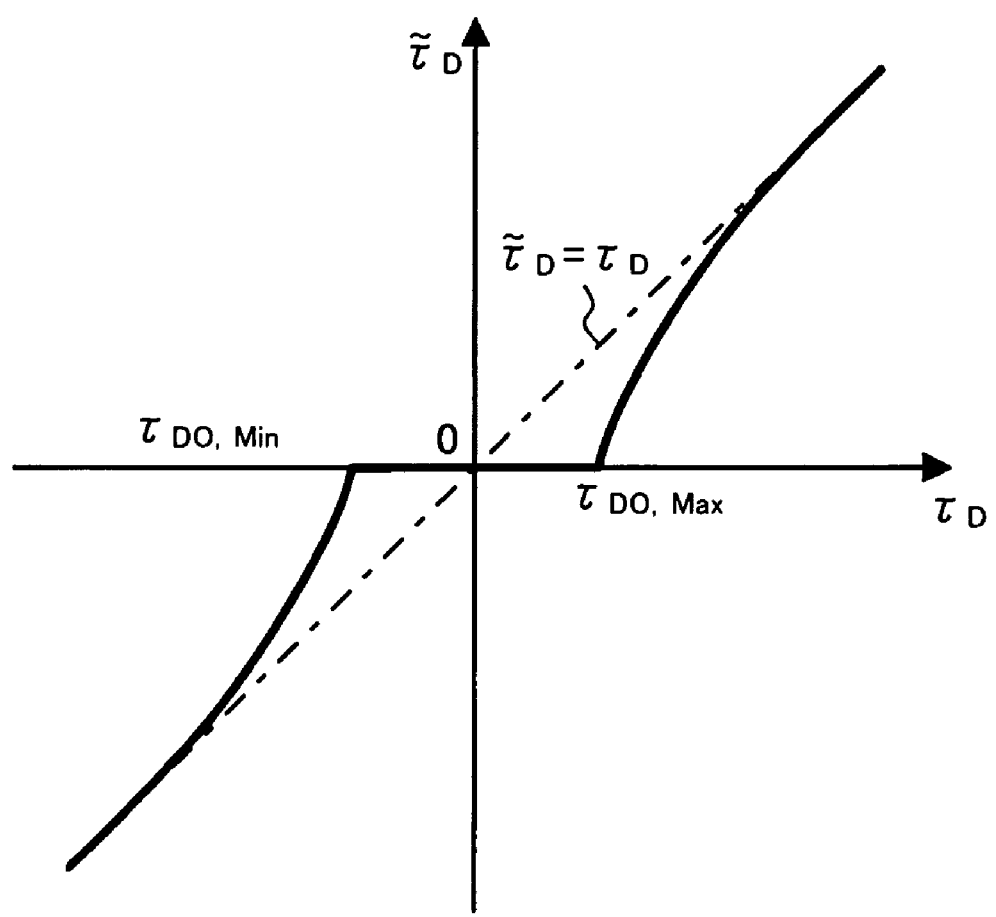
FIG. 36 is a graph illustrating correction of step resistance torque according to a seventh embodiment of the present invention.
Figure 37:
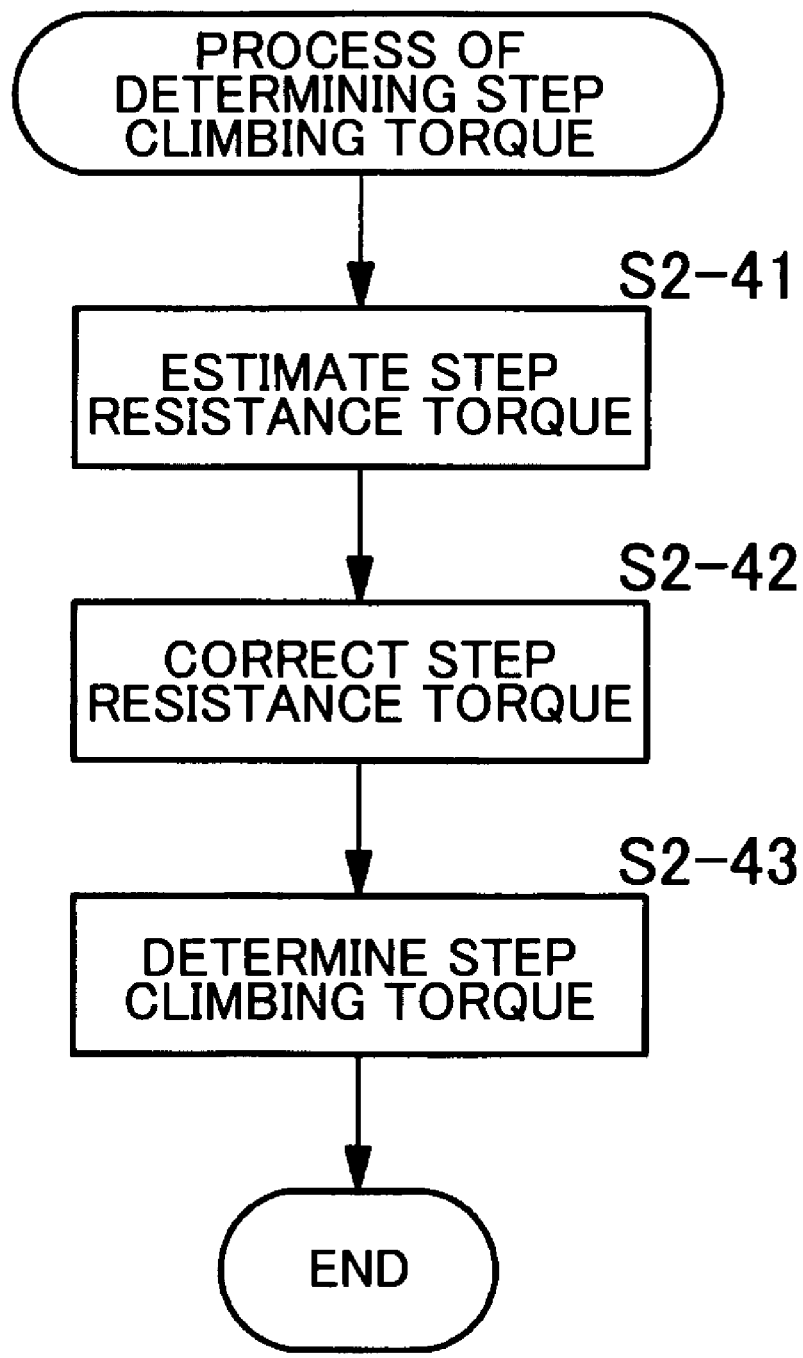
FIG. 37 is a flowchart illustrating an operation of a process of determining step climbing torque according to the seventh embodiment of the present invention.

FIG. 36 is a graph illustrating correction of the step resistance torque according to the seventh embodiment of the present invention. FIG. 37 is a flowchart illustrating an operation of the process of determining step resistance torque according to the seventh embodiment of the present invention.

Even if the control is performed by estimating the step resistance torque $\tau_D$, the vehicle speed and the posture of the vehicle body can fluctuate due to a minute variation in the estimated value. For example, a minute variation in the estimated value of the step resistance torque $\tau_D$ is caused not only by very small irregularities on the road surface, but also by factors other than the steps, such as disturbance to the vehicle 10 like wind, and noise of the measured values of the sensors such as the driving wheel sensor 51, the vehicle body tilt sensor 41, and the active weight portion sensor 61. When control is switched by determining the step climbing state based on the estimated value of the step resistance torque $\tau_D$, the determination result and the control are frequently switched in response to a minute variation in the estimated value. This can cause larger fluctuations in the vehicle speed and in the posture of the vehicle body. On the other hand, if a low pass filter is used to remove high frequency components of the variation in the estimated value, the estimation of the step resistance torque $\tau_D$, and the traveling and posture control of the vehicle 10 based on the estimated value of the step resistance torque $\tau_D$ can be delayed during the step climbing operation. This reduces riding comfort of the occupant 15.

Even in the operation other than the step climbing operation, the control for climbing up/down a step is always performed, which can affect other control. Thus, more labor is spend for design and adjustment of the control system.

Thus, in the present embodiment, no step climbing torque $\tau_C$ is added if the absolute value of the estimated value of the step resistance torque $\tau_D$ is equal to or less than a predetermined threshold value.

This prevents fluctuations in the vehicle speed and in the posture of the vehicle body during normal traveling. Moreover, the occupant can operate the vehicle comfortably both when climbing up/down a step and when traveling on the level ground.

The traveling and posture control process of the present embodiment will be described in detail below. Note that, since the outline of the traveling and posture control process, the process of obtaining state quantities, the process of determining a target traveling state, the process of determining target vehicle body posture, and the process of determining actuator outputs are similar to those of the first embodiment, description thereof will be omitted, and only the process of determining step climbing torque will be described below.

In the process of determining step climbing torque, the main control ECU 21 first estimates the step resistance torque $\tau_D$ (step S2-41). In this case, as in the first embodiment, the main control ECU 21 estimates the step resistance torque $\tau_D$, based on the state quantities obtained by the process of obtaining state quantities, and the respective outputs of the actuators determined by the process of determining actuator outputs in the previous traveling and posture control process (the previous time step).

Then, the main control ECU 21 corrects the step resistance torque $\tau_D$ (step S2-42). In this case, the main control ECU 21 corrects the estimated value of the step resistance torque $\tau_D$ by the following expression (38), based on a predetermined dead band threshold.

$$\bar{\tau}_D = \xi_{SE} \tau_D \quad \text{Expression (38)}$$

$\tau_D$ indicates an estimated value of the step resistance torque before correction, and $\bar{\tau}_D$ is a corrected estimated value of the step resistance torque.

$\xi_{SE}$ indicates sensitivity, and is represented by the following expression (39).

$$\xi_{SE} = \quad \text{Expression (39)}$$

$$\begin{cases} 1 - \exp\left(-\dfrac{\tau_D - \tau_{D0,Max}}{\Delta\tau_{D,Trans}}\right) & (\tau_D > \tau_{D0,Max}) \\ 0 & (\tau_{D0,Min} \leq \tau_D \leq \tau_{D0,Max}) \\ 1 - \exp\left(-\dfrac{\tau_{D0,Min} - \tau_D}{\Delta\tau_{D,Trans}}\right) & (\tau_D < \tau_{D0,Min}) \end{cases}$$

$\tau_{D0,Max}$ and $\tau_{D0,Min}$ indicate upper and lower limits of the dead band threshold, respectively, and $\tau_{D0,Max} = \tau_{D0}$, and $\tau_{D0,Min} = -\tau_{D0}$. Moreover, $\tau_{D0} = MgR_W \sin\eta_{Rough}$, and $$\eta_{Rough} = \cos^{-1}\left(1 - \dfrac{H_{Rough}}{R_W}\right).$$

$\Delta\tau_{D,Trans}$ indicates a constant representing the degree to which the sensitivity $\xi_{SE}$ is made close to 1 when exceeding a threshold. $\Delta\tau_{D,Trans}$ has a predetermined value.

Note that $H_{Rough}$ indicates the greatest height of irregularities on the road surface, and has a value determined on assumption of a bumpy road.

Thus, in the case where an absolute value of the estimated value of the step resistance torque $T_0$ is small, the estimated value of the step resistance torque $\tau_D$ is corrected to zero. Specifically, the estimated value of the step resistance value $\tau_D$ is corrected as shown in FIG. 36.

That is, if the estimated value of the step resistance torque $\tau_D$ is within the range between the upper and lower limits of the dead band threshold, the estimated value of the step resistance torque $\tau_D$ is corrected to zero. Thus, a small variation in the estimated value of the step resistance torque $\tau_D$ is ignored, and fluctuations in the vehicle speed and in the posture of the vehicle body can be prevented.

If the estimated value of the step resistance torque $\tau_D$ is out of the range between the upper and lower limits of the dead band threshold, the estimated value of the step resistance torque $\tau_D$ is used as it is. Thus, a large variation in the estimated value of the step resistance torque $\tau_D$ is regarded as a step, whereby appropriate control can be performed.

Note that discontinuity of the estimated value of the step resistance torque $\tau_D$ around the dead band threshold is eliminated to continuously change the estimated value of the step resistance torque $\tau_D$. This can reduce shocks of the vehicle speed and the posture of the vehicle body during discontinuous transition on the dead band threshold, and also can prevent fluctuations (hunting) of the vehicle speed and the posture of the vehicle body associated with repeated transitions around the dead band threshold.

In the present embodiment, the time constant of the low pass filter need not be increased, whereby delay of the control is reduced.

Finally, the main control ECU 21 determines the step climbing torque $\tau_C$ (step S2-43). In this case, the main control ECU 21 determines the value of the corrected step resistance torque $\bar{\tau}_D$ as the value of the step climbing torque $\tau_C$. That is, $\tau_C = \bar{\tau}_D$.

Note that only an example in which the dead band threshold is set to a predetermined value based on the possible height of the irregularities on the road surface is described in the present embodiment. However, the dead band threshold may be determined in view of other factors such as noise components of the respective measured values of the sensors such as the driving wheel sensor 51, the vehicle body tilt sensor 41, and the active weight portion sensor 61.

Although only an example in which both smoothness and convergence are implemented by exponentially making the sensitivity $\xi_{SE}$ close to $\xi_{SE}=1$ is described in the present embodiment, a simpler function may be used. For example, a similar function may be implemented by combining a plurality of linear functions. Moreover, a complex function may be used. For example, a function that eliminates discontinuity of a derivative (a rate of increase in the sensitivity) may be introduced.

Thus, in the present embodiment, no step climbing torque $\tau_C$ is added when the absolute value of the estimated value of the step resistance torque $\tau_D$ is equal to or less than a predetermined threshold. This prevents fluctuations in the vehicle speed and in the posture of the vehicle body during normal traveling. Thus, the occupant 15 can operate the vehicle 10 comfortably both when climbing up/down a step and when traveling on the level ground.

An eighth embodiment of the present invention will be described below. Note that elements having the same structure as that of the first to seventh embodiments are denoted with the same reference characters, and description thereof will be omitted. Description of the same operations and the same effects as those of the first to seventh embodiments is also omitted.

Figure 38:
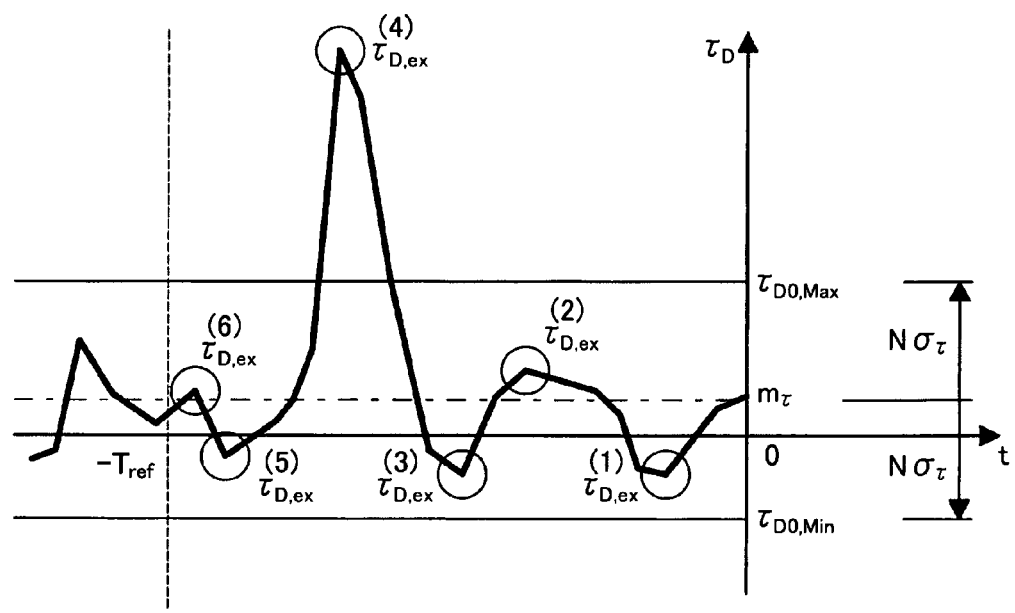
FIG. 38 is a graph illustrating correction of a dead band threshold of step resistance torque according to an eighth embodiment of the present invention.
Figure 39:
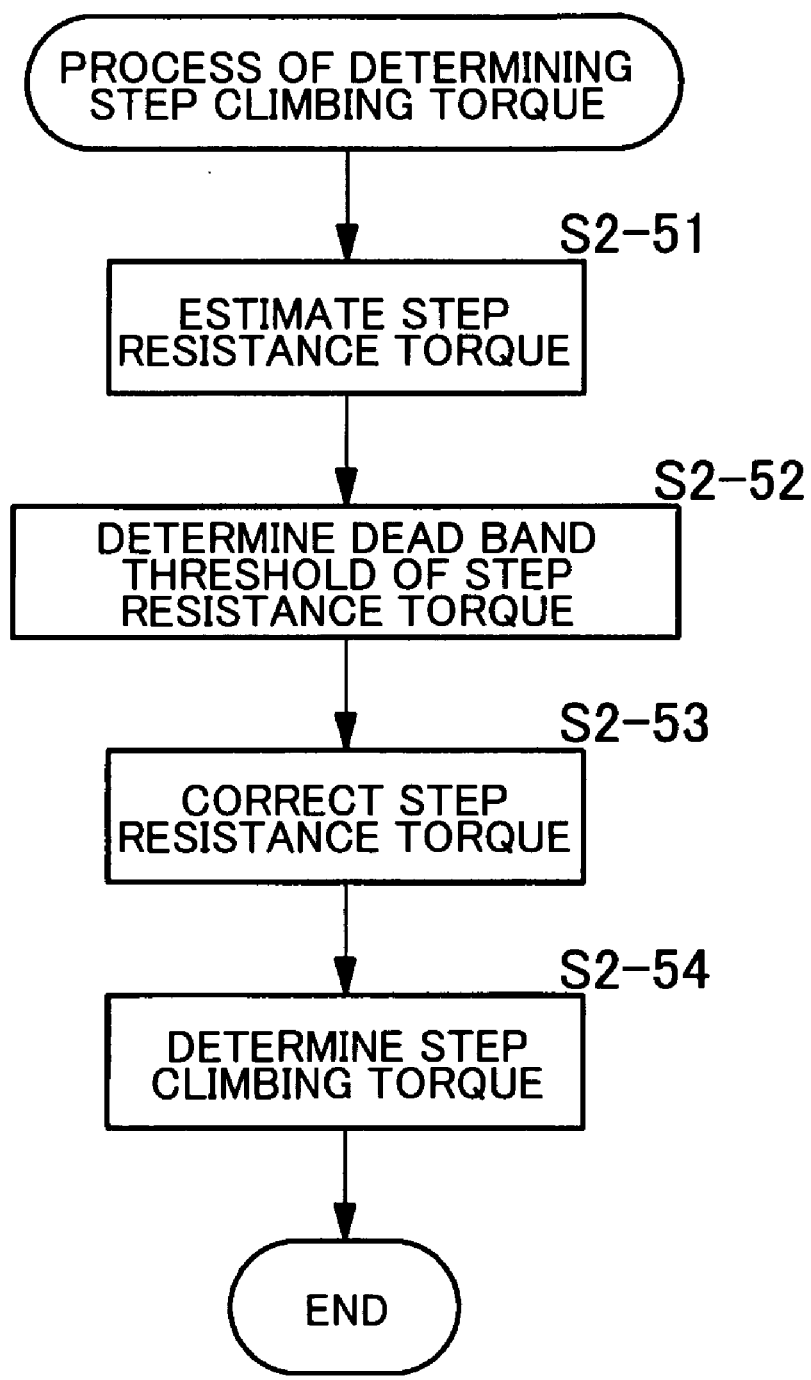
FIG. 39 is a flowchart illustrating an operation of a process of determining step climbing torque according to the eighth embodiment of the present invention.

FIG. 38 is a diagram illustrating correction of the dead band threshold of the step resistance torque according to the eighth embodiment of the present invention. FIG. 39 is a flowchart illustrating an operation of the process of determining step climbing torque according to the eighth embodiment of the present invention.

Low steps cannot be detected if the dead band threshold described in the seventh embodiment is increased. In this case, the vehicle speed and the posture of the vehicle body change greatly when climbing up/down a low step, thereby reducing riding comfort.

The range of variation in the estimated value of the step resistance torque $\tau_D$ varies depending on the conditions of the road surface. For example, the range of variation in the estimated value is small on an indoor smooth floor. For example, the range of variation in the estimated value is large on a road surface having small irregularities all over, such as a gravel road. Thus, if the dead band threshold is reduced, the control may be switched frequently, or the vehicle speed and the posture of the vehicle body can fluctuate due to the frequent switching of the control, when traveling on a road surface having small irregularities all over.

Moreover, noise components of the measured values of the sensors, such as the driving wheel sensor 51, the vehicle body tilt sensor 41, and the active weight portion sensor 61, vary depending also on the operating state of a motor, an inverter, and the like.

Therefore, in the present embodiment, the time history of the estimated value of the step resistance torque $\tau_D$ during a time period from a time that is earlier than the current time by a predetermined time to the current time is considered, and the dead band threshold is determined based on statistical characteristic quantities of extreme values included in the time history. Specifically, the sum of an average value of the extreme values and standard deviation multiplied by N is used as an upper limit of the dead band threshold, and the standard deviation multiplied by N subtracted from the average value of the extreme values is used as a lower limit of the dead band threshold.

Thus, the dead band threshold of the estimated value of the step resistance torque $\tau_D$ is automatically adjusted to an appropriate value in accordance with a change in conditions of the road surface, or the like, whereby the occupant 15 can comfortably operate the vehicle 10 anytime and anywhere.

The traveling and posture control process of the present embodiment will be described in detail below. Note that, since the outline of the traveling and posture control process, the process of obtaining state quantities, the process of determining a target traveling state, the process of determining target vehicle body posture, and the process of determining actuator outputs are similar to those of the first embodiment, description thereof will be omitted, and only the process of determining step climbing torque will be described below.

In the process of determining step climbing torque, the main control ECU 21 first estimates the step resistance torque $\tau_D$ (step S2-51). In this case, as in the first embodiment, the main control ECU 21 estimates the step resistance torque $\tau_D$, based on the state quantities obtained by the process of obtaining state quantities, and the respective outputs of the actuators determined by the process of determining actuator outputs in the previous traveling and posture control process (the previous time step).

Then, the main control ECU 21 determines the dead band threshold of the step resistance torque $\tau_D$ (step S2-52). In this case, the main control ECU 21 determines an upper limit $\tau_{D0,Max}$ and a lower limit $\tau_{D0,Min}$ of the dead band threshold by the expressions (40) and (41), respectively. Note that FIG. 38 shows an example of the time history of the estimated value of the step resistance torque $\tau_D$ during a predetermined time period from a time that is earlier than the current time by a predetermined time to the current time, and shows extreme values included in the time history (six extreme values in the example shown in the drawing).

$$\tau_{D0,Max} = m_\tau + N\sigma_\tau \quad \text{Expression (40)}$$

$$\tau_{D0,Min} = m_\tau - N\sigma_\tau \quad \text{Expression (41)}$$

$m_\tau$ indicates an average value of the extreme values that are present in the predetermined time period, and is represented by the following expression (42). $\sigma_\tau$ indicates the standard deviation of the extreme values, and is represented by the following expression (43).

N indicates a dead band width coefficient, and has a predetermined value. For example, N=2.

$$m_\tau = \frac{1}{n}\sum_{k=1}^{n} \tau_{D,ex}^{(k)} \quad \text{Expression (42)}$$

$$\sigma_\tau = \sqrt{\frac{1}{n}\sum_{k=1}^{n}\left(\tau_{D,ex}^{(k)} - m_\tau\right)^2} \quad \text{Expression (43)}$$

Note that $\tau_{D,ex}^{(k)}$ indicates an extreme value of the estimated value of the step resistance torque $\tau_D$, and is the $k^{th}$ extreme value from the current one among the total of n extreme values.

In FIG. 38, $T_{ref}$ indicates a reference time for setting the time that is earlier than the current time by a predetermined time. Thus, $T_{ref}$ indicates a time for considering the extreme values, and has a predetermined value. That is, the time history that is earlier than the current time by more than $T_{ref}$ is not considered.

Although a method for detecting the extreme values can be selected arbitrarily, the extreme values can be automatically detected by, e.g., determining that $\tau_D(t_1)$ is an extreme value when the following expression (44) is satisfied.

$$\{\tau_D(t_1+\Delta t)-\tau_D(t_1)\}\{\tau_D(t_1)-\tau_D(t_1-\Delta t)\}<0 \qquad \text{Expression (44)}$$

The expression (44) indicates that, if the gradient of a line representing the time history as shown in FIG. 38 is inverted at a certain point, it is determined that this point is an extreme value.

Thus, the dead band threshold is determined based on the statistical characteristic quantities of the extreme values included in the time history of the estimated value of the step resistance torque $\tau_D$ during the time period from a time that is earlier than the current time by a predetermined time to the current time. In this case, the average value and the standard deviation are used as indices of the statistic characteristic quantities. It is assumed that deviation of the values represented by the standard deviation is a normal state, and the threshold is determined so that it is determined that deviation of the values greatly exceeding the deviation of the normal state is an abnormal state, that is, a step.

That is, if the difference between the estimated value of the step resistance value $\tau_D$ and the average value is obviously larger than the standard deviation (average deviation), it is determined that the estimated value is a step. Then, appropriate control for the step is executed based on the estimated value.

If the difference between the estimated value of the step resistance torque $\tau_D$ and the average value is equal to or less than the standard deviation, it is not determined that the estimated value is a step. In this case, fluctuations of the vehicle speed and the posture of the vehicle body are prevented by ignoring the estimated value.

Then, the main control ECU 21 corrects the step resistance torque $\tau_D$ (step S2-53). In this case, the main control ECU 21 corrects the estimated value of the step resistance torque $\tau_D$ in a manner similar to that of the seventh embodiment, based on the determined dead band threshold.

Finally, the main control ECU 21 determines the step climbing torque $\tau_C$ (step S2-54). In this case, the main control ECU 21 determines the value of the corrected step resistance torque $\tau_D$ as the value of the step climbing torque $\tau_C$. That is, $\tau_C=\tau_D$.

Note that only an example in which deviation of the estimated value is evaluated by the average value and the standard deviation as statistical characteristic quantities is described in the present embodiment. However, the deviation of the estimated value can be evaluated by a simpler method. For example, it can be determined that the range between the second largest value and the second smallest value in the predetermined time history is the deviation in a normal state, and these values may be used as thresholds. As a strict method based more on the dynamic basis, the estimated values of the step resistance torque $\tau_D$ during the step climbing operation are extracted by a frequency filter and pattern analysis, and the thresholds can be determined based on the set of estimated values other than the extracted estimated values.

The example described in the present embodiment is based on the assumption that predetermined values are given in advance as the initial values of the thresholds. However, two threshold values at the end of the previous control may be stored, and these two threshold values may be used as the initial values.

As described above, in the present embodiment, the dead band threshold is determined based on the statistical characteristic quantities of the extreme values that are included in the time history of the estimated value of the step resistance torque $\tau_D$ during the time period from a time that is earlier than the current time by a predetermined time to the current time. Thus, the dead band threshold of the estimated value of the step resistance torque $\tau_D$ is automatically adjusted to an appropriate value in accordance with a change in conditions of the road surface, or the like, whereby the occupant 15 can operate the vehicle 10 comfortably anytime and anywhere.

Note that the present invention is not limited to the above embodiments, and may be modified in various forms based on the spirit and scope of the present invention. Such modifications should not be excluded from the scope of the present invention.

INDUSTRIAL APPLICABILITY

The present invention is applicable to vehicles using posture control of an inverted pendulum.

FIG. 1
10 VEHICLE
12 DRIVING WHEEL
14 RIDING PORTION
FIG. 2
20 CONTROL ECU
21 MAIN CONTROL ECU
22 DRIVING WHEEL CONTROL ECU
23 ACTIVE WEIGHT PORTION CONTROL ECU
30 INPUT DEVICE
31 JOYSTICK
40 VEHICLE BODY CONTROL SYSTEM
41 VEHICLE BODY TILT SENSOR
50 DRIVING WHEEL CONTROL SYSTEM
51 DRIVING WHEEL SENSOR
52 DRIVING MOTOR
60 ACTIVE WEIGHT PORTION CONTROL SYSTEM
61 ACTIVE WEIGHT PORTION SENSOR
62 ACTIVE WEIGHT PORTION MOTOR
FIG. 3A
  COUNTER TORQUE
  GRAVITY
  DRIVING TORQUE
FIG. 3B
  TRANSLATE RIDING PORTION
  COUNTER TORQUE
  GRAVITY
  DRIVING TORQUE
FIG. 4
  PROCESS OF TRAVELING AND POSTURE CONTROL
S1 PROCESS OF OBTAINING STATE QUANTITIES
S2 PROCESS OF DETERMINING STEP CLIMBING TORQUE
S3 PROCESS OF DETERMINING TARGET TRAVELING STATE
S4 PROCESS OF DETERMINING TARGET VEHICLE BODY POSTURE
S5 PROCESS OF DETERMINING ACTUATOR OUTPUTS
FIG. 6
  PROCESS OF OBTAINING STATE QUANTITIES
S1-1 OBTAIN STATE QUANTITIES FROM SENSORS
S1-2 CALCULATE REMAINING STATE QUANTITIES
FIG. 7
  PROCESS OF DETERMINING STEP CLIMBING TORQUE
S2-1 ESTIMATE STEP RESISTANCE TORQUE
S2-2 DETERMINE STEP CLIMBING TORQUE

FIG. 8
  PROCESS OF DETERMINING TARGET TRAVELING STATE
  S3-1 OBTAIN OPERATION AMOUNT
  S3-2 DETERMINE TARGET VEHICLE ACCELERATION
  S3-3 CALCULATE TARGET ROTATION ANGULAR VELOCITY OF DRIVE WHEELS
FIG. 10
  PROCESS OF DETERMINING TARGET VEHICLE BODY POSTURE
  S4-1 DETERMINE TARGET POSITION OF ACTIVE WEIGHT PORTION AND TARGET VEHICLE BODY TILT ANGLE
  S4-2 CALCULATE REMAINING TARGET VALUES
FIG. 11
  PROCESS OF DETERMINING ACTUATOR OUTPUTS
  S5-1 DETERMINE FEEDFORWARD OUTPUT OF EACH ACTUATOR
  S5-2 DETERMINE FEEDBACK OUTPUT OF EACH ACTUATOR
  S5-3 SEND COMMAND VALUES TO ELEMENT CONTROL SYSTEMS
FIG. 12
  20 CONTROL ECU
  21 MAIN CONTROL ECU
  22 DRIVING WHEEL CONTROL ECU
  30 INPUT DEVICE
  31 JOYSTICK
  40 VEHICLE BODY CONTROL SYSTEM
  41 VEHICLE BODY TILT SENSOR
  50 DRIVING WHEEL CONTROL SYSTEM
  51 DRIVING WHEEL SENSOR
  52 DRIVING MOTOR
FIG. 13
  TILT VEHICLE BODY
  COUNTER TORQUE
  GRAVITY
  DRIVING TORQUE
FIG. 14
  PROCESS OF OBTAINING STATE QUANTITIES
  S1-11 OBTAIN STATE QUANTITIES FROM SENSORS
  S1-12 CALCULATE REMAINING STATE QUANTITIES
FIG. 15
  PROCESS OF DETERMINING STEP CLIMBING TORQUE
  S2-11 ESTIMATE STEP RESISTANCE TORQUE
  S2-12 DETERMINE STEP CLIMBING TORQUE
FIG. 16
  PROCESS OF DETERMINING TARGET VEHICLE BODY POSTURE
  S4-11 DETERMINE TARGET VEHICLE BODY TILT ANGLE
  S4-12 CALCULATE REMAINING TARGET VALUES
FIG. 17
  PROCESS OF DETERMINING ACTUATOR OUTPUT
  S5-11 DETERMINE FEEDFORWARD OUTPUT OF ACTUATOR
  S5-12 DETERMINE FEEDBACK OUTPUT OF ACTUATOR
  S5-13 SEND COMMAND VALUE TO ELEMENT CONTROL SYSTEM
FIG. 18A
  DETECT STEP
FIG. 18B
  DISTANCE SENSOR
FIG. 19A
  TRANSLATE RIDING PORTION
  COUNTER TORQUE
  GRAVITY
  STEP CLIMBING TORQUE
FIG. 19B
  TRANSLATE RIDING PORTION
  COUNTER TORQUE
  GRAVITY
  STEP CLIMBING TORQUE
FIG. 19C
  GRAVITY
FIG. 20
  20 CONTROL ECU
  21 MAIN CONTROL ECU
  22 DRIVING WHEEL CONTROL ECU
  23 ACTIVE WEIGHT PORTION CONTROL ECU
  30 INPUT DEVICE
  31 JOYSTICK
  40 VEHICLE BODY CONTROL SYSTEM
  41 VEHICLE BODY TILT SENSOR
  50 DRIVING WHEEL CONTROL SYSTEM
  51 DRIVING WHEEL SENSOR
  52 DRIVING MOTOR
  60 ACTIVE WEIGHT PORTION CONTROL SYSTEM
  61 ACTIVE WEIGHT PORTION SENSOR
  62 ACTIVE WEIGHT PORTION MOTOR
  70 STEP MEASURING SYSTEM
  71 DISTANT SENSOR
FIG. 22
    BEFORE CLIMBING-UP OPERATION
    DURING CLIMBING-UP OPERATION
    AFTER CLIMBING-UP OPERATION
FIG. 24
    BEFORE CLIMBING-DOWN OPERATION
    DURING CLIMBING-DOWN OPERATION
    AFTER CLIMBING-DOWN OPERATION
FIG. 25
  PROCESS OF DETERMINING STEP CLIMBING TORQUE
  S2-21 OBTAIN MEASURED VALUES OF DISTANCE SENSORS
  S2-22 DETERMINE POSITION AND HEIGHT OF STEP
  S2-23 DETERMINE STEP RESISTANCE TORQUE
  S2-24 DETERMINE STEP CLIMBING TORQUE
FIG. 26A
  TRANSLATE RIDING PORTION
  COUNTER TORQUE
  GRAVITY
  DRIVING TORQUE
FIG. 26B
  COUNTER TORQUE
  INERTIAL FORCE
  GRAVITY
  DRIVING TORQUE
FIG. 28
  PROCESS OF DETERMINING TARGET TRAVELING STATE
  S3-11 OBTAIN OPERATION AMOUNT
  S3-12 DETERMINE TARGET VEHICLE ACCELERATION
  S3-13 CALCULATE TARGET ROTATION ANGULAR VELOCITY OF DRIVING WHEELS
FIG. 29
  INCREASE $-\tau_D$
  INCREASE $\tau_D$ FIG. 30
  PROCESS OF TRAVELING AND POSTURE CONTROL
S11 PROCESS OF OBTAINING STATE QUANTITIES
S12 PROCESS OF DETERMINING TARGET TRAVELING STATE
S13 PROCESS OF DETERMINING STEP CLIMBING TORQUE
S14 PROCESS OF DETERMINING TARGET VEHICLE BODY POSTURE
S15 PROCESS OF DETERMINING ACTUATOR OUTPUTS
FIG. 31
  PROCESS OF DETERMINING STEP CLIMBING TORQUE
S13-1 ESTIMATE STEP RESISTANCE TORQUE
S13-2 DETERMINE STEP CLIMBING TORQUE
FIG. 35
  PROCESS OF DETERMINING STEP CLIMBING TORQUE
S2-31 ESTIMATE STEP RESISTANCE TORQUE
S2-32 CORRECT STEP RESISTANCE TORQUE
S2-33 DETERMINE STEP CLIMBING TORQUE
FIG. 37
  PROCESS OF DETERMINING STEP CLIMBING TORQUE
S2-41 ESTIMATE STEP RESISTANCE TORQUE
S2-42 CORRECT STEP RESISTANCE TORQUE
S2-43 DETERMINE STEP CLIMBING TORQUE
FIG. 39
  PROCESS OF DETERMINING STEP CLIMBING TORQUE
S2-51 ESTIMATE STEP RESISTANCE TORQUE
S2-52 DETERMINE DEAD BAND THRESHOLD OF STEP RESISTANCE TORQUE
S2-53 CORRECT STEP RESISTANCE TORQUE
S2-54 DETERMINE STEP CLIMBING TORQUE

The invention claimed is:

1. A vehicle, comprising:
a vehicle body;
a riding portion;
an active weight portion attached to the vehicle body so as to be movable forward and rearward in a traveling direction,
a driving wheel rotatably attached to the vehicle body; and
a vehicle control apparatus configured to control driving torque that is applied to the driving wheel and to control posture of the vehicle body, wherein
when climbing up/down a step on a road, the vehicle control apparatus is configured to control a position of center of gravity of the vehicle body (1) in accordance with the step, (2) by changing a tilt angle of the vehicle body, and (3) by moving the active weight portion in such a manner that when climbing up/down the step on the road, the riding portion is first moved without tilting the vehicle body and the vehicle body starts being tilted when the riding portion reaches the moving limit of the active weight portion.

2. The vehicle according to claim 1, wherein
the vehicle control apparatus is configured to move the position of the center of gravity of the vehicle body in an upward direction of the step.

3. The vehicle according to claim 1, wherein
the vehicle control apparatus is configured to apply driving torque in accordance with the step to the driving wheel, and to control the position of the center of gravity of the vehicle body so that the driving torque becomes equal to an increase in gravity torque caused by the movement of the center of gravity of the vehicle body.

4. The vehicle according to claim 1, wherein
the vehicle control apparatus is configured to estimate step resistance torque, which is a resistance of the step, by an observer, and to control the position of the center of gravity of the vehicle body in accordance with the step resistance torque.

5. The vehicle according to claim 1, further comprising:
a sensor for detecting the step, wherein
the vehicle control apparatus is configured to control the position of the center of gravity of the vehicle body in accordance with a measured value of the step measured by the sensor.

* * * * *